(12) United States Patent
Miyoshi

(10) Patent No.: US 9,813,716 B2
(45) Date of Patent: Nov. 7, 2017

(54) VIDEO ENCODER AND VIDEO ENCODING METHOD

(71) Applicant: FUJITSU LIMITED, Kawasaki-shi, Kanagawa (JP)

(72) Inventor: Hidenobu Miyoshi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 370 days.

(21) Appl. No.: 14/529,635

(22) Filed: Oct. 31, 2014

(65) Prior Publication Data

US 2015/0156486 A1 Jun. 4, 2015

(30) Foreign Application Priority Data

Nov. 29, 2013 (JP) ................................. 2013-248567

(51) Int. Cl.
*H04N 19/176* (2014.01)
*H04N 19/11* (2014.01)
(Continued)

(52) U.S. Cl.
CPC ........... *H04N 19/176* (2014.11); *H04N 19/11* (2014.11); *H04N 19/159* (2014.11);
(Continued)

(58) Field of Classification Search
CPC .... H04N 19/176; H04N 19/11; H04N 19/159; H04N 19/167; H04N 19/44; H04N 19/66; H04N 19/107; H04N 19/593
(Continued)

(56) References Cited

U.S. PATENT DOCUMENTS

| 4,651,206 A * | 3/1987 | Ohki | ...................... H04N 19/51 |
| | | | 375/240.16 |
| 2010/0128995 A1* | 5/2010 | Drugeon | .......... H04N 19/00733 |
| | | | 382/238 |

(Continued)

FOREIGN PATENT DOCUMENTS

| JP | 60-146588 | 8/1985 |
| JP | 06-101841 | 12/1994 |

(Continued)

OTHER PUBLICATIONS

Kimihiko Kazui et al., "Support of very low delay coding in Tile", Joint Collaboration Team on Video Coding (JCT-VC) of ITU-T SG16 WP3 and ISO/IEC JTC1/SC29/WG11 6th Meeting: Torino, Italy, Jul. 14-22, 2011, Document: JCTVC-F140, pp. 1-10.

(Continued)

*Primary Examiner* — Jay Patel
*Assistant Examiner* — Marnie Matt
(74) *Attorney, Agent, or Firm* — Fujitsu Patent Center

(57) ABSTRACT

A video encoder includes: a restriction block identification unit that determines a valid prediction mode with a reference range not overlapping an unrefreshed region, for each size of a first sub-block, which is a unit for generating a prediction block, when a coding-target block in a refreshed region is to be encoded by intra prediction coding; and a coding mode determination unit that identifies a combination of the size of the first sub-block, the size of a second sub-block, which is a unit for application of a prediction mode, and a valid prediction mode with the smallest estimation value of the amount of code for encoding a third block, which is a unit for application of an intra prediction coding mode, as a combination to be used for intra prediction coding of the third sub-block.

20 Claims, 40 Drawing Sheets

(51) Int. Cl.
*H04N 19/159* (2014.01)
*H04N 19/167* (2014.01)
*H04N 19/44* (2014.01)
*H04N 19/66* (2014.01)
*H04N 19/107* (2014.01)
*H04N 19/593* (2014.01)

(52) U.S. Cl.
CPC ........... *H04N 19/167* (2014.11); *H04N 19/44* (2014.11); *H04N 19/66* (2014.11); *H04N 19/107* (2014.11); *H04N 19/593* (2014.11)

(58) Field of Classification Search
USPC ..................................................... 375/240.02
See application file for complete search history.

(56) References Cited

U.S. PATENT DOCUMENTS

| | | | | |
|---|---|---|---|---|
| 2011/0051812 | A1* | 3/2011 | Tanaka | ................. H04N 19/176 375/240.12 |
| 2012/0328003 | A1* | 12/2012 | Chien | ................. H04N 19/176 375/240.03 |
| 2013/0044808 | A1* | 2/2013 | Nakagawa | ........... H04N 19/105 375/240.03 |
| 2013/0163664 | A1* | 6/2013 | Guo | ................. H04N 19/00793 375/240.12 |
| 2013/0272415 | A1* | 10/2013 | Zhou | .................... H04N 19/176 375/240.16 |

FOREIGN PATENT DOCUMENTS

| | | | | |
|---|---|---|---|---|
| JP | 2011-055219 | | 3/2011 | |
| JP | WO 2011099080 A1 | * | 8/2011 | ........... H04N 19/105 |

OTHER PUBLICATIONS

Daisuke Kobayashi et al., "A Study on Complexity Reduction Methods for HEVC Intra Prediction" 2011 The Picture Coding Symposium of Japan (PCSJ2011), The 26th Symposium material, Oct. 26, 2011 (Oct. 26, 2011), pp. 67-68 (document showing well-known arts), with English Abstract.

JPOA—Office Action of Japanese Patent Application No. 2013-248567 dated May 30, 2017, with machine translation of the Office Action.

* cited by examiner

Intra4x4

Intra8x8

Intra16x16

FIG. 12A

| TUHIDX | 0 | 1 |
|---|---|---|
| 1201 | 0 | 1 |
| | 2 | 3 |

TUIDX, r'

FIG. 12B

| | 0 | 1 | 2 | 3 |
|---|---|---|---|---|
| | 0 | 1 | 4 | 5 |
| | 2 | 3 | 6 | 7 |
| | 8 | 9 | 12 | 13 |
| 1201 | 10 | 11 | 14 | 15 | r'

FIG. 12C

| 0 | 1 | 2 | 3 | 4 | 5 | 6 | 7 |
|---|---|---|---|---|---|---|---|
| 0 | 1 | 4 | 5 | 16 | 17 | 20 | 21 |
| 2 | 3 | 6 | 7 | 18 | 19 | 22 | 23 |
| 8 | 9 | 12 | 13 | 24 | 25 | 28 | 29 |
| 10 | 11 | 14 | 15 | 26 | 27 | 30 | 31 |
| 32 | 33 | 36 | 37 | 48 | 49 | 52 | 53 |
| 34 | 35 | 38 | 39 | 50 | 51 | 54 | 55 |
| 40 | 41 | 44 | 45 | 56 | 57 | 60 | 61 |
| 42 | 43 | 46 | 47 | 58 | 59 | 62 | 63 |

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 0 | 1 | 4 | 5 | 16 | 17 | 20 | 21 | 64 | 65 | 68 | 69 | 80 | 81 | 84 | 85 |
| 2 | 3 | 6 | 7 | 18 | 19 | 22 | 23 | 66 | 67 | 70 | 71 | 82 | 83 | 86 | 87 |
| 8 | 9 | 12 | 13 | 24 | 25 | 28 | 29 | 72 | 73 | 76 | 77 | 88 | 89 | 92 | 93 |
| 10 | 11 | 14 | 15 | 26 | 27 | 30 | 31 | 74 | 75 | 78 | 79 | 90 | 91 | 94 | 95 |
| 32 | 33 | 36 | 37 | 48 | 49 | 52 | 53 | 96 | 97 | 100 | 101 | 112 | 113 | 116 | 117 |
| 34 | 35 | 38 | 39 | 50 | 51 | 54 | 55 | 98 | 99 | 102 | 103 | 114 | 115 | 118 | 119 |
| 40 | 41 | 44 | 45 | 56 | 57 | 60 | 61 | 104 | 105 | 108 | 109 | 120 | 121 | 124 | 125 |
| 42 | 43 | 46 | 47 | 58 | 59 | 62 | 63 | 106 | 107 | 110 | 111 | 122 | 123 | 126 | 127 |
| 128 | 129 | 132 | 133 | 144 | 145 | 148 | 149 | 192 | 193 | 196 | 197 | 208 | 209 | 212 | 213 |
| 130 | 131 | 134 | 135 | 146 | 147 | 150 | 151 | 194 | 195 | 198 | 199 | 210 | 211 | 214 | 215 |
| 136 | 137 | 140 | 141 | 152 | 153 | 156 | 157 | 200 | 201 | 204 | 205 | 216 | 217 | 220 | 221 |
| 138 | 139 | 142 | 143 | 154 | 155 | 158 | 159 | 202 | 203 | 206 | 207 | 218 | 219 | 222 | 223 |
| 160 | 161 | 164 | 165 | 176 | 177 | 180 | 181 | 224 | 225 | 228 | 229 | 240 | 241 | 244 | 245 |
| 162 | 163 | 166 | 167 | 178 | 179 | 182 | 183 | 226 | 227 | 230 | 231 | 242 | 243 | 246 | 247 |
| 168 | 169 | 172 | 173 | 184 | 185 | 188 | 189 | 232 | 233 | 236 | 237 | 248 | 249 | 252 | 253 |
| 170 | 171 | 174 | 175 | 186 | 187 | 190 | 191 | 234 | 235 | 238 | 239 | 250 | 251 | 254 | 255 |

| 0 | 1 |
|---|---|
| 0 | 1 |

| 0 | 0 | 0 | 1 |
|---|---|---|---|
| 0 | 0 | 0 | 1 |
| 0 | 0 | 0 | 1 |
| 0 | 0 | 0 | 1 |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

1301

1012

FIG. 13D (16×16 grid of 0s)

| PUHIDX | 0 | 1401 |
|---|---|---|
| | 0 | |
| PUIDX | | r' |

FIG. 14B

| | 0 | 1 | |
|---|---|---|---|
| 1401 | 0 | 1 | |
| | 2 | 3 | |
| | | | r' |

FIG. 14C

| | 0 | 1 | 2 | 3 |
|---|---|---|---|---|
| | 0 | 1 | 4 | 5 |
| | 2 | 3 | 6 | 7 |
| | 8 | 9 | 12 | 13 |
| | 10 | 11 | 14 | 15 |
| | | | | r' |

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 0 | 1 | 4 | 5 | 16 | 17 | 20 | 21 | 64 | 65 | 68 | 69 | 80 | 81 | 84 | 85 |
| 2 | 3 | 6 | 7 | 18 | 19 | 22 | 23 | 66 | 67 | 70 | 71 | 82 | 83 | 86 | 87 |
| 8 | 9 | 12 | 13 | 24 | 25 | 28 | 29 | 72 | 73 | 76 | 77 | 88 | 89 | 92 | 93 |
| 10 | 11 | 14 | 15 | 26 | 27 | 30 | 31 | 74 | 75 | 78 | 79 | 90 | 91 | 94 | 95 |
| 32 | 33 | 36 | 37 | 48 | 49 | 52 | 53 | 96 | 97 | 100 | 101 | 112 | 113 | 116 | 117 |
| 34 | 35 | 38 | 39 | 50 | 51 | 54 | 55 | 98 | 99 | 102 | 103 | 114 | 115 | 118 | 119 |
| 40 | 41 | 44 | 45 | 56 | 57 | 60 | 61 | 104 | 105 | 108 | 109 | 120 | 121 | 124 | 125 |
| 42 | 43 | 46 | 47 | 58 | 59 | 62 | 63 | 106 | 107 | 110 | 111 | 122 | 123 | 126 | 127 |
| 128 | 129 | 132 | 133 | 144 | 145 | 148 | 149 | 192 | 193 | 196 | 197 | 208 | 209 | 212 | 213 |
| 130 | 131 | 134 | 135 | 146 | 147 | 150 | 151 | 194 | 195 | 198 | 199 | 210 | 211 | 214 | 215 |
| 136 | 137 | 140 | 141 | 152 | 153 | 156 | 157 | 200 | 201 | 204 | 205 | 216 | 217 | 220 | 221 |
| 138 | 139 | 142 | 143 | 154 | 155 | 158 | 159 | 202 | 203 | 206 | 207 | 218 | 219 | 222 | 223 |
| 160 | 161 | 164 | 165 | 176 | 177 | 180 | 181 | 224 | 225 | 228 | 229 | 240 | 241 | 244 | 245 |
| 162 | 163 | 166 | 167 | 178 | 179 | 182 | 183 | 226 | 227 | 230 | 231 | 242 | 243 | 246 | 247 |
| 168 | 169 | 172 | 173 | 184 | 185 | 188 | 189 | 232 | 233 | 236 | 237 | 248 | 249 | 252 | 253 |
| 170 | 171 | 174 | 175 | 186 | 187 | 190 | 191 | 234 | 235 | 238 | 239 | 250 | 251 | 254 | 255 |

| 0 | 1 | 2 | 3 | 4 | 5 | 6 | 7 |
|---|---|---|---|---|---|---|---|
| 0 | 1 | 4 | 5 | 16 | 17 | 20 | 21 |
| 2 | 3 | 6 | 7 | 18 | 19 | 22 | 23 |
| 8 | 9 | 12 | 13 | 24 | 25 | 28 | 29 |
| 10 | 11 | 14 | 15 | 26 | 27 | 30 | 31 |
| 32 | 33 | 36 | 37 | 48 | 49 | 52 | 53 |
| 34 | 35 | 38 | 39 | 50 | 51 | 54 | 55 |
| 40 | 41 | 44 | 45 | 56 | 57 | 60 | 61 |
| 42 | 43 | 46 | 47 | 58 | 59 | 62 | 63 |

| 1601 0 | 1 |
|---|---|
| 0 | 1 | r' — 1012

FIG. 16C

| 1601 1 | 1 | 0 | r' |
|---|---|---|---|
| 1 | 1 | 0 | |
| 1 | 1 | 0 | |
| 1 | 1 | 0 | |

| 1 | 1 | 1 | 1 | 1 | 1 | 0 | 0 |
|---|---|---|---|---|---|---|---|
| 1 | 1 | 1 | 1 | 1 | 1 | 0 | 0 |
| 1 | 1 | 1 | 1 | 1 | 1 | 0 | 0 |
| 1 | 1 | 1 | 1 | 1 | 1 | 0 | 0 |
| 1 | 1 | 1 | 1 | 1 | 1 | 0 | 0 |
| 1 | 1 | 1 | 1 | 1 | 1 | 0 | 0 |
| 1 | 1 | 1 | 1 | 1 | 1 | 0 | 0 |
| 1 | 1 | 1 | 1 | 1 | 1 | 0 | 0 |

FIG. 17A
FIG. 17B
FIG. 17C
FIG. 17D
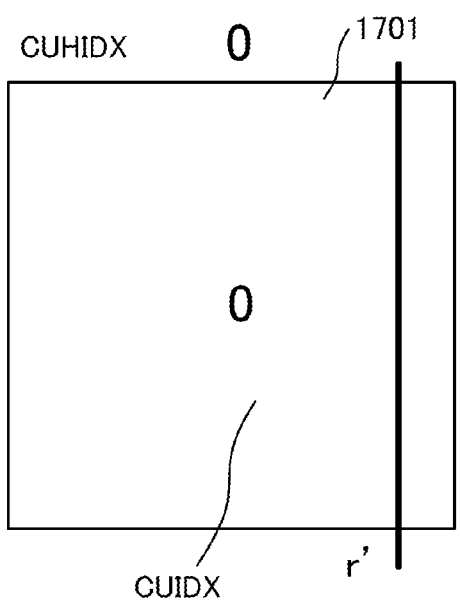
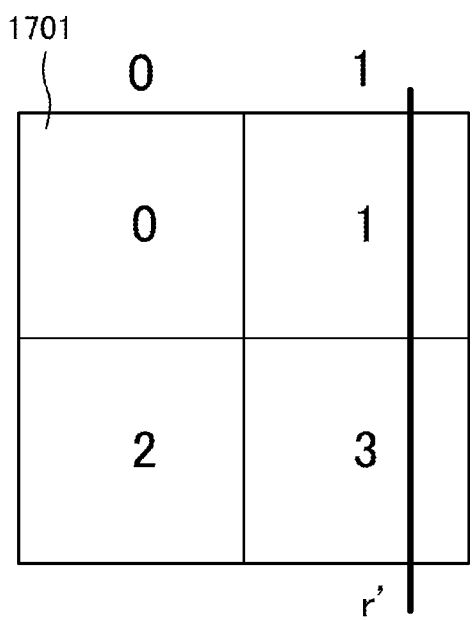

FIG. 20A

| 0 | 1 |
|---|---|
| 0 | 1 |

| 0 | 0 | 0 | 1 |
|---|---|---|---|
| 0 | 0 | 0 | 1 |
| 0 | 0 | 0 | 1 |
| 0 | 0 | 0 | 1 |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

2001

FIG. 20D (16×16 grid of 0s)

<table>
<tr><td>1</td><td>1</td></tr>
<tr><td>1</td><td>1</td></tr>
</table>

<table>
<tr><td>0</td><td>0</td><td>1</td></tr>
<tr><td>0</td><td>0</td><td>1</td></tr>
<tr><td>0</td><td>0</td><td>1</td></tr>
<tr><td>0</td><td>0</td><td>1</td></tr>
</table>

<table>
<tr><td>0</td><td>0</td><td>0</td><td>0</td><td>0</td><td>1</td><td>0</td></tr>
<tr><td>0</td><td>0</td><td>0</td><td>0</td><td>0</td><td>1</td><td>0</td></tr>
<tr><td>0</td><td>0</td><td>0</td><td>0</td><td>0</td><td>1</td><td>0</td></tr>
<tr><td>0</td><td>0</td><td>0</td><td>0</td><td>0</td><td>1</td><td>0</td></tr>
<tr><td>0</td><td>0</td><td>0</td><td>0</td><td>0</td><td>1</td><td>0</td></tr>
<tr><td>0</td><td>0</td><td>0</td><td>0</td><td>0</td><td>1</td><td>0</td></tr>
<tr><td>0</td><td>0</td><td>0</td><td>0</td><td>0</td><td>1</td><td>0</td></tr>
<tr><td>0</td><td>0</td><td>0</td><td>0</td><td>0</td><td>1</td><td>0</td></tr>
</table>

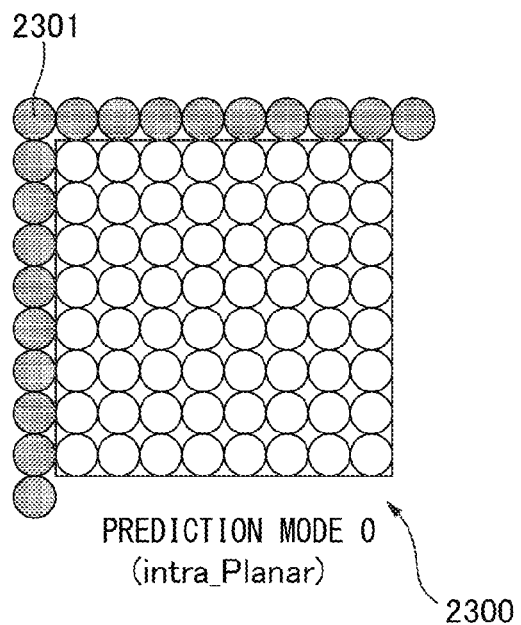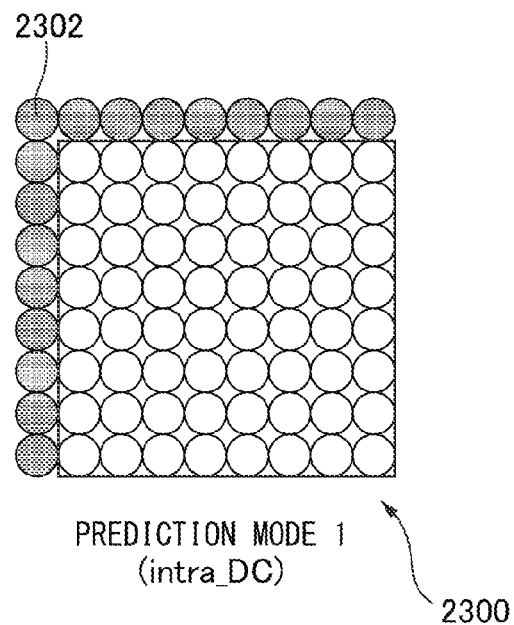

FIG. 24A

| 5 | Nan |
|---|-----|
| 5 | Nan |

| 0 | 0 | 2 | Nan |
|---|---|---|-----|
| 0 | 0 | 2 | Nan |
| 0 | 0 | 2 | Nan |
| 0 | 0 | 2 | Nan |

| 0 | 0 | 0 | 0 | 0 | 0 | 1 | 0 |
|---|---|---|---|---|---|---|---|
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |

2401 ↙ 1012

FIG. 24D (16×16 grid of mostly 0s with a column of 1s near the right edge)

| 0 | 0 | 0 | 0 | 0 | 1 | 0 |
|---|---|---|---|---|---|---|
| 0 | 0 | 0 | 0 | 0 | 1 | 0 |
| 0 | 0 | 0 | 0 | 0 | 1 | 0 |
| 0 | 0 | 0 | 0 | 0 | 1 | 0 |
| 0 | 0 | 0 | 0 | 0 | 1 | 0 |
| 0 | 0 | 0 | 0 | 0 | 1 | 0 |
| 0 | 0 | 0 | 0 | 0 | 1 | 0 |
| 0 | 0 | 0 | 0 | 0 | 1 | 0 |

2701, 1012, r″

FIG. 27E (A grid of 0s with a column of 1s near the right side, labeled 2701 and 1012, r″)

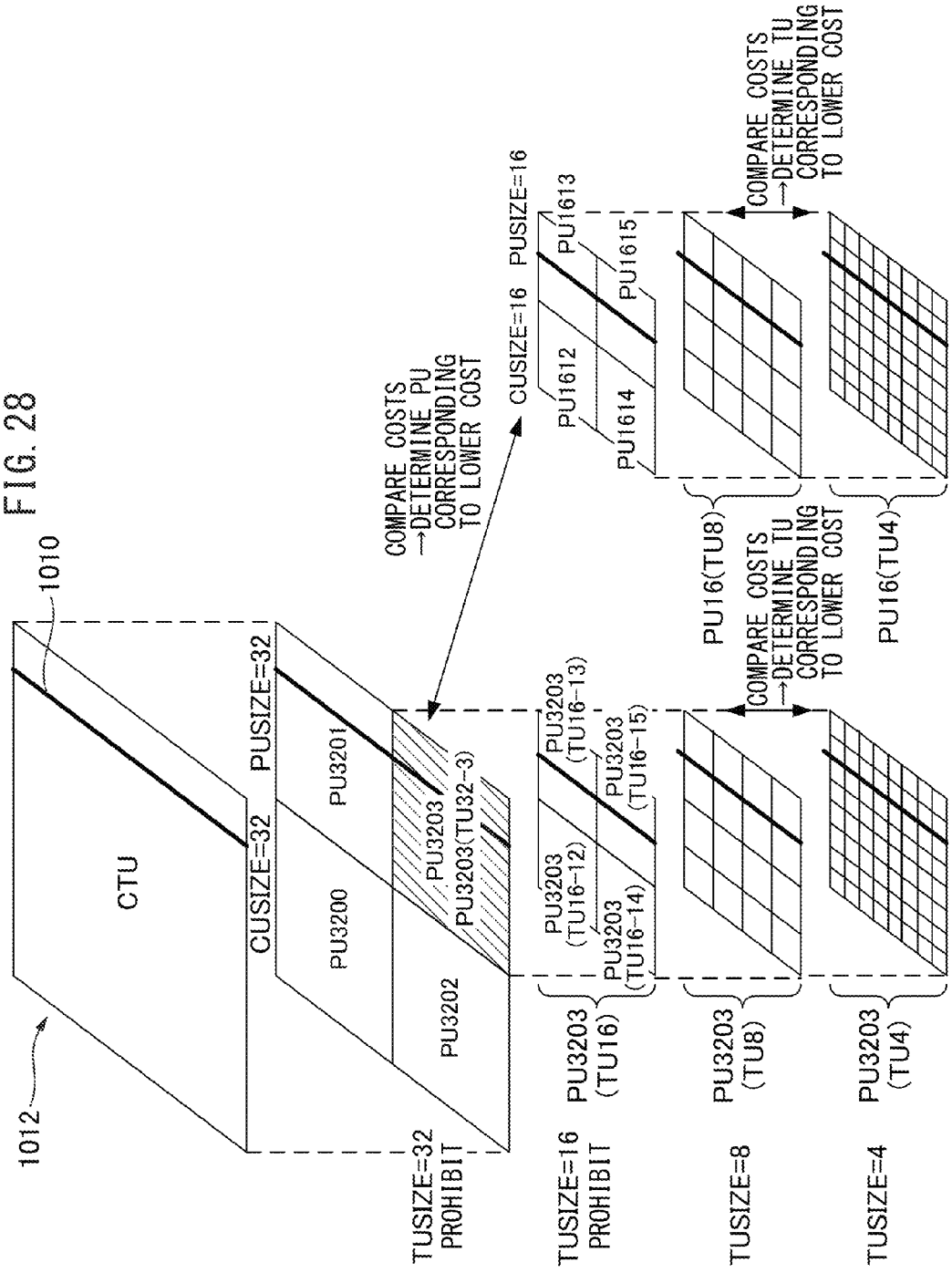

FIG. 32A

| 0 | 1 |
|---|---|
| 0 | 1 |

| 0 | 0 | 0 | 1 |
|---|---|---|---|
| 0 | 0 | 0 | 1 |
| 0 | 0 | 0 | 1 |
| 0 | 0 | 0 | 1 |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

3201    ↖1011

FIG. 32D (16×16 grid of 0s)

| | |
|---|---|
| 1 | 1 |
| 1 | 1 |

| 0 | 0 | 1 | 1 |
|---|---|---|---|
| 0 | 0 | 1 | 1 |
| 0 | 0 | 1 | 1 |
| 0 | 0 | 1 | 1 |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

| 0 | 1 |
|---|---|
| 0 | 1 |

| 0 | 0 | 0 | 1 |
|---|---|---|---|
| 0 | 0 | 0 | 1 |
| 0 | 0 | 0 | 1 |
| 0 | 0 | 0 | 1 |

| 0 | 0 | 0 | 0 | 0 | 0 | 1 | 0 |
|---|---|---|---|---|---|---|---|
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |

| 0 | Nan |
|---|---|
| 0 | Nan |

| 0 | 0 | 0 | Nan |
|---|---|---|---|
| 0 | 0 | 0 | Nan |
| 0 | 0 | 0 | Nan |
| 0 | 0 | 0 | Nan |

| 0 | 0 | 0 | 0 | 0 | 0 | 1 | 0 |
|---|---|---|---|---|---|---|---|
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |
| 0 | 0 | 0 | 0 | 0 | 0 | 1 | 0 |

16×16 grid with all 0s except the 14th column which contains 1s, followed by two columns of 0s.

3601  ↑ 1012  r"

VIDEO ENCODER AND VIDEO ENCODING METHOD

CROSS-REFERENCE TO RELATED APPLICATION

This application is based upon and claims the benefit of priority of the prior Japanese Patent Application No. 2013-248567, filed on Nov. 29, 2013, and the entire contents of which are incorporated herein by reference.

FIELD

The embodiments discussed herein are related to a video encoder and a video encoding method that encodes a coding-target region in a coding-target picture by using information on a different region in the coding-target picture that is already encoded.

BACKGROUND

In general, the volume of video data is huge. For this reason, an apparatus for handling video data usually performs high-efficiency encoding on video data when transmitting the video data to a different apparatus, or when storing the video data in a storage device. "High-efficiency encoding" is an encoding process for converting a data string into a different data string to compress data volume.

Intra-picture prediction (intra prediction) coding is known as an example of the high-efficiency coding scheme for video data. This coding scheme is based on the characteristics that video data are highly correlated in terms of space, and is performed without using any other encoded picture. Hence, a picture encoded by intra-picture prediction coding can be decoded only by using information on the picture itself.

As another example used as the high-efficiency coding scheme, inter-picture prediction (inter prediction) coding is known. This coding scheme is based on the characteristics that video data are highly correlated in terms of time. In video data, a picture at some time and a picture subsequent to the picture generally have a high degree of similarity in many cases. Hence, the inter prediction coding uses the characteristics of video data. In general, a video encoder divides an original coding-target picture into a plurality of coding blocks. For each block, the video encoder selects, as a reference region, a region similar to each coding block from a reference picture obtained by decoding an encoded picture, and calculates a prediction error image indicating the difference between the reference region and the coding block, to thereby exclude redundancy in terms of time. By encoding motion vector information indicating the reference region and the prediction error image, the video encoder achieves a high compression ratio. In general, inter prediction coding achieves higher compression efficiency than intra prediction coding.

Typical video coding schemes that uses above-described coding schemes and are widely used are Moving Picture Experts Group phase 2 (MPEG-2), MPEG-4, and H.264 MPEG-4 Advanced Video Coding (H.264 MPEG-4 AVC) standardized by the International Standardization Organization/International Electrotechnical Commission (ISO/IEC). In these coding schemes, the selected one of intra prediction coding and inter prediction coding for each picture is explicitly recorded in the video stream including the encoded video data, for example. The selected prediction coding scheme is referred to as a coding mode. When the selected coding mode is the intra prediction coding mode, a video encoder can select any one of a plurality of prediction modes, each of which specifies a method of generating a prediction block of a coding block.

FIG. 1 is a view illustrating eight types of prediction modes in accordance with H.264 used for a coding block of 4×4 pixels. As illustrated in FIG. 1, a prediction block of a coding block 100 is generated on the basis of the values of respective encoded pixels 101 locating around the coding block 100. In FIG. 1, each arrow 102 indicates a reference direction in the corresponding prediction mode. For example, in Prediction mode 0, each of the values of the pixels on each vertical line of the prediction block is set at the value of the pixel upward adjacent to the coding block 100 on the vertical line.

In these video coding schemes, I picture, P picture, and B picture are defined. I picture is a picture encoded only by using information of the picture itself. P picture is a picture that is encoded according to inter-coding using information on an encoded picture. B picture is a picture that is encoded according to bidirectional predictive coding using information on two encoded pictures. The directions indicating two reference pictures, which are referred to by a B picture, in terms of time are denoted by L0 and L1. One of the two reference pictures referred to by the B picture may be preceding the B picture in terms of time, and the other reference picture may be subsequent to the B picture in terms of time. In this case, for example, the L0 direction corresponds to the forward direction from the coding-target picture, i.e., the B picture, in terms of time, while the L1 direction corresponds to the backward direction from the coding-target picture in terms of time. Alternatively, both of the two reference pictures may be pictures preceding the B picture in terms of time. In this case, both the L0 direction and the L1 direction correspond to the forward direction from the coding target picture in terms of time. Further, both of the two reference pictures may be pictures subsequent to the B picture in terms of time. In this case, both the L0 direction and the L1 direction correspond to the backward direction from the coding-target picture in terms of time.

For real-time communication of video data that are encoded in accordance with these coding schemes, attempts have been made reducing delay in video encoders and video decoders. For example, in a scheme aiming to reduce delay according to H.264, the backward prediction, in which a picture subsequent to a coding-target picture in terms of time is referred to, is not employed in order to prevent delay due to rearrangement of pictures. A video encoder divides a picture into blocks each having 16×16 pixels. The obtained blocks are referred to as macro-blocks. A line of macro-blocks is referred to as a slice. Macro-blocks can be categorized into intra-macro-blocks for intra prediction coding, and inter-macro-blocks for inter prediction coding. To further reduce delay, an intra-refresh scheme is also proposed, in which all the data in a slice are encoded by using as intra-macro-blocks (see Japanese Examined Patent Publication No. H06-101841, for example).

With reference to FIGS. 2A and 2B, the intra-refresh scheme will be described. FIG. 2A illustrates an example in which a refreshed region increases vertically, while FIG. 2B illustrates an example in which a refreshed region increases horizontally. In FIGS. 2A and 2B, the horizontal axis represents time. Each of pictures 201 to 205 is encoded as a P picture or a B picture which only refers to a preceding picture. The video encoder gradually shifts a position of a slice to which the intra-refresh is applied, from the 0-th macro-block line to the t-th macro-block line and then the (t+1)-th macro-block line for each picture. In this way, the video encoder cyclically shifts the slice to which the intra-refresh is applied in the entire picture in a certain refresh cycle. For example, in FIG. 2A, a refreshed region 210, which is a region through which a slice to which the intra-refresh is applied has shifted, is extended downward with time. By contrast, in FIG. 2B, a refreshed region 220 is extended rightward with time. Each block in a refreshed region, i.e., the region above a refresh boundary 230 in FIG. 2A, is to be encoded by referring only to a refreshed region of a preceding encoded picture or an encoded, refreshed region of the current picture. Since the entire picture is refreshed after a slice to which the intra-refresh is applied has traversed throughout the picture, the video encoder can resume decoding using the picture after the refresh even when an error that makes impossible to decode the picture occurs due to a transmission error or the like. Moreover, the video encoder can decode from a middle of a video stream. Further, since no I picture having a large amount of information is used, the buffer in each of the video encoder and the video decoder can be small in size. As a result, latencies of the buffers can be decreased. Furthermore, as illustrated in FIG. 2B, using a vertical macro-block line for a slice to which the intra-refresh is applied can make the amount of information per macro-block line even. In this way, control of information amount by the video encoder is made simpler.

Note that intra prediction coding is not necessarily performed for each macro-block included in a slice to which the intra-refresh is applied, and the video encoder may perform inter prediction coding by referring only to a refreshed region of a preceding encoded picture. However, it is preferable, in consideration of coding efficiency, that the video encoder use intra-macro-blocks as macro-blocks included in a slice to which the intra-refresh is applied.

With reference to FIG. 3, a method of encoding in a picture when applying intra-refresh will be described. In a picture 300, a region 302, which is locating on the left of a refresh boundary 301, is a refreshed region through which a slice to which the intra-refresh is applied has traversed. By contrast, a region 303, which is locating on the right of the refresh boundary 301, is an unrefreshed region through which a slice to which the intra-refresh is applied has not traversed yet. In FIG. 3, each block 304 is a macro-block.

Inter prediction coding is performed on each inter macro-block, which is a macro-block to be encoded in the inter prediction coding, in the refreshed region 302 by referring to a preceding encoded picture. As to each intra macro-block, which is a macro-block to be encoded in accordance with the intra prediction coding, included in a slice 305, which is to which the intra-refresh is applied and is adjacent to the refresh boundary 301, usable prediction modes are restricted so that the intra macro-block would not refer to any pixel locating on the other side of the refresh boundary 301. The video encoder can generally prohibit prediction by using slices, for each macro-block in a slice, based on the data on a different slice. In addition, methods of directly prohibiting the use of one or more particular prediction modes without using a slice are known. For example, when the right end of the coding block 100 in FIG. 1 is adjacent to a refresh boundary, the use of Prediction modes 3 and 7 is prohibited for the coding block 100.

SUMMARY

In a latest video encoding scheme (High Efficiency Video Coding, HEVC), a method of dividing a picture into blocks is different from a conventional encoding scheme FIG. 4 is a diagram illustrating an example of picture division using HEVC.

As illustrated in FIG. 4, a picture 400 is divided into coding blocks, i.e., coding tree units (CTUs), and the CTUs 401 are encoded in the raster scan order. The size of the CTUs 401 can be selected from 16×16 pixels to 64×64 pixels. However, the size of the CTUs 401 is fixed for each sequence.

Each CTU 401 is further divided into a plurality of coding units (CUs) 402 according to the quad-tree structure. The CUs 402 in the single CTU 401 are encoded in the Z scan order. The size of the CUs 402 is variable, and is selected from the CU partition modes, i.e., 8×8 pixels to 64×64 pixels. Each CU 402 serves as a unit for selecting a coding mode from the intra prediction coding mode and the inter prediction coding mode. In each CU 402, processing is performed individually on prediction units (PUs) 403 or transform units (TUs) 404. Each PU 403 is a unit to be predicted according to the selected coding mode. For example, each PU 403 serves as a unit for the application of a prediction mode in the intra prediction coding mode, while serving as a unit to which motion compensation is applied in the inter prediction coding mode. When the intra prediction coding mode is used, the size of the PUs 403 can be selected from N×N (where N is the half of CU size) and 2N×2N, for example.

Meanwhile, each TU 404 is a unit for orthogonal transform. In addition, the TU 404 also serves as a unit for generating a prediction block. The size of the TUs 404 is selected from 4×4 pixels to 32×32 pixels. The TUs 404 are divided according to the quad-tree structure, and are processed in the Z scan order. For the sake of convenience, in this specification, a transform unit is referred to as a first sub-block; a prediction unit, a second sub-block; and a coding unit, a third sub-block.

In HEVC, the video encoder has restrictions that it is not allowed to select a larger size for TUs than that for PUs (the TU size can be set at the value of the PU size at maximum) in the intra prediction coding mode. The combination of block sizes and a prediction mode for intra prediction coding is referred to as an intra mode. When intra-refresh scheme is employed in a video coding scheme where the block size being a unit for the application of a prediction mode and the block size being a unit for generation of prediction blocks are specified separately, as in HEVC, each block size and a prediction mode to be used are preferably determined appropriately in order to prevent propagation of information on an unrefreshed region to a refreshed region.

According to one embodiment, a video encoder that encodes a coding-target picture included in a video, by an intra-refresh scheme is provided. The video encoder includes: a restriction block identification unit that, when a coding-target block included in a refreshed region, which corresponds to a region through which a slice to which the intra-refresh is applied has traversed, in the coding-target picture is encoded in accordance with an intra-prediction coding mode in which a prediction block for the coding-target block is generated by using information on an encoded region in the coding-target picture and an error signal between the coding-target block and the prediction block is encoded, for each of a plurality of possible sizes of a first sub-block in the coding-target block, the first sub-block being a unit for generating the prediction block, among a plurality of prediction modes with different reference ranges of encoded pixels to be referred to in generating the prediction block for the first sub-block, determines a prediction mode with the reference range not overlapping an unrefreshed region, which corresponds to a region through which a slice to which the intra-refresh is applied has not traversed, as a valid prediction mode; a coding mode determination unit that calculates, for each combination of a size of the first sub-block, a size of a second sub-block which includes the first sub-block and serves as a unit for application of the prediction mode, and the valid prediction mode, an estimation value of an amount of code when a third sub-block which includes the first sub-block and the second sub-block and serves as a unit for application of an intra prediction coding mode, is intra-prediction-encoded, and determines the combination of the size of the first sub-block, the size of the second sub-block, and the valid prediction mode with the smallest estimation value, as an intra prediction mode; a prediction coding unit that generates coded data by encoding the third sub-block in accordance with the intra prediction mode; and an entropy coding unit that entropy codes the coded data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 12A to 12D are diagrams illustrating indices of the respective TUs of 32×32 pixels, 16×16 pixels, 8×8 pixels, and 4×4 pixels in size, respectively.

FIGS. 13A to 13D are TU prohibition maps for TU-restriction-target CTUs in the picture at time (t+6) illustrated in FIG. 10, for TUs of 32×32 pixels, TUs of 16×16 pixels, TUs of 8×8 pixels, and TUs of 4×4 pixels in size, respectively.

FIGS. 14A to 14E are diagrams illustrating indices of the respective PUs according to the sizes of the PUs.

Figures 15A, 15B, 15C:
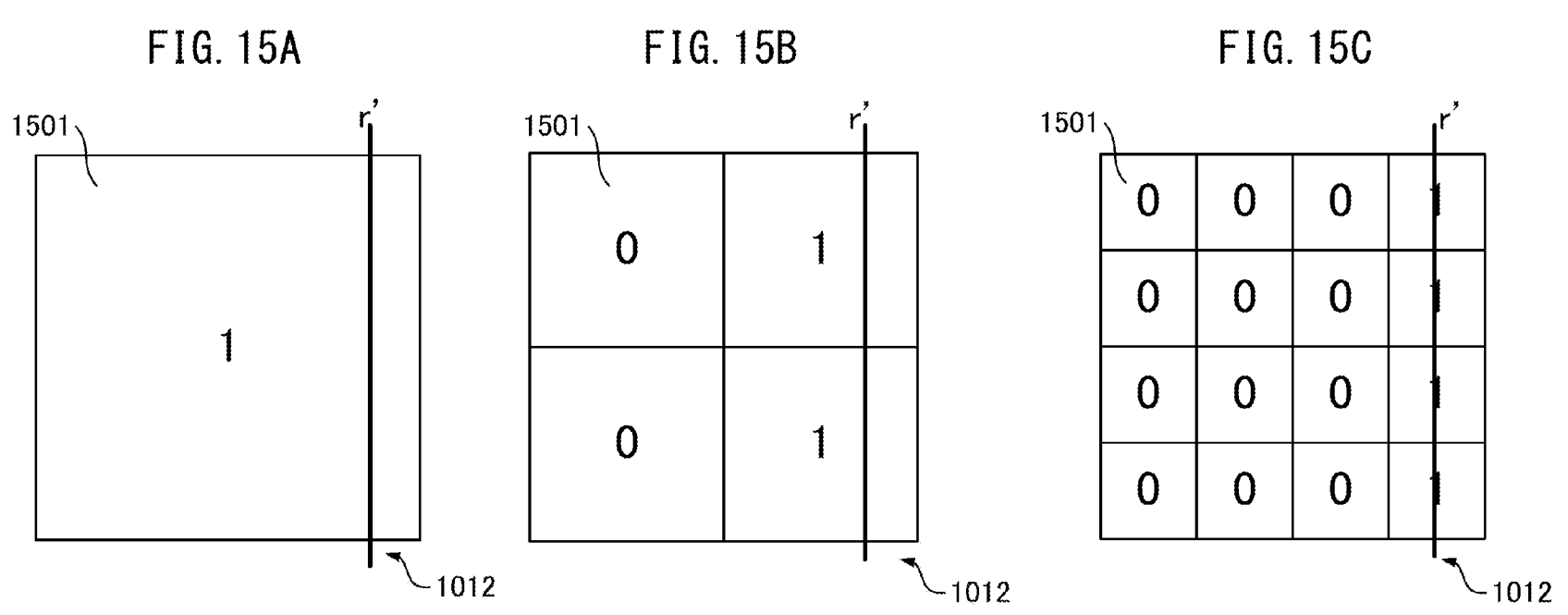
Figures 15D, 15E:
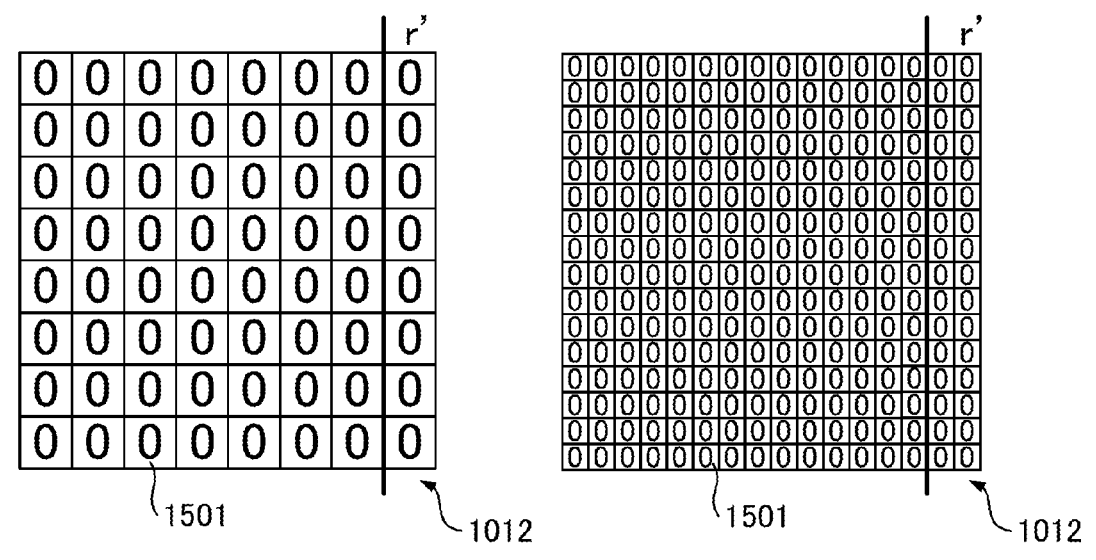

FIGS. 15A to 15E are PU prohibition maps for TU-restriction-target CTUs in the picture at time (t+6) illustrated in FIG. 10, for a PU of 64×64 pixels, PUs of 32×32 pixels, PUs of 16×16 pixels, PUs of 8×8 pixels, and PUs of 4×4 pixels in size, respectively.

FIGS. 16A to 16E are PU prohibition maps for the TU-restriction-target CTUs in the picture at time (t+6) illustrated in FIG. 10, according to a modified example, for a PU of 64×64 pixels, PUs of 32×32 pixels, PUs of 16×16 pixels, PUs of 8×8 pixels, and PUs of 4×4 pixels in size, respectively.

FIGS. 17A to 17D are diagrams illustrating indices of the respective CUs according to the sizes of the CUs.

FIGS. 20A to 20D are drawings illustrating TU prediction-mode-restriction maps for a CTU on the left in the picture at time t illustrated in FIG. 10, for TUs of 32×32 pixels, TUs of 16×16 pixels, TUs of 8×8 pixels, and TUs of 4×4 pixels in size, respectively.

FIGS. 21A to 21D are drawings illustrating TU prediction-mode-restriction maps for a CTU on the right in the picture at time (t+6) illustrated in FIG. 10, for TUs of 32×32 pixels, TUs of 16×16 pixels, TUs of 8×8 pixels, and TUs of 4×4 pixels in size, respectively.

FIG. 23A is a diagram illustrating reference pixels for a block of 8×8 pixels when Prediction mode 0 (intraPlanar) is employed.

FIG. 23B is a diagram illustrating a reference pixels for a block of 8×8 pixels when Prediction mode 1 (intraDC) is employed.

FIGS. 24A to 24D are drawings illustrating TU prediction-mode condition maps for the CTU on the left in the picture at time (t+6) illustrated in FIG. 10, for TUs of 32×32 pixels, TUs of 16×16 pixels, TUs of 8×8 pixels, and TUs of 4×4 pixels in size, respectively.

FIGS. 27A to 27E are drawings illustrating PU prediction-mode condition maps for the CTU on the left in the picture at time (t+6) illustrated in FIG. 10, for a PU of 64×64 pixels, PUs of 32×32 pixels, PUs of 16×16 pixels, PUs of 8×8 pixels, and PUs of 4×4 pixels in size, respectively.

FIG. 28 is a diagram illustrating an example of comparison between the coding cost when PUSIZE=32 and the coding cost when PUSIZE=16, for a CTU on the left in the picture at time (t+6) illustrated in FIG. 10.

FIGS. 32A to 32D are TU prohibition maps for a TU-restriction-target CTU that is adjacent to a CTU including a refresh boundary in the picture at time t illustrated in FIG. 10, for TUs of 32×32 pixels, TUs of 16×16 pixels, TUs of 8×8 pixels, and TUs of 4×4 pixels in size, respectively.

FIGS. 33A to 33D are TU prohibition maps for the CTU on the right in the picture at time (t+6) illustrated in FIG. 10, for TUs of 32×32 pixels, TUs of 16×16 pixels, TUs of 8×8 pixels, and TUs of 4×4 pixels in size, respectively.

FIGS. 35A to 35D are TU prediction-mode-restriction maps that are set according to the second embodiment for the CTU on the right in the picture at time (t+6) illustrated in FIG. 10, for TUs of 32×32 pixels, TUs of 16×16 pixels, TUs of 8×8 pixels, and TUs of 4×4 pixels in size, respectively.

FIGS. 36A to 36D are TU prediction-mode condition maps for the CTU on the right in the picture at time (t+6) illustrated in FIG. 10, for TUs of 32×32 pixels, TUs of 16×16 pixels, TUs of 8×8 pixels, and TUs of 4×4 pixels in size, respectively.

DESCRIPTION OF EMBODIMENTS

Hereinafter, with reference to the drawings, a video encoder according to one embodiment will be described. As described above, it is assumed that the video encoder uses the intra slice structure when an intra-refresh scheme is employed. Specifically, each inter block in a refreshed region is encoded in the inter prediction coding by referring to a preceding encoded picture. For each intra block included in an intra slice adjacent to a refresh boundary, usable prediction modes are restricted so that the intra block would not refer to any pixels locating on the other side of the refresh boundary. The restrictions are used at the time of determining a prediction mode to use.

In particular, in a video coding method in which a coding block is divided into sub-blocks that are variable in size, as in HEVC, restrictions for prediction modes to be used are determined for each size of the sub-blocks in the intra blocks included in the intra-slice.

In the intra prediction coding mode of HEVC, a prediction block for a coding block is created on the basis of neighboring, encoded pixels, as in H.264. The range of pixels to be referred to in generating a prediction block varies according to the size of coding blocks.

Figure 1:
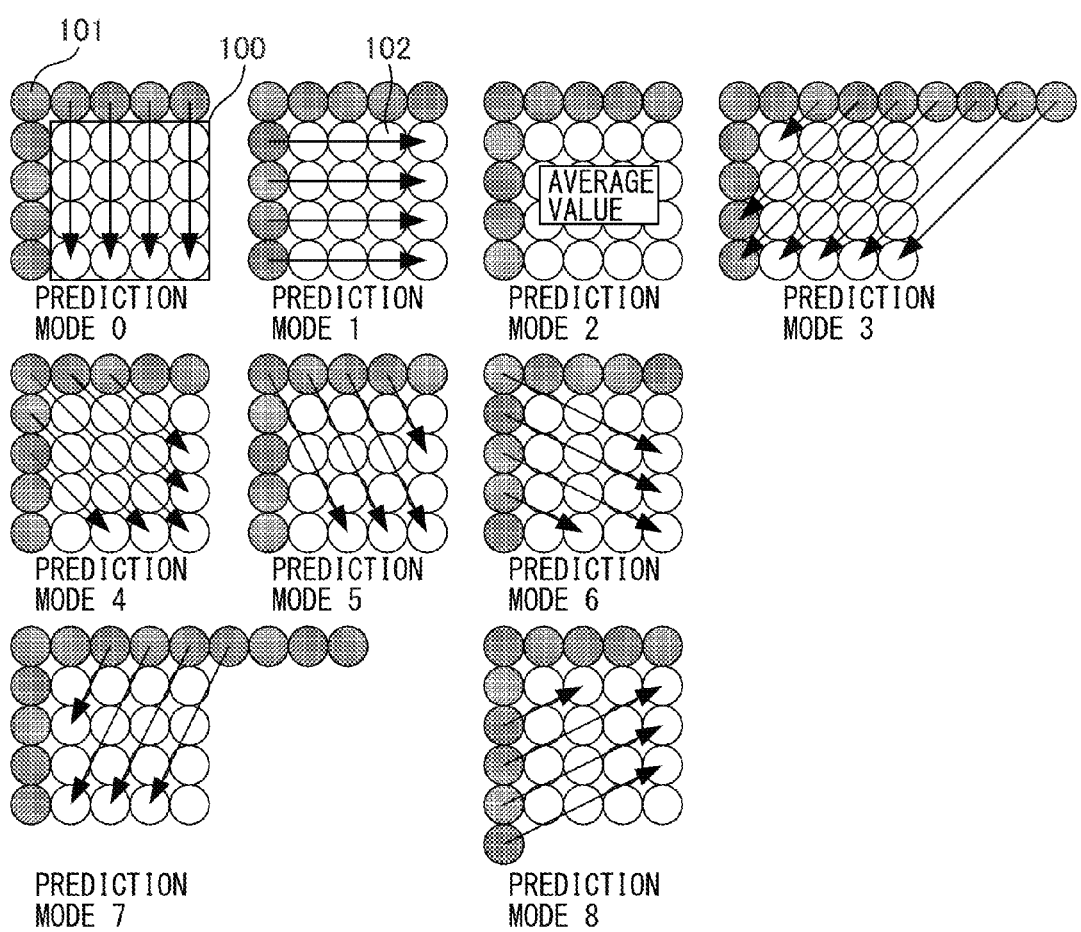
FIG. 1 is a diagram illustrating eight types of prediction modes for a coding block of 4×4 pixels, the prediction modes being defined in H.264.
Figure 2A:
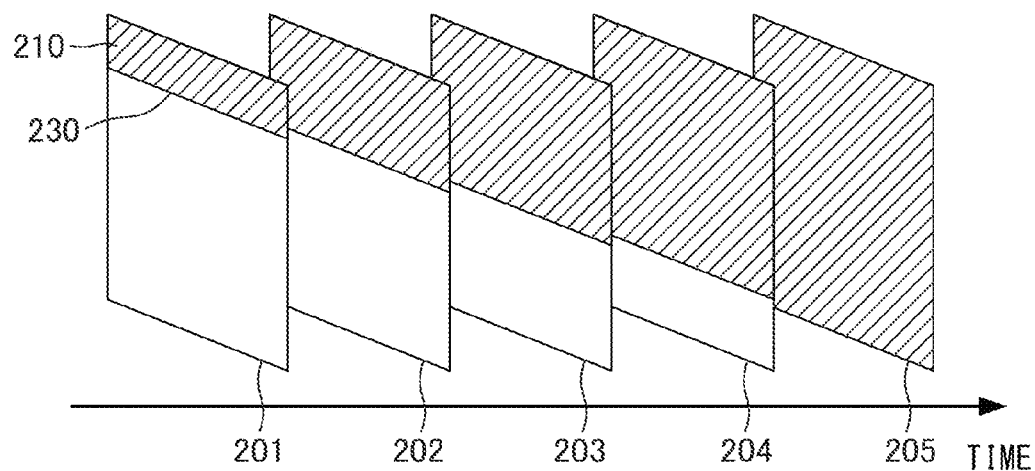
FIG. 2A is a diagram illustrating an example in which a refreshed region increases vertically.
Figure 2B:
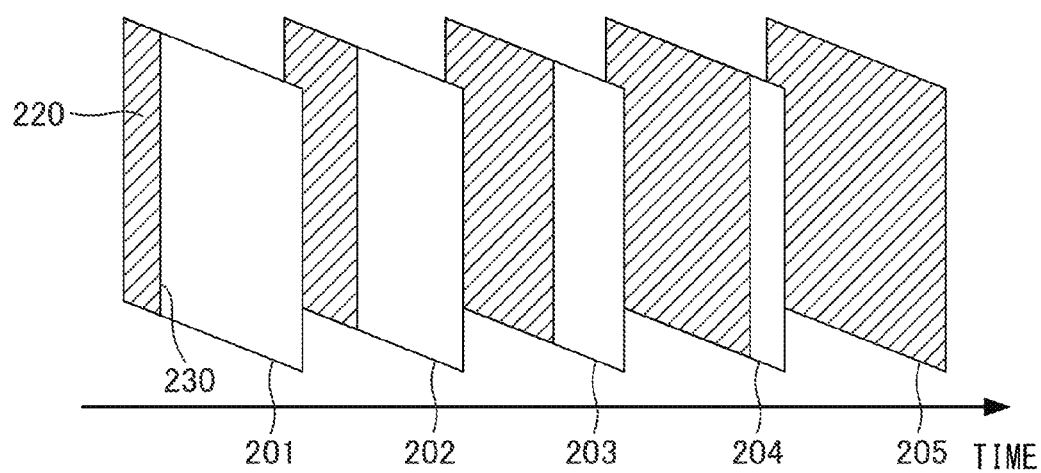
FIG. 2B is a diagram illustrating an example in which a refreshed region increases horizontally.
Figure 3:
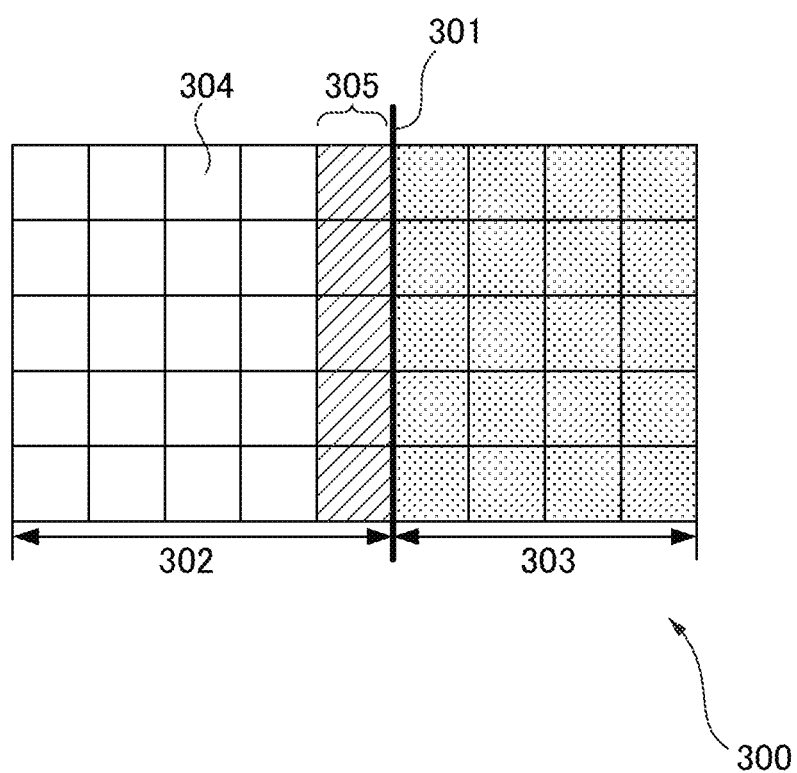
FIG. 3 is a diagram illustrating the relationship between each region of a coding-target picture and a region of an encoded picture that can be referred to, in the intra-refresh scheme.
Figure 4:
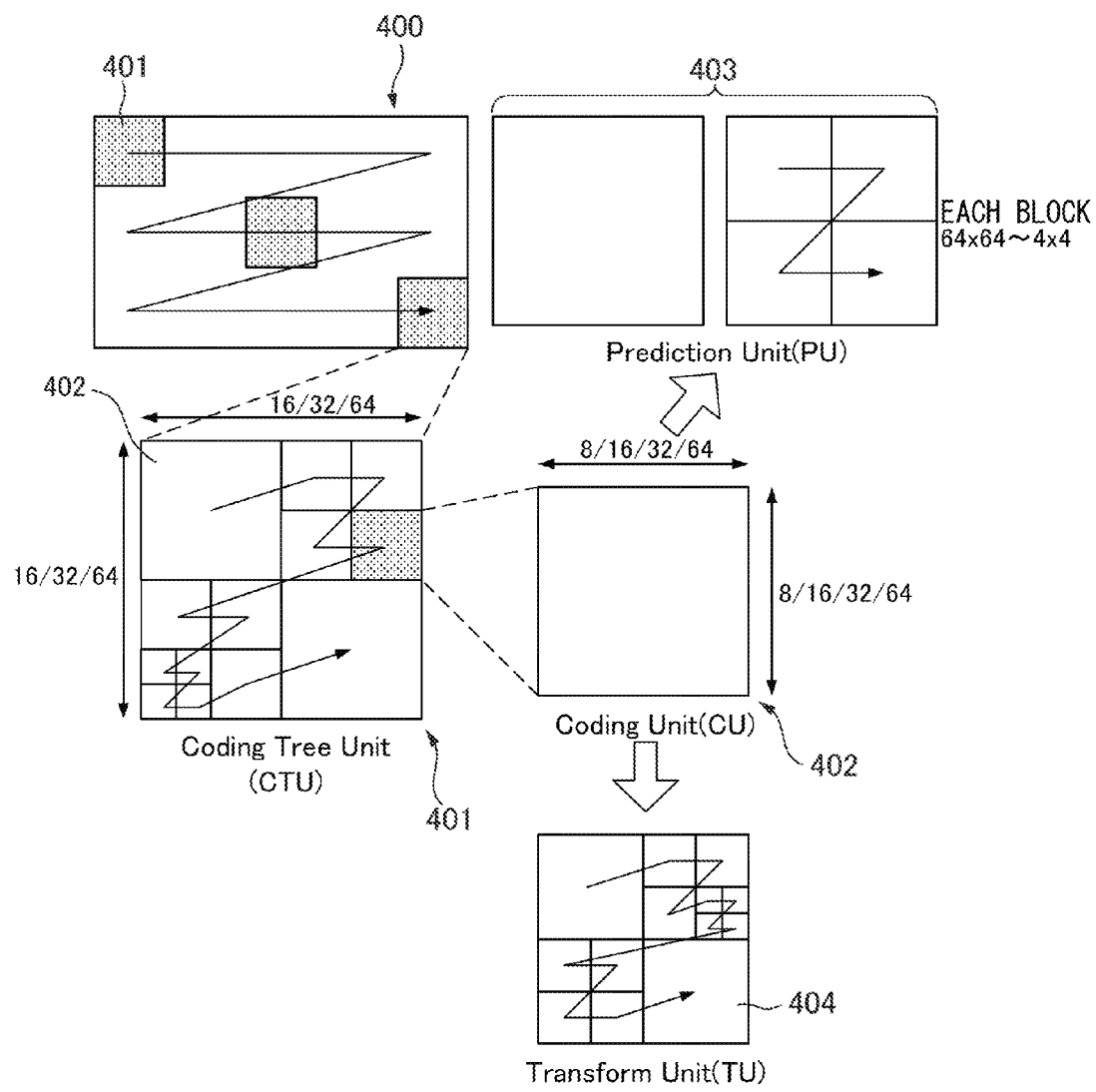
FIG. 4 is a diagram illustrating an example of picture division in HEVC.
Figure 5A:
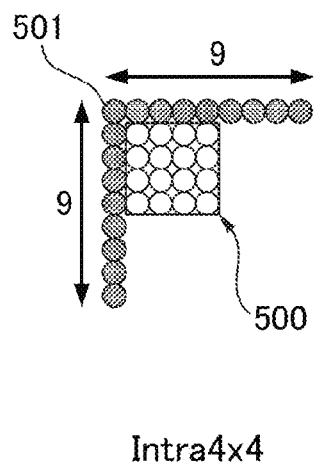
FIGS. 5A to 5C are diagrams illustrating pixels that are referred to in generating prediction blocks, for an intra block of 4×4 pixels, an intra block of 8×8 pixels, and an intra block of 16×16 pixels, respectively.
Figure 5B:
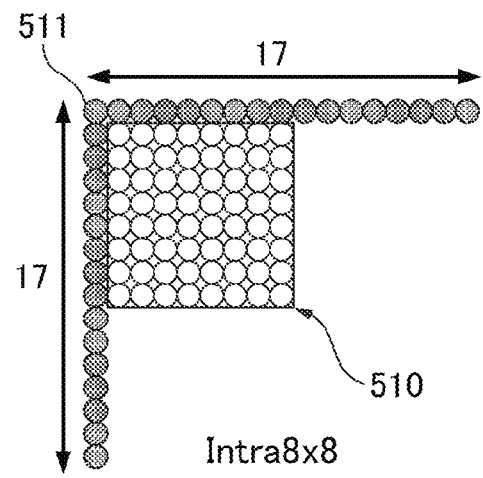
Figure 5C:
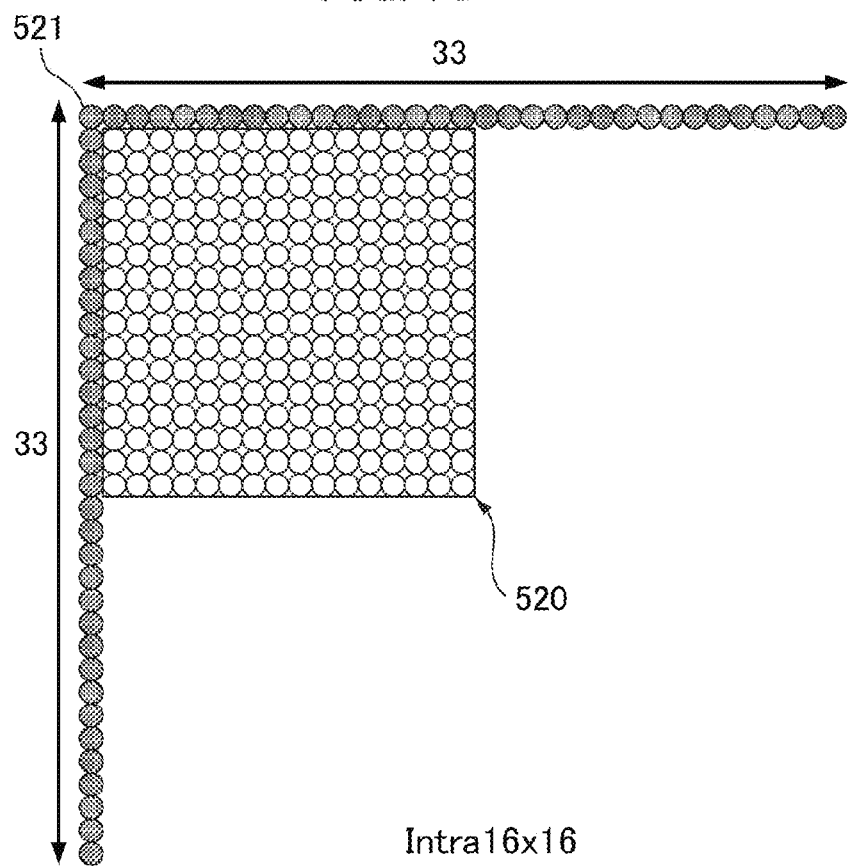

FIGS. 5A to 5C are diagrams illustrating pixels to be referred to in generating prediction blocks for an intra block of 4×4 pixels, an intra block of 8×8 pixels, and an intra block of 16×16 pixels, respectively. As illustrated in FIG. 5A, for an intra block 500 of 4×4 pixels, the nine pixels that are consecutive downward from a pixel 501 locating upper left of the upper left pixel of the intra block 500 and the nine pixels that are consecutive rightward from the pixel 501 may be referred to in generating a prediction block. Similarly, for an intra block 510 of 8×8 pixels, the 17 pixels that are consecutive downward from a pixel 511 locating upper left of the upper left pixel of the intra block 510 and the 17 pixels that are consecutive rightward from the pixel 511 may be referred to in generating a prediction block. For an intra block 520 of 16×16 pixels, the 33 pixels that are consecutive downward from a pixel 521 locating upper left of the upper left pixel of the intra block 520 and the 33 pixels that are consecutive rightward from the pixel 521 may be referred to in generating a prediction block. Similarly, for an intra block of 32×32 pixels, the 65 pixels that are consecutive downward from a pixel locating upper left of the upper left pixel of the intra block and the 65 pixels that are consecutive rightward from the pixel may be referred to in generating a prediction block. The size of each prediction block is equal to the size of the corresponding TU.

Figure 6:
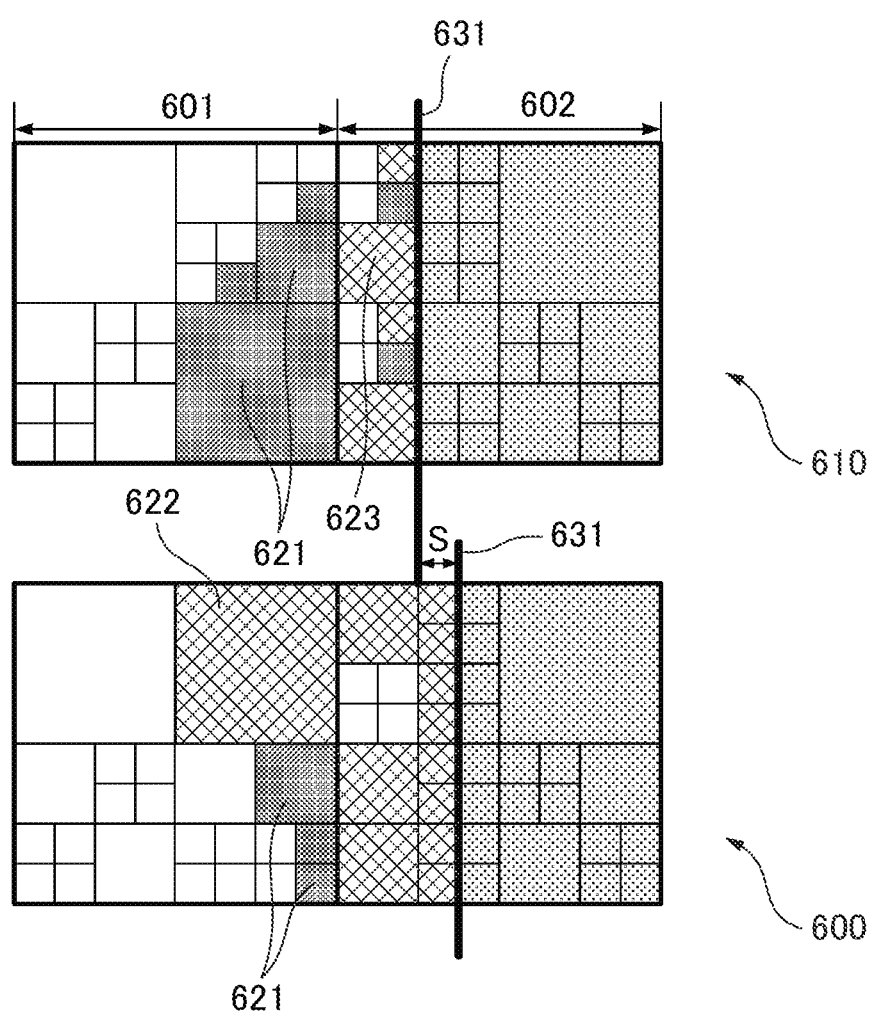
FIG. 6 is a diagram illustrating an example of the positional relationship between a region to be referred to and a refresh boundary, in coding blocks of each picture, in HEVC.

FIG. 6 is a diagram illustrating an example of the positional relationship between a region to be referred to by each coding block and a refresh boundary, in HEVC. For simplicity, assume that each of a coding-target picture 600 and an encoded picture 610 immediately preceding the coding-target picture 600 includes two CTUs 601 and 602. The size of each of the CTUs 601 and 602 is 64×64 pixels. In this example, the CTU 601 on the left is encoded first, and then the CTU 602 on the right is encoded, according to the raster scan order. Each of the CTUs 601 and 602 is divided into a plurality of sub-blocks TU, each of which serves as a unit for generating a prediction block according to the quad-tree structure. The four TUs, which are divided according to the quad-tree structure, are individually encoded in the Z scan order. Accordingly, the upper right block of a TU, e.g., a TU 621, is sometimes not encoded yet at the time of coding of the TU depending on the position of the TU, consequently preventing the TU from referring to the upper right block in generating a prediction block. In such a case, the TU does not refer to the upper right pixel, and uses the value of the rightmost pixel among the pixels that are upward adjacent to the TU and possible to refer to, instead of the value of the upper right pixel, in generating a prediction block.

The coding-target picture 600 and the immediately-preceding, encoded picture 610 are different in terms of the position of a refresh boundary 631, which is a dividing line between a refreshed region and an unrefreshed region. The refresh boundary 631 is shifted in a predetermined direction by a refresh update size S, every picture. However, the video encoder does not need to update the position of the refresh boundary every picture, as long as moving the refresh boundary in the entire picture at a certain cycle. For convenience, the direction in which the refresh boundary shifts, i.e., the direction in which a slice to which the intra-refresh is applied shifts, and is referred to as a refresh direction. For simplicity, it is assumed, in this embodiment, that the position of the refresh boundary is updated every picture.

As described above, each TU included in a refreshed region is prohibited from referring to an unrefreshed region in generating a prediction block. Moreover, for each PU including a TU adjacent to the refresh boundary, the use of prediction modes in which the coding-target TU is to refer to the upper right pixel of the TU as in FIGS. 5A to 5C is prohibited, as in H.264. Further, since the block sizes of TUs, PUs, and the like are variable in HEVC, an unrefreshed region may be referred to in some prediction modes even by PUs each including a TU not adjacent to the refresh boundary. In consideration of such a situation, the video encoder of this embodiment prohibits the use of prediction modes in which an unrefreshed region is referred to, also for such TUs and PUs. In addition, when it is not possible for the coding-target TU to refer to the upper right block of the TU since the upper right block is not encoded as described above, the video encoder does not restrict the use of any prediction modes for the PU including the TU.

Note that a picture may be a frame or a field. A frame is a static image of video data, while a field is a static image obtained by extracting either data of odd-numbered lines or data of even-numbered lines.

In this embodiment, the video encoder uses HEVC as a video coding scheme, and encodes video data by an intra-refresh scheme. In this embodiment, it is assumed that the refresh boundary shifts horizontally. The video encoder does not need to shift the refresh boundary every picture as long as moving the refresh boundary in the entire picture in a certain cycle.

Figure 7:
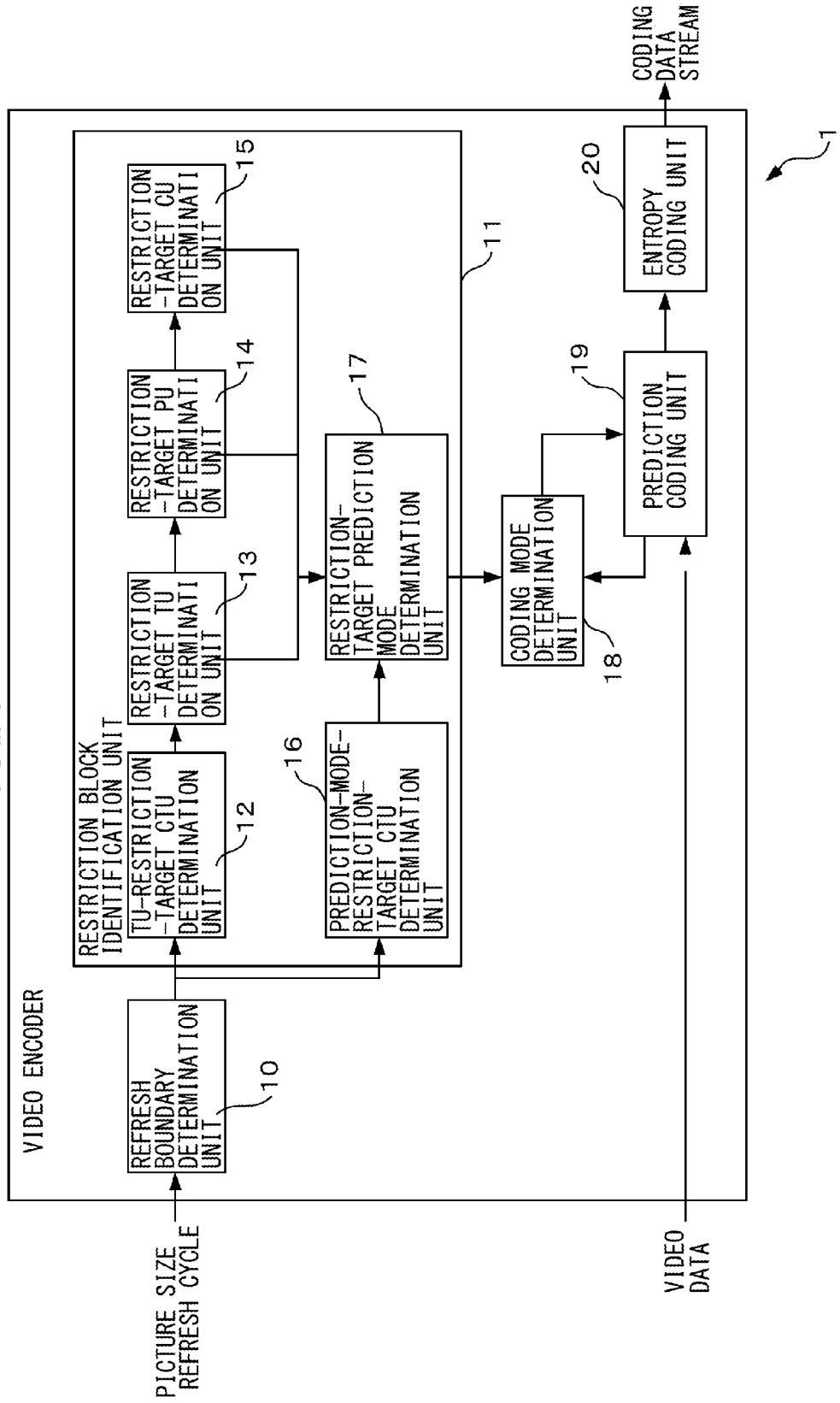
FIG. 7 is a schematic configuration diagram of a video encoder according to one embodiment.

FIG. 7 is a diagram illustrating in simplified form the configuration of the video encoder according to this embodiment. The video encoder 1 includes a refresh boundary determination unit 10, a restriction block identification unit 11, a coding mode determination unit 18, a prediction coding unit 19, and an entropy coding unit 20. Moreover, the restriction-target determination unit 11 includes a TU-restriction-target CTU determination unit 12, a restriction-target TU determination unit 13, a restriction-target PU determination unit 14, a restriction-target CU determination unit 15, a prediction-mode-restriction-target CTU determination unit 16, and a restriction-target prediction mode determination unit 17.

These units included in the video encoder 1 are formed individually as separate circuits. Alternatively, the units included in the video encoder 1 may be mounted on the video encoder 1, as an integrated circuit with the circuits corresponding to the respective units integrated therein. Further, the units included in the video encoder 1 may be function modules that are implemented by a computer program executed on a processor included in the video encoder 1.

A coding-target picture is divided into a plurality of CTUs each having a predetermined number of pixels, by a control unit (not illustrated) that controls the entire video encoder 1, for example. Then, the CTUs are inputted to the video encoder 1 in the raster scan order, for example. Thereafter, the video encoder 1 encodes each CTU. In the following, the units included in the video encoder 1 will be described.

The refresh boundary determination unit 10 determines the position of a refresh boundary in a coding-target picture on the basis of a refresh cycle and the position of the refresh boundary at the time of previous update of the refresh boundary.

The refresh boundary is cyclically shifted so that a refreshed region would cover the entire picture in a predetermined refresh cycle. In this way, when a slice to which the intra-refresh is applied is shifted from one end of a picture to the other end of the picture in the refresh direction, the refreshed region covers the entire picture. Consequently, a video decoder can correctly decode the picture at this state.

A refresh cycle T is expressed by PicWidth/S, where S denotes the refresh update size, which is the size, in the refresh direction, of a slice to which the intra-refresh is applied, and PicWidth denotes the size of the picture in the refresh direction, i.e., the horizontal size of the picture in this example. For example, assume that the refresh update size with respect to a picture on a high definition television (HDTV) with 2K×1K (1920×1080) pixels is denoted by S. In this case, each of the horizontal and vertical resolutions of a picture on an ultra high definition television (UHDTV) with 4K×2K (3840×2160) pixels is twice as high as that of a picture on a HDTV. Hence, to make the refresh cycle T for an UHDTV equal to the refresh cycle for a HDTV, the refresh update size is set at 2*S. Note that the refresh cycle is not limited according to picture resolution.

In general, the refresh cycle T is set in advance, and the control unit (not illustrated) calculates the refresh update size S on the basis of the size of the picture and the refresh cycle T. Then, the control unit notifies the refresh boundary determination unit 10 of the calculated refresh update size S. It is preferable that the refresh update size S be integral multiple of the size of a sub-block, which is a unit for selecting intra prediction, i.e., the smallest possible size of a CU. In HEVC, the CTU size, candidates for the CU size, and candidates for the TU size can be set in advance. For the purpose of illustration, it is assumed, in this example, that the CTU size is 64×64 pixels, candidates for the CU size are 64×64 pixels to 8×8 pixels, and candidates for the TU size are 32×32 pixels to 4×4 pixels. Accordingly, the refresh update size S is set at a multiple of 8, which is the smallest value among the candidates for the CU size. For example, when the refresh update size S (=PicWidth/T) is not a multiple of 8, the refresh update size is rounded so that the refresh update size S would be a multiple of 8.

Figure 8:
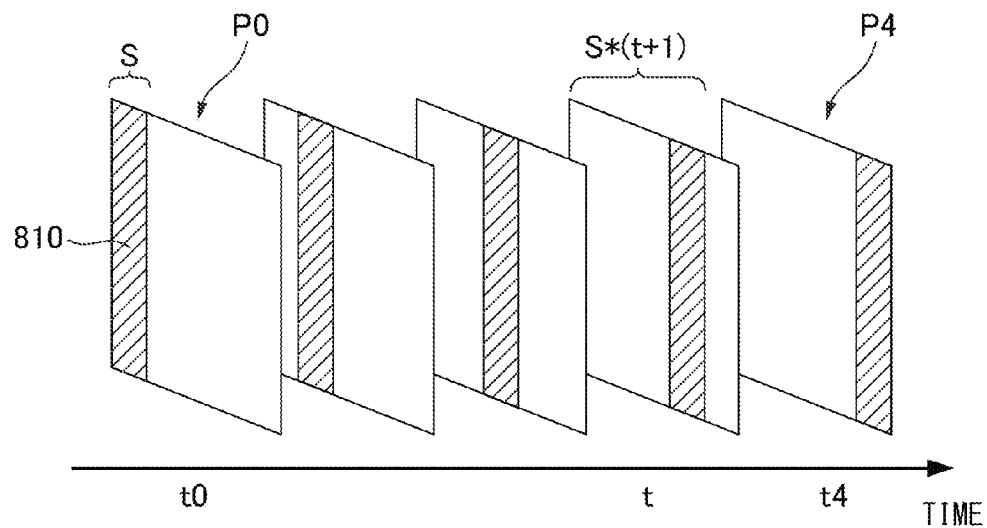
FIG. 8 is a diagram for illustrating a method of determining a position of the refresh boundary.

With reference to FIG. 8, a method of determining the position of a refresh boundary will be described. In FIG. 8, the horizontal axis represents time. In a picture P0 at time t0, a slice 810 (with horizontal width corresponding to the refresh update size S) to which the intra-refresh is applied is locating at the left end of the picture, and shifts to the right end of the picture in a picture P4 at time t4. In this example, the number of pixels in the horizontal direction in each picture is denoted by PicWidth.

The refresh boundary determination unit 10 determines the position of a refresh boundary r on the basis of the position of the refresh boundary in the picture that is immediately preceding the coding-target picture and the refresh update size S so that the refreshed region would extend rightward by the refresh update size S every picture. In this example, the refresh boundary r is represented by the horizontal coordinate of the pixels. By setting the horizontal coordinate system of each picture so that the coordinate of the leftmost pixels would be 0, the refresh boundary r in a beginning picture of the intra-refresh, i.e., the picture P0, is set to be at the position of pixels at the right end of the refreshed region (S−1). Similarly, in a picture Pt, the refresh boundary r is set at the position of the pixels at the right end of the refreshed region {S*(t+1)−1}. For the purpose of illustration, the position of the refresh boundary in the picture Pt is denoted by r(t) below. Moreover, for the illustration purpose, the position of the pixels at the left end of an unrefreshed region is denoted by R(=r+1).

The restriction block identification unit 11 identifies, for each possible TU size, TUs each of which is included in the refreshed region of the coding-target picture and has a possibility of referring to an unrefreshed region when the TU is encoded in the intra prediction coding, on the basis of the position of the refresh boundary r. Then, the restriction block identification unit 11 restricts, for each of the identified TUs, usable prediction modes so that the TU would not refer to any unrefreshed region. Further, to prevent the use of any TU including the refresh boundary, the restriction block identification unit 11 identifies each TU including the refresh boundary, as a TU the use of which is to be prohibited, for each possible TU size. For this purpose, the restriction block identification unit 11 includes the TU-restriction-target CTU determination unit 12, the restriction-target TU determination unit 13, the restriction-target PU determination unit 14, the restriction-target CU determination unit 15, the prediction-mode-restriction-target CTU determination unit 16, and the restriction-target prediction mode determination unit 17.

The TU-restriction-target CTU determination unit 12 determines a CTU including any TU that is to refer to an unrefreshed region in any of the prediction modes, i.e., any TU for which the use of any of the prediction modes is prohibited, on the basis of the position of the refresh boundary r in the coding-target picture. In the following, each CTU including a TU for which the use of any of the prediction modes is prohibited is referred to as a TU-restriction-target CTU.

Figure 9:
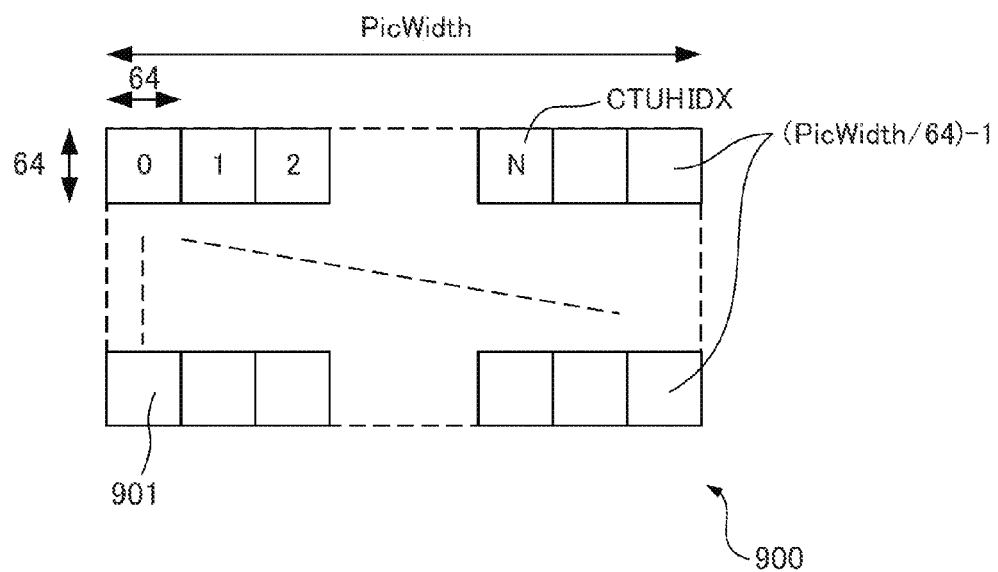
FIG. 9 is a diagram illustrating a method of assigning indices to respective CTUs.

To facilitate understanding of the method of identifying a TU-restriction-target CTU, indices assigned to the respective CTUs for the identification of the CTUs will be described with reference to FIG. 9. In FIG. 9, a picture 900 is divided into a plurality of CTUs 901. In this example, a CTU size CTUSIZE is assumed to be 64 pixels. As described above, the plurality of CTUs included in a picture are encoded in the raster scan order. For this reason, indices CTUIDX for identifying the respective CTUs are set in the order of coding. On the assumption that the refresh boundary shifts from the left end of the picture to the right end of the picture, indices CTUHIDX for the respective CTUs presented in the respective CTUs 901 are assigned to the CTUs in the horizontal direction from the leftmost CTU. Specifically, the index CTUHIDX for the leftmost CTU is 0, and the index CTUHIDX for the (N+1)-th CTU counted from the leftmost CTU is N. The index CTUHIDX for the rightmost CTU is (PicWidth/CTUSIZE)−1. Similarly, indices CTUVIDX are set at 0, 1, . . . , and then {(PicHeight/CTUSIZE)−1} for the respective CTUs in the vertical direction. PicWidth and PicHeight represent the horizontal size and the vertical size of the picture, respectively.

Figure 10:
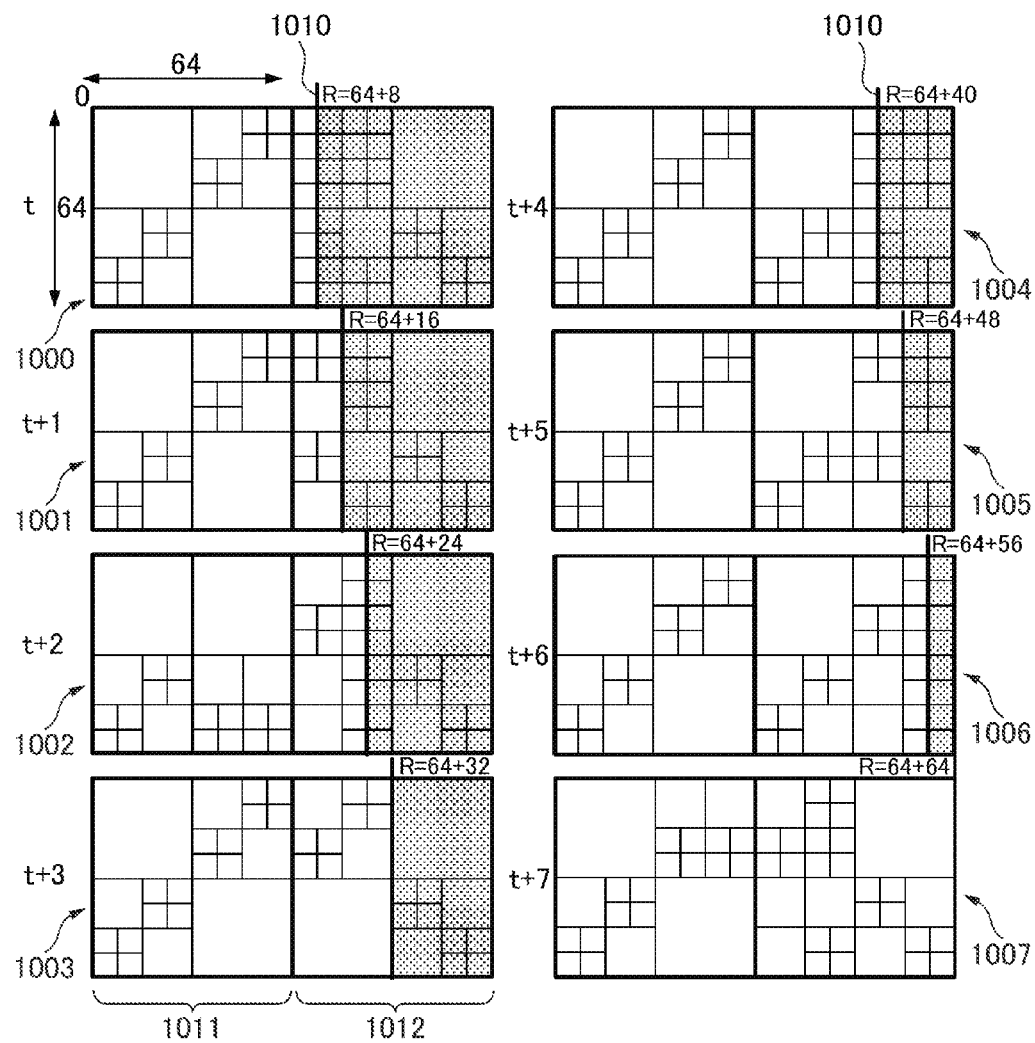
FIG. 10 is a diagram illustrating the relationship between the position of a refresh boundary and each TU-restriction-target CTU.

FIG. 10 is a diagram illustrating the relationship between the position of the refresh boundary and a TU-restriction-target CTU. For simplicity, each picture is assumed to include two CTUs 1011 and 1012 in FIG. 10. In this example, a refresh boundary 1010 shifts the entire CTU 1012 on the right once, from a picture 1000 at time t to a picture 1007 at time (t+7).

When the position of the refresh boundary 1010 is the same as the dividing line between two adjacent CTUs (the picture 1007 at time (t+7) in this example), i.e., when R % CTUSIZE=0, the TU-restriction-target CTU determination unit 12 does not determine any of the CTUs to be a TU-restriction-target CTU. This is because, when the position of the refresh boundary and the position of the dividing line between CTUs are the same, no TU that includes the refresh boundary exists. By contrast, when the position of the refresh boundary 1010 is not the same as the position of the dividing line between any two adjacent CTUs (all the pictures except the picture at time (t+7) in this example), the TU-restriction-target CTU determination unit 12 determines the CTU including the refresh boundary 1010, i.e., the CTU having the index CTUHIDX=r/CTUSIZE, as a TU-restriction-target CTU, where the sign "/" represents round-down division (i.e., integer division). For example, in FIG. 10, since the position of the refresh boundary r shifts in the range of 64≤r≤128 with time in the period from time t to time (t+6), the CTU 1012 having the index CTUHIDX=1 is determined as a TU-restriction-target CTU.

Figure 11:
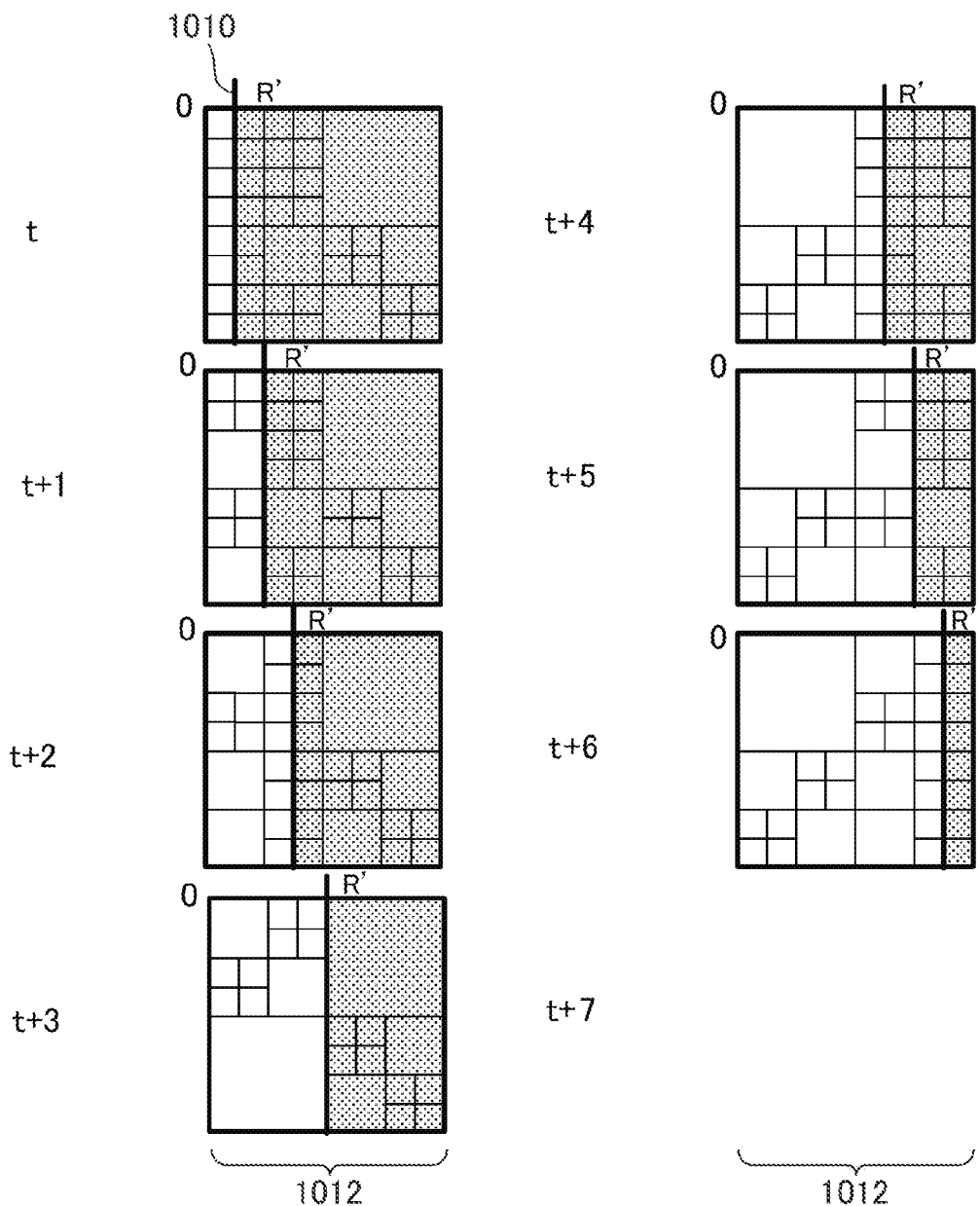
FIG. 11 is a diagram illustrating the TU-restriction-target CTUs.
Figure 18A:
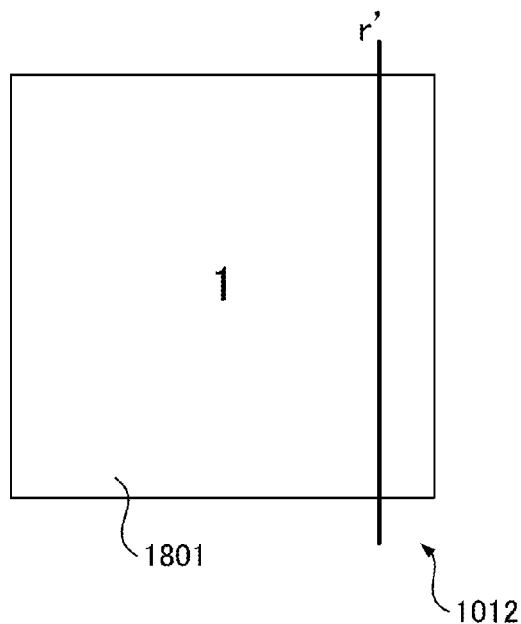
FIGS. 18A to 18D are CU prohibition maps for TU-restriction-target CTUs in the picture at time (t+6) illustrated in FIG. 10, for CUs of 64×64 pixels, CUs of 32×32 pixels, CUs of 16×16 pixels, and CUs of 8×8 pixels in size, respectively.
Figure 18B:
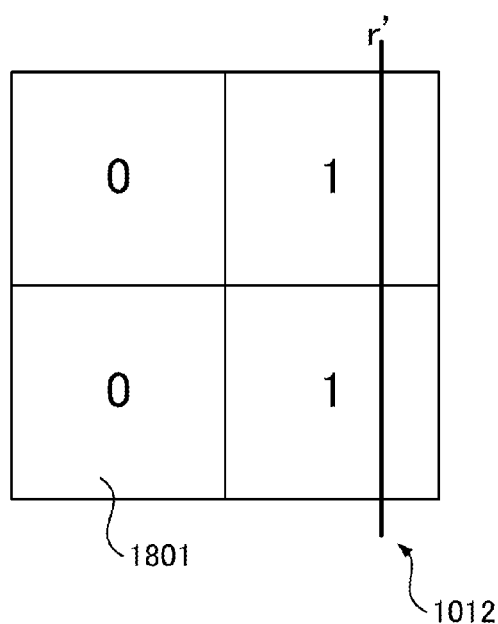
Figure 18C:
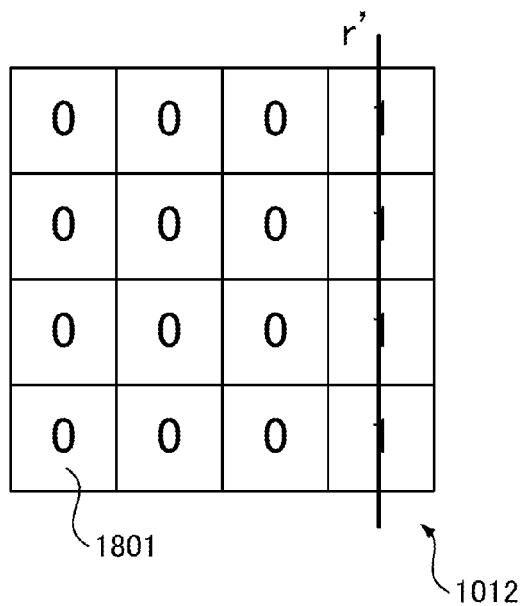
Figure 18D:
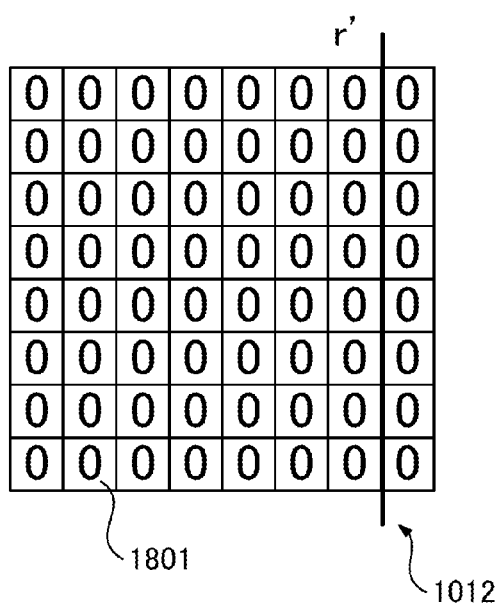

FIG. 11 is a diagram illustrating a TU-restriction-target CTU. In all the pictures except the picture at time (t+7), the CTU 1012 is determined as a TU-restriction-target CTU. In the TU-restriction-target CTU 1012, the region on the right of the refresh boundary 1010 is an unrefreshed region, while the region on the left of the refresh boundary 1010 is a refreshed region.

For the purpose of illustration below, a coordinate system having, as the origin, the left end of a TU-restriction-target CTU will be defined. When the position of the pixel included in the unrefreshed region and being adjacent to the refresh boundary in this coordinate system is denoted by R', R' is defined as follows: R'=R−(R/CTUSIZE)*CTUSIZE. Moreover, when the position of the pixel included in the refreshed region and being adjacent to the refresh boundary in this coordinate system is denoted by r', r' is defined as follows: r'=R'−1.

The restriction-target TU determination unit 13 prohibits, for each of a plurality of possible TU sizes, the use of each TU including the refresh boundary in the TU-restriction-target CTU. Moreover, the restriction-target TU determination unit 13 determines each TU with the position of the dividing line between the TU and an adjacent TU being the same as the position of the refresh boundary, as a usable TU. For convenience, a TU the use of which is prohibited will be referred to as a prohibition-target TU below.

In HEVC, each TU can be selected from a maximum block of 32×32 pixels, and a block of 16×16 pixels, 8×8 pixels, and 4×4 pixels, which are set according to the quad-tree structure. This represents the hierarchical structure of the TU sizes. To enable the coding mode determination unit 18 to determine a TU size to use, the restriction-target TU determination unit 13 determines, for each TU size, whether each TU in the size is prohibited or possible to use.

With reference to FIGS. 12A to 12D, TU indices TUIDX to be assigned to the respective TUs of each TU size for identifying the TUs will be described. In FIGS. 12A to 12D, each block 1021 represents a TU, and the numerical value in the block 1201 represents the TU index TUIDX of the block 1201. Moreover, each of the numerical values presented above the blocks 1201 represents a horizontal TU index TUHIDX for the blocks 1201 locating under the value. FIG. 12A illustrates the indices TUIDX when the TU size is 32×32 pixels. Similarly, FIGS. 12B to 12D illustrate the indices TUIDX when the TU sizes are 16×16 pixels, 8×8 pixels, and 4×4 pixels, respectively.

The TU indices TUIDX are assigned to the blocks 1201 according to the order of coding. In addition, since the refresh boundary is assumed to shift from the left end of the picture to the right end of the picture in this embodiment, the horizontal TU indices TUHIDX, which are indices for TUs in the horizontal direction, are assigned to the TUs in the horizontal direction from the leftmost TU to the rightmost TU.

First, the restriction-target TU determination unit 13 checks, for each of the four TUs each having 32×32 pixels in a TU-restriction-target CTU, whether or not the refresh boundary is included in the TU. When the refresh boundary is included in the TU, the restriction-target TU determination unit 13 prohibits the use of the TU of 32×32 pixels. By contrast, when the refresh boundary is not included in the TU, the restriction-target TU determination unit 13 allows the use of the TU of 32×32 pixels.

Then, the restriction-target TU determination unit 13 checks, for each of the four TUs each having of 16×16 pixels in the TU of 32×32 pixels the use of which is prohibited, whether or not the refresh boundary is included in the TU. When the refresh boundary is included in the TU, the restriction-target TU determination unit 13 prohibits the use of the TU of 16×16 pixels. By contrast, when the refresh boundary is not included in the TU, the restriction-target TU determination unit 13 allows the use of the TU of 16×16 pixels. The use of each TU having a size of 8×8 pixels or smaller is always allowed, since the refresh update size is 8 or larger. In other words, when R'% TUSIZE=0 (i.e., the refresh boundary and the TU dividing line are the same) assuming that TUSIZE=32, 16, where the operator "%" represents the remainder of division, the restriction-target TU determination unit 13 allows the use of all the TUs having any of the sizes TUSIZE. By contrast, when the position of the refresh boundary and the position of the TU dividing line are not the same, the restriction-target TU determination unit 13 prohibits the use of each TU having the index TUHIDX=r'/TUSIZE.

In terms of the processing order, the restriction-target TU determination unit 13 may check, for each of the four blocks of 16×16 pixels included in a TU of 32×32 pixels, whether or not the refresh boundary is included in the TU, and then check, for the next TU of 32×32 pixels, whether or not the refresh boundary is included in the TU. Alternatively, the restriction-target TU determination unit 13 may check, for each of the four TUs of 32×32 pixels, whether or not the refresh boundary is included in the TU, and then check, for each of the 16 TUs of 16×16 pixels, whether or not the refresh boundary is included in the TU.

The restriction-target TU determination unit 13 generates, for each TU size, a TU prohibition map presenting usable TUs and TUs the use of which is prohibited, by setting, for each TU, a TU prohibition flag indicating whether or not the TU is a prohibition-target TU.

FIGS. 13A to 13D are TU prohibition maps for the TU-restriction-target CTU 1012 of the picture at time (t+6) illustrated in FIG. 10, for TUs of 32×32 pixels, TUs of 16×16 pixels, TUs of 8×8 pixels, and TUs of 4×4 pixels in size, respectively. Each block 1301 represents a TU. In each TU, a TU prohibition flag indicating whether or not the TU is a prohibition-target TU is presented. When the value of the TU prohibition flag is "0," the TU is not a prohibition-target TU. By contrast, when the value of the TU prohibition flag is "1," the TU is a prohibition-target TU. As illustrated in FIGS. 13A to 13D, only the TUs each being larger than the refresh update size (8 pixels) and including the refresh boundary r' are set as prohibition-target TUs.

The restriction-target PU determination unit 14 restricts usable PU sizes among the candidates for the size of each PU including a prohibition-target TU so that at least the TU size would be smaller than or equal to the determined PU size.

As described above, in HEVC, the PU size is restricted so that the size PUSIZE would be larger than or equal to the size TUSIZE. In this example, the PU size can be selected from among 64, 32, 16, 8, and 4 pixels. By restricting the candidates for the usable PU size within the range satisfying PUSIZE≥TUSIZE, the restriction-target PU determination unit 14 can also restrict the candidates for the usable TU size.

In HEVC, each PU can be selected from among a maximum block of 64×64 pixels, and a block of 32×32 pixels, a block of 16×16 pixels, a block of 8×8 pixels, and a block of 4×4 pixels, which are set according to the quad-tree structure. This represents the hierarchical structure of the PU sizes. To enable the coding mode determination unit 18 to determine a PU size to use, the restriction-target PU determination unit 14 determines, for each PU size, whether each PU in the size is prohibited or usable.

First, PU indices PUIDX for identifying the respective PUs and horizontal indices PUHIDX of the PUs in the horizontal direction will be described.

FIGS. 14A to 14E are diagrams illustrating the PU indices PUIDX for the respective PUs and the horizontal PU indices PUHIDX for the respective PUs in the horizontal direction, for the respective PU sizes. In FIGS. 14A to 14E, each block 1401 represents a PU, and the numerical value in the block 1401 represents the PU index PUIDX for the block 1401. Moreover, each of the numerical values presented above the blocks 1401 represents the horizontal index PUHIDX for the blocks 1401 under the value. FIG. 14A illustrates the PU indices PUIDX when the PU size is 64×64 pixels. Similarly, FIGS. 14B to 14E illustrates the PU indices PUIDX when the PU sizes are 32×32 pixels, 16×16 pixels, 8×8 pixels, and 4×4 pixels, respectively.

The PU indices PUIDX are assigned to the blocks 1401 according to the order of coding. In addition, since the refresh boundary is assumed to shift from the left end of the picture to the right end of the picture in this embodiment, the horizontal PU indices PUHIDX are assigned to the PUs in the horizontal direction from the leftmost PU to the rightmost PU.

The restriction-target PU determination unit 14 restricts the candidates for the usable PU size so that the PU size to use would be larger than or equal to the largest TU size determined to be usable. For convenience, each PU the use of which is prohibited will be referred to as a restriction-target PU below.

To reduce the processing amount, it is preferable that the restriction-target PU determination unit 14 restrict the usable PU sizes to be those that are smaller than or equal to the largest TU size determined to be usable. By narrowing down the selection range for the usable PU sizes in consideration of the usable TU sizes, the operation amount at the time of determining a coding mode is reduced.

The restriction-target PU determination unit 14 generates, for each PU size, a PU prohibition map indicating the usable PUs and PUs the use of which is prohibited, by setting, for each PU, a PU prohibition flag indicating whether or not the PU is a restriction-target PU.

FIGS. 15A to 15E are PU prohibition maps indicating restriction-target PUs in the TU-restriction-target CTU 1012 of the picture at time (t+6) illustrated in FIG. 10, respectively for a PU of 64×64 pixels, PUs of 32×32 pixels, PUs of 16×16 pixels, PUs of 8×8 pixels, and PUs of 4×4 pixels in size. Each block 1501 represents a PU. In each PU, a PU prohibition flag indicating whether or not the PU is a restriction-target PU is presented. When the value of the PU prohibition flag is "0," the PU is not a restricted PU. By contrast, when the value of the PU prohibition flag is "1," the PU is a restricted PU. As illustrated in FIGS. 15A to 15E, the PU prohibition maps for the PUs each having a size of 32×32 pixels or smaller are the same as the TU prohibition maps illustrated in FIGS. 13A to 13D.

Each PU is usable as long as including at least one usable TU. Hence, according to a modified example, the restriction-target PU determination unit 14 may prohibit the use of all the PUs except for those having the same size as the largest usable TU size.

FIGS. 16A to 16E are PU prohibition maps, according to the modified example, indicating restriction-target PUs in the TU-restriction-target CTU 1012 of the picture at time (t+6) illustrated in FIG. 10, respectively for a PU of 64×64 pixels, PUs of 32×32 pixels, PUs of 16×16 pixels, PUs of 8×8 pixels, and PUs of 4×4 pixels in size. Each block 1601 represents a PU. In each PU, a PU prohibition flag is presented. As illustrated in FIG. 13A, the use of the TUs in the left half of the TU-restriction-target CTU is allowed. Accordingly, as illustrated in FIGS. 16B to 16E, only the use of PUs each having a size of 32×32 pixels is allowed in the left half of the TU-restriction-target CTU. Meanwhile, as illustrated in FIG. 13B, the use of TUs each having a size of 16×16 pixels at maximum is allowed in the range of a quarter of the TU-restriction-target CTU from the center to the right of the TU-restriction-target CTU. Accordingly, as illustrated in FIGS. 16B to 16E, only the use of PUs each having a size of 16×16 pixels is allowed in the range of the quarter from the center to the right of the TU-restriction-target CTU. Moreover, as illustrated in FIG. 13C, the use of TUs each having a size of 8×8 pixels at maximum is allowed in the range of the rightmost quarter of the TU-restriction-target CTU. Accordingly, as illustrated in FIGS. 16B to 16E, only the use of PUs each having a size of 8×8 pixels is allowed in the range of the rightmost quarter of the TU-restriction-target CTU.

The restriction-target PU determination unit 14 may set the value of the PU prohibition flag at "0" for each of all the candidates for the PU size. In this case, the coding mode determination unit 18 to be described later is to determine a PU size and a coding mode to use, in consideration of all the PU sizes.

The restriction-target CU determination unit 15 restricts usable CU sizes among a plurality of possible CU sizes so that the size of each PU including a usable TU would be smaller than or equal to a CU size to use. As described above, in HEVC, the CU size CUSIZE is restricted so that size CUSIZE would be larger than or equal to the size PUSIZE. In this example, each CU can be selected from among a block of 64×64 pixels, a block of 32×32 pixels, a block of 16×16 pixels, and a block of 8×8 pixels. Note that, in the intra prediction coding mode, the size CUSIZE is equal to the size PUSIZE when CUSIZE=64, 32, 16, while the size PUSIZE can be selected from 8 and 4 when CUSIZE=8. The restriction-target CU determination unit 15 restricts the CU sizes to satisfy the above condition.

Each CU can be selected from among the largest block of 64×64 pixels, and a block of 32×32 pixels, a block of 16×16 pixels, and a block of 8×8 pixels, which are set according to the quad-tree structure. This represents the hierarchical structure of the CU sizes. To enable the coding mode determination unit 18 to be described later to determine a CU size to be used, the restriction-target CU determination unit 15 determines, for each CU size, whether the CU in the size is prohibited or usable.

First, CU indices CUIDX for identifying the respective CUs and horizontal CU indices CUHIDX of the CUs in the horizontal direction will be described.

FIGS. 17A to 17D are diagrams illustrating the CU indices CUIDX for the respective CUs and the horizontal CU indices CUHIDX for the respective PU sizes. In FIGS. 17A to 17D, each block 1701 represents a CU, and the numerical value in the block 1701 represents the CU index CUIDX for the block 1701. Moreover, the numerical values presented above the blocks 1701 represents the horizontal CU index CUHIDX of the blocks 1701 under the value. FIG. 17A illustrates the CU indices CUIDX when the CU size is 64×64 pixels. Similarly, FIGS. 17B to 17D illustrate the CU indices CUIDX when the CU sizes are 32×32 pixels, 16×16 pixels, and 8×8 pixels, respectively.

The CU indices CUIDX are assigned to the blocks 1701 according to the order of coding. In addition, since the refresh boundary is assumed to shift from the left end of the picture to the right end of the picture in this embodiment, the horizontal CU indices CUHIDX are assigned to the CUs in the horizontal direction from the leftmost CU to the rightmost CU.

The restriction-target CU determination unit 15 restricts usable CU sizes so that the usable CU sizes would be at least larger than or equal to the largest usable TU size.

To reduce the processing amount, it is preferable that the restriction-target CU determination unit 15 restrict the usable CU sizes to those that are smaller than or equal to the largest TU size. By narrowing down the selection range for the usable CU sizes in consideration of the usable TU sizes, the operation amount at the time of determining a coding mode is reduced.

The restriction-target CU determination unit 15 generates, for each CU size, a CU prohibition map indicating the usable CUs and CUs the use of which is prohibited, by setting, for each CU, a CU prohibition flag indicating whether or not the CU is a restriction-target CU.

FIGS. 18A to 18D are CU prohibition maps for the TU-restriction-target CTU 1012 of the picture at time (t+6) illustrated in FIG. 10, respectively for a CU of 64×64 pixels, CUs of 32×32 pixels, CUs of 16×16 pixels, and CUs of 8×8 pixels in size. Each block 1801 represents a CU. In each CU, a CU prohibition flag indicating whether or not the CU is a restriction-target CU is presented. When the value of the CU prohibition flag is "0", the CU is not a restriction-target CU. By contrast, when the value of the CU prohibition flag is "1", the CU is a restriction-target CU.

Each CU is usable as long as including at least one usable TU. Hence, as the restriction-target PU determination unit 14 in the modified example, the restriction-target CU determination unit 15 may prohibit the use of all the CUs except for those having the same size as the largest usable TU size.

In HEVC, when CU sizes are restricted, PU sizes are also restricted on the basis of the relationship between the CU size and the PU size. Alternatively, when CU sizes usable in the intra prediction coding mode are restricted, CU sizes usable in the inter prediction coding mode may be similarly restricted. Since PU sizes are restricted when CU sizes are restricted only in the intra prediction coding mode, only the PUs determined to be usable in the inter prediction coding mode may be selected for each CU including a PU the use of which is prohibited in the intra prediction coding mode, in some cases. However, it is possible for the video encoder 1 to prevent the occurrence of a CU in which only PUs in the inter prediction coding mode can be selected, by restricting CU sizes also in the inter prediction coding mode.

Note that the restriction-target CU determination unit 15 may set the value of the CU prohibition flag at "0" for each of all the candidates for the CU size. In this case, the coding mode determination unit 18 to be described later is to determine a CU size and a coding mode to use, in consideration of all the CU sizes.

The prediction-mode-restriction-target CTU determination unit 16 determines a CTU including a PU that is to refer to an unrefreshed region in any of the prediction modes, i.e., a PU for which the use of any of the prediction modes is prohibited, on the basis of the position of the refresh boundary in the coding-target picture. For the illustration purpose, a CTU including a PU for which the use of any of the prediction modes is prohibited will be referred to as a prediction-mode-restriction-target CTU.

The process carried out by the prediction-mode-restriction-target CTU determination unit 16 will be described with reference to FIG. 10 again. When the position of the refresh boundary 1010 is the same as the position of the CTU dividing line as in the picture 1007 at time (t+7), the prediction-mode-restriction-target CTU determination unit 16 determines the CTU that is included in the refreshed region and is adjacent to the refresh boundary (i.e., the CTU 1012 in this example) as a prediction-mode-restriction-target CTU.

By contrast, when the position of the refresh boundary is different from the position of the CTU dividing line and a refreshed region that is larger than or equal to the largest usable TU size is included in the CTU including the refresh boundary, the prediction-mode-restriction-target CTU determination unit 16 determines the CTU including the refresh boundary as a prediction-mode-restriction-target CTU. In FIG. 10, each of the pictures 1003 to 1006 at time (t+3) to time (t+6) correspond to the above-described case, and the CTU 1012 including the refresh boundary 1010 is determined as a prediction-mode-restriction-target CTU.

Moreover, when the position of the refresh boundary is different from the position of the CTU dividing line and a refreshed region that is larger than or equal to the largest usable TU size is not included in the CTU including the refresh boundary, the prediction-mode-restriction-target CTU determination unit 16 determines each of the CTU including the refresh boundary and the CTU adjacent to the refreshed region of the CTU including the refresh boundary, as a prediction-mode-restriction-target CTU. In FIG. 10, each of the pictures 1000 to 1002 at time t to time (t+2) correspond to the above-described case, and each of the CTU 1012 including the refresh boundary 1010 and the CTU 1011 is determined as a prediction-mode-restriction-target CTU.

Specifically, when R % CTUSIZE=0, a CTU that satisfies CTUHIDX=r/CTUSIZE is determined as a prediction-mode-restriction-target CTU. By contrast, when R % CTUSIZE≠0, a CTU that satisfies CTUHIDX=r/CTUSIZE is determined as a prediction-mode-restriction-target CTU. Moreover, when R % CTUSIZE≠0 and R−P<MAXTUSIZE=32 (where P denotes the coordinate of the left end of the CTU including the refresh boundary, and P=(R/CTUSIZE)*CTUSIZE), a CTU that satisfies CTUHIDX={(r/CTUSIZE)−1} is determined as a prediction-mode-restriction-target CTU. In this example, the index CTUHIDX is assumed to satisfy the following: CTUHIDX≥0.

Figure 19:
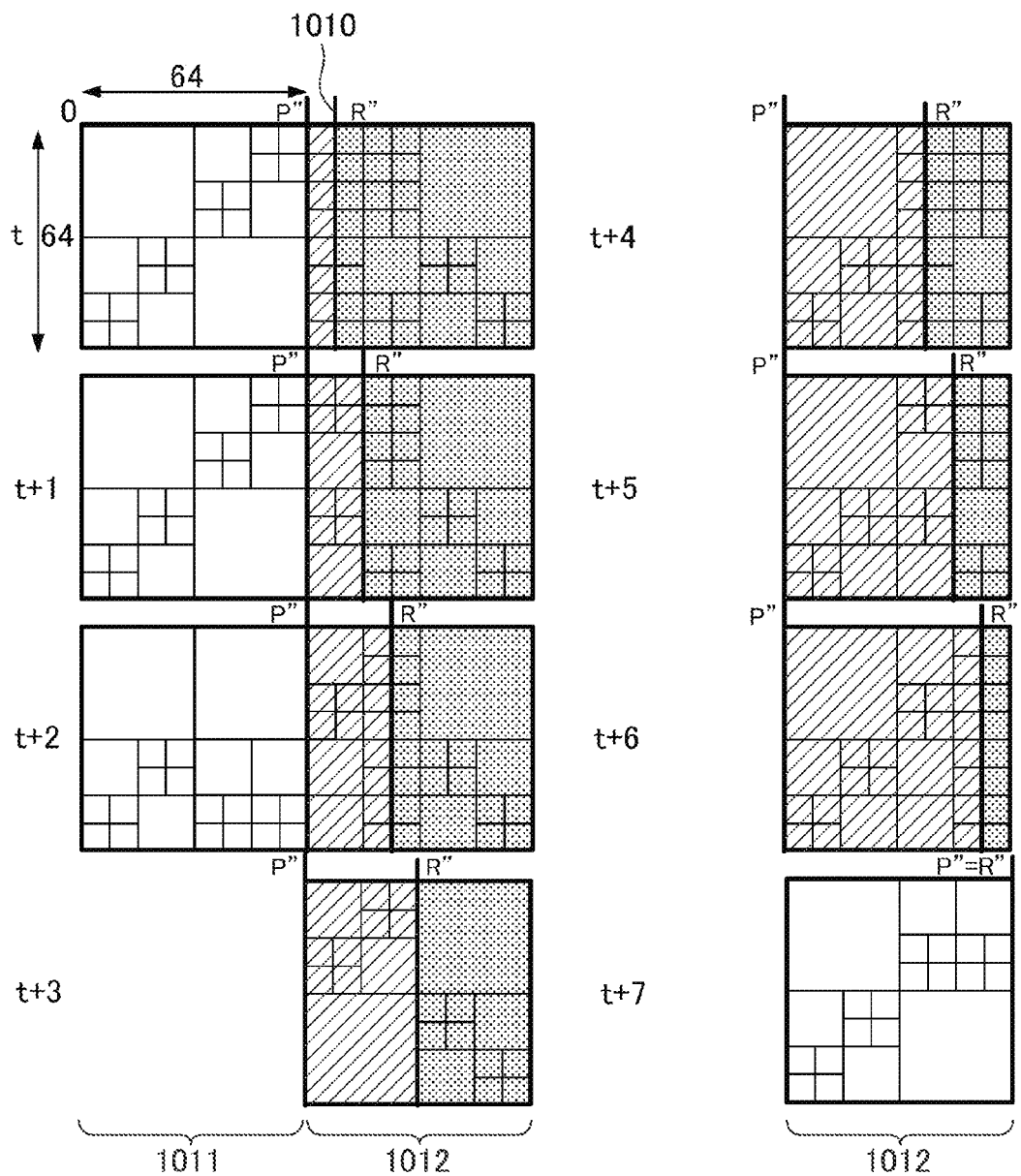
FIG. 19 is a diagram illustrating a prediction-mode-restriction-target CTU in each of the pictures at respective time t to time (t+7) illustrated in FIG. 10.

FIG. 19 is a diagram illustrating prediction-mode-restriction-target CTUs in the respective pictures at time t to time (t+7) illustrated in FIG. 10. At time t to time (t+2), the CTU 1011 having the index CTUHIDX=0 and the CTU 1012 having the index CTUHIDX=1 and including the refresh boundary 1010 are determined as prediction-mode-restriction-target CTUs. At time (t+3) to time (t+7), the CTU 1012 having the index CTUHIDX=1 is determined as a prediction-mode-restriction-target CTU.

For the purpose of illustration below, the coordinate system having, as the origin, the left end of the prediction-mode-restriction-target CTU will be defined again. In this coordinate system, the position R" of the pixels included in the unrefreshed region and being adjacent to the refresh boundary is calculated as follows:

when CTUHIDX=(r/CTUSIZE)−1, $R''=R-((R-1)/CTUSIZE)*CTUSIZE$;

and when CTUHIDX=r/CTUSIZE, $R''=R-(R/CTUSIZE)*CTUSIZE$.

In addition, the position r" of the pixel included in the refreshed region and being adjacent to the refresh boundary is (R"−1), in this coordinate system. The coordinate P" of the left end of the CTU including the refresh boundary in the coordinate system is calculated similarly. In the case of the coordinate P", however, when CTUHIDX=R/CTUSIZE, P"=0. Assume that the coordinate of the pixel that is adjacent to the left end of the CTU including the refresh boundary is p=P−1. In this case, the coordinate p" of the pixel that is adjacent to the left end of the CTU including the refresh boundary is (P"−1) in the coordinate system having the left end of the prediction-mode-restriction-target CTU as the origin.

The restriction-target prediction mode determination unit 17 prohibits, in the prediction-mode-restriction-target CTU, among a plurality of prediction modes having different reference ranges, the use of a prediction mode in which at least some of neighboring, encoded pixels to be referred to in generating a prediction block are included in the unrefreshed region. Then, the restriction-target prediction mode determination unit 17 allows the use of a prediction mode in which only pixels locates in the refreshed region with respect to the refresh boundary.

Restrictions on the neighboring pixels to be referred to in generating a prediction block are imposed for each TU, while restrictions on the prediction modes to be used are imposed for each PU. In other words, usable prediction modes for each PU including a TU with reference restrictions are restricted. Meanwhile, reference of neighboring pixels is restricted for each of TUs included in a PU for which usable prediction modes are restricted. In the following, TUs for which usable prediction modes are restricted will be described according to the positional relationship between the prediction-mode-restriction-target CTU and the refresh boundary.

Specifically, the use of each prediction mode in which the range of pixels that are locating around the TU and are to be referred to in generating a prediction block includes a pixel the reference of which is not allowed, is prohibited. The range of neighboring pixels to be referred to in generating a prediction block varies according to the size TUSIZE, and hence TUs for each of which usable prediction modes are restricted also vary according to the size TUSIZE. As described above, in the intra prediction coding mode, pixels lined horizontally and pixels lined vertically around the coding-target block are referred to. In addition, the refresh boundary is assumed to shift from the left end to the right end of a target picture. Hence, the restriction-target prediction mode determination unit 17 prohibits the use of corresponding prediction modes when reference of any of the horizontally-lined pixels is restricted. Specifically, the restriction-target prediction mode determination unit 17 prohibits the use of a prediction mode in which at least part of the reference range and the unrefreshed region overlap, and determines a prediction mode in which the entire reference range is included in the refreshed region as a usable prediction mode. Note that, since reference of pixels included in the range from the right end of the coding-target TU to the refresh boundary is allowed, prohibition-target TUs vary according to the value (R"−P"). Concrete restrictions on prediction modes will be described later.

(1) Regarding Prediction-Mode-Restriction-Target CTU with CTUHIDX={(r/CTUSIZE)−1}, i.e., Prediction-Mode-Restriction-Target CTU that is Adjacent to a CTU Including Refresh Boundary and Included in Refreshed Region The reference range of neighboring pixels for each TU including the coordinate p", as a TU 622 illustrated in FIG.

6, and an unrefreshed region may overlap depending on the TU size. Since reference to the pixels included in the range from the TU to the refresh boundary is allowed, prohibition-target TUs vary according to the value (R"−P"). In other words, each TU satisfying (R"−P")≥TUSIZE is allowed to refer to all the reference pixels, and hence the use of any prediction modes is allowed for the TU having the above size TUSIZE.

By contrast, when (R"−P")<TUSIZE, the reference range used in generating a prediction block for each TU having the size TUSIZE includes part of unrefreshed region in some prediction modes. Hence, the use of those prediction modes is prohibited for such a TU. For this reason, when the position of the TU dividing line and the position of the refresh boundary are different in a CTU having the index CTUHIDX=(r/CTUSIZE), usable prediction modes may be restricted for each TU having the index TUHIDX=p"/TUSIZE.

First, a TU of 32×32 pixels included in a prediction-mode-restriction-target CTU will be described. When the position of TU dividing line and the position of the refresh boundary are different in a CTU having the index CTUHIDX=(r/CTUSIZE), i.e., an adjacent CTU including the refresh boundary, i.e., when (R"−P") %32!=0, usable prediction modes are restricted for each TU of 32×32 pixels including p". Then, as to TUs of 16×16 pixels included in the TU of 32×32 pixels, when the position of the TU dividing line and the position of the refresh boundary are different in the adjacent CTU including the refresh boundary, i.e., when (R"−P") %16!=0, usable prediction modes are restricted for each TU of 16×16 pixels including p". As to the TUs of 8×8 pixels and the TUs of 4×4 pixels, the position of the TU dividing line and the position of the refresh boundary are the same, and hence usable prediction modes are not restricted for the TUs having any of these sizes. In other words, the restriction-target prediction mode determination unit 17 restricts usable prediction modes for each TU having the index TUHIDX=p"/TUSIZE, when (R"−P") % TUSIZE!=0 where TUSIZE=32, 16, 8, 4.

Regarding the order of processing, for example, the restriction-target prediction mode determination unit 17 may check whether or not usable prediction modes are to be restricted for a TU of 32×32 pixels, and then check whether or not usable prediction modes are restricted for each of the four TUs of 16×16 pixels included in the TU of 32×32 pixels. Thereafter, the restriction-target prediction mode determination unit 17 may check the same for each of the other TUs of 32×32 pixels. Alternatively, the restriction-target prediction mode determination unit 17 may check whether or not usable prediction modes are restricted for each of four TUs of 32×32 pixels, and then check whether or not usable prediction modes are restricted for each of the 16 TUs of 16×16 pixels.

The restriction-target prediction mode determination unit 17 sets, for each TU in each TU size, a TU prediction-mode-restriction flag indicating whether or not the TU is a prediction-mode-restriction-target TU (restriction-target first sub-block) for which the use of any prediction mode is restricted. In this way, the restriction-target prediction mode determination unit 17 generates a TU prediction-mode-restriction map presenting whether or not each TU is a prediction-mode-restriction-target TU.

FIGS. 20A to 20D are TU prediction-mode-restriction maps for the CTU 1011 of the picture at time t illustrated in FIG. 10, respectively for TUs of 32×32 pixels, TUs of 16×16 pixels, TUs of 8×8 pixels, and TUs of 4×4 pixels in size. In this example, the coordinate of the right end of the CTU 1011 is denoted by p". Each block 2001 represents a TU. In each TU, a TU prediction-mode-restriction flag is presented. When the value of the TU prediction-mode-restriction flag is "0," the TU is not a prediction-mode-restriction-target TU. By contrast, when the value of the TU prediction-mode-restriction flag is "1," the TU is a prediction-mode-restriction-target TU. As illustrated in FIGS. 20A to 20D, each TU adjacent to the CTU including the refresh boundary is set as a prediction-mode-restriction-target TU, only among the TUs each having a size larger than the refresh update size (8 pixels).

(2) Regarding Prediction-Mode-Restriction-Target CTU with CTUHIDX=(r/CTUSIZE), i.e., CTU Including Refresh Boundary Firstly, each TU including the coordinate r" of the refresh boundary is determined as a prediction-mode-restriction-target TU. For convenience, assume that the coordinate of the left end of each TU including the refresh boundary is denoted by Q"{=(R"/TUSIZE)*TUSIZE}, and the coordinate of each pixel adjacent to the left end of the TU including the refresh boundary is denoted by q"(=Q"−1).

The reference range of neighboring pixels for each TU including the coordinate q", as a TU 623 illustrated in FIG. 6, and an unrefreshed region may overlap depending on the TU size. Specifically, when R"−Q"TUSIZE, the refresh boundary is not included in the reference range of the neighboring pixels, i.e., the reference range and the unrefreshed region do not overlap, in the case of using the TU size, and hence the restriction-target prediction mode determination unit 17 does not need to restrict the use of any prediction mode for the TU. By contrast, when (R"−Q") <TUSIZE, the restriction-target prediction mode determination unit 17 determines such a TU as a prediction-mode-restriction-target TU. In other words, when the position of the TU dividing line and the position of the refresh boundary are different, the restriction-target prediction mode determination unit 17 determines each TU having the index TUHIDX=q'/TUSIZE={(r'/TUSIZE)−1} as a prediction-mode-restriction-target TU.

For example, the restriction-target prediction mode determination unit 17 checks, for each of TUs of 32×32 pixels included in the prediction-mode-restriction-target CTU, whether or not the refresh boundary r" is included in the TU. When the refresh boundary r" is included in the TU, the restriction-target prediction mode determination unit 17 determines the TU of the 32×32 pixels as a prediction-mode-restriction-target TU.

When the position of the TU dividing line and the position of the refresh boundary are different, i.e., when (R"−Q") %32!=0, the restriction-target prediction mode determination unit 17 determines the TU of 32×32 pixels adjacent to the left of the TU of 32×32 pixels including the coordinate q" and included in the refreshed region, as a prediction-mode-restriction-target TU. Then, the restriction-target prediction mode determination unit 17 checks, for each of the TUs of 16×16 pixels included in the TU of 32×32 pixels, whether or not the refresh boundary r" is included in the TU. When the refresh boundary r" is included in the TU of 16×16 pixels, the restriction-target prediction mode determination unit 17 determines the TU of 16×16 pixels as a prediction-mode-restriction-target TU. When the position of the TU dividing line and the position of the refresh boundary are different for the TU of 16×16 pixels, i.e., when (R"−Q") %16!=0, the restriction-target prediction mode determination unit 17 determines each TU of 16×16 pixels adjacent to the TUs of 16×16 pixels including the coordinate q" and included in the refreshed region, as a prediction-moderestriction-target TU. Similarly, the restriction-target prediction mode determination unit 17 checks, for TUs of 8×8 pixels and TUs of 4×4 pixels, whether or not the TU is a prediction-mode-restriction-target TU. As to the TUs of 8×8 pixels and the TUs of 4×4 pixels, the position of the TU dividing line and the position of the refresh boundary are always the same. Hence, the restriction-target prediction mode determination unit 17 determines each TU having the index TUHIDX=r"/TUSIZE when TUSIZE=32, 16, 8, 4, as a prediction-mode-restriction-target TU. In addition, when (R"−Q") % TUSIZE!=0, the restriction-target prediction mode determination unit 17 determines each TU having the index TUHIDX=q"/TUSIZE as a prediction-mode-restriction-target TU.

Regarding the order of processing, for example, the restriction-target prediction mode determination unit 17 may check whether or not usable prediction modes are restricted for a TU of 32×32 pixels, and then check whether or not usable prediction modes are restricted for each of the four TUs of 16×16 pixels included in the TU of 32×32 pixels. Thereafter, the restriction-target prediction mode determination unit 17 may check the same for each of the other TUs of 32×32 pixels. Alternatively, the restriction-target prediction mode determination unit 17 may check whether or not usable prediction modes are restricted for each of the four TUs of 32×32 pixels, and then check whether or not usable prediction modes are restricted for each of the 16 TUs of 16×16 pixels.

FIGS. 21A to 21D are TU prediction-mode-restriction maps for the CTU 1012 of the picture at time (t+6) illustrated in FIG. 10, respectively for TUs of 32×32 pixels, TUs of 16×16 pixels, TUs of 8×8 pixels, and TUs of 4×4 pixels in size. In this example, the refresh boundary r" is locating at the position of the eighth pixel counted from the right end of the CTU 1012. Each block 2101 represents a TU. In each TU, a TU prediction-mode-restriction flag is presented. As illustrated in FIGS. 21A to 21D, as to each TU having a size larger than the refresh update size (8 pixels), the TUs including the refresh boundary r" and each TU adjacent to the left (the refreshed region) of any of the TUs including the refresh boundary r" are determined as prediction-mode-restriction-target TUs. As to each TU having a size smaller than or equal to the refresh update size, only the TUs having the refresh boundary r" at the right end thereof are determined as prediction-mode-restriction-target TUs.

Next, a method of restricting usable prediction modes for a prediction-mode-restriction-target TU will be described.

Figure 22:
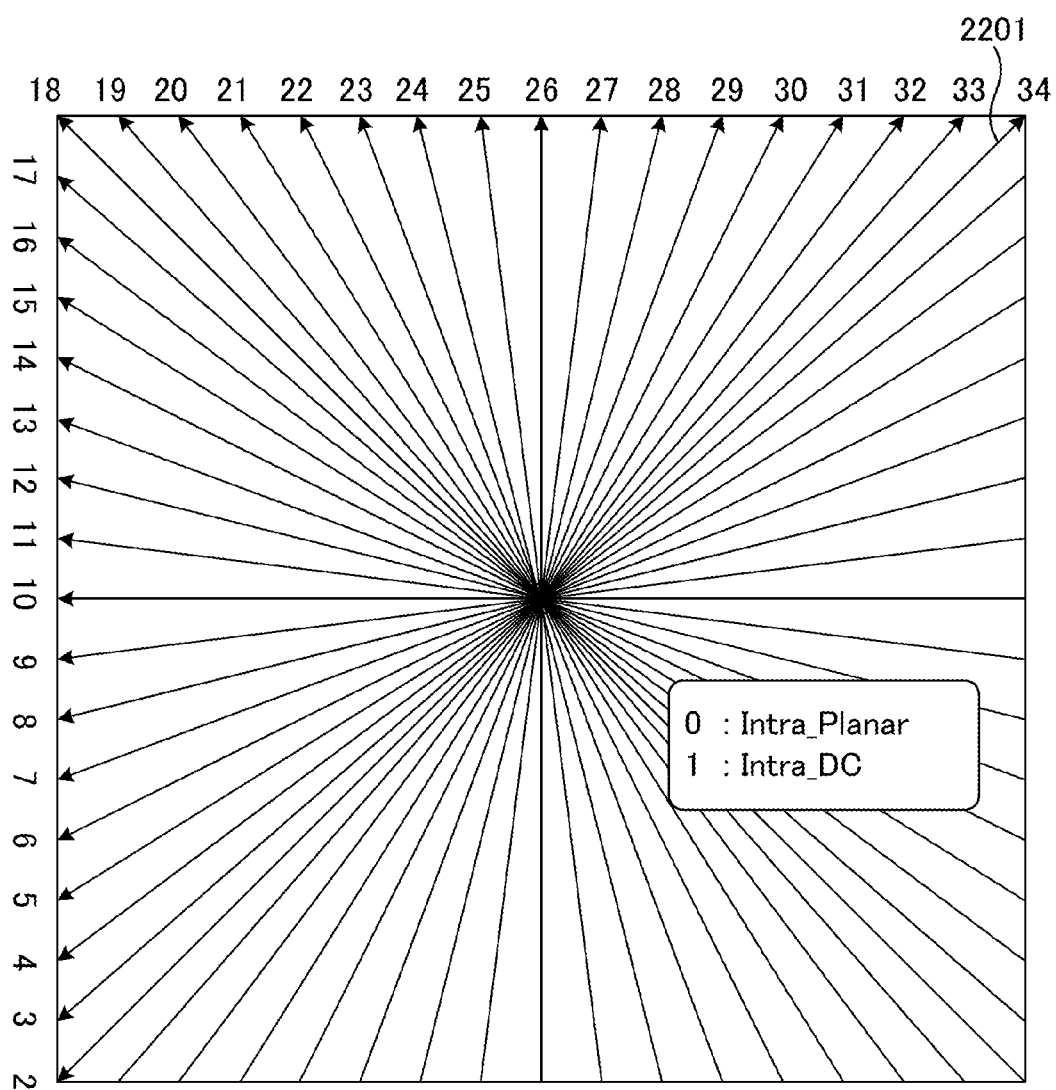
FIG. 22 is a diagram illustrating prediction modes defined in HEVC.

FIG. 22 is a diagram illustrating prediction modes defined in HEVC. Each of the numerical values "0" to "34" illustrated in FIG. 22 represents a prediction mode. Prediction mode 0 is referred to as intraPlanar mode, and Prediction mode 1 is referred to as intraDC mode. Prediction modes 2 to 34 are each referred to as Angle mode. Each arrow 2201 represents a reference direction in Angle mode corresponding to the numerical value pointed by the arrow 2201. As illustrated in FIG. 22, the position of the pixels to be referred to varies depending on the prediction mode. For convenience, the pixels to be referred to in generating a prediction block will be simply referred to as reference pixels below.

The restriction-target prediction mode determination unit 17 can identify each unusable prediction mode on the basis of the relationship between the position of the reference pixels and each prediction mode. For example, FIG. 23A illustrates reference pixels 2301 of a block 2300 having 8×8 pixels when Prediction mode 0 (intraPlanar) is used. In this example, the pixels that are adjacent to the upper end of the block 2300 and are included in the range from the pixel leftward adjacent to the left end of the block 2300 to the pixel rightward adjacent to the right end of the block 2300, and the pixels that are leftward adjacent to the block 2300 and are included in the range from the pixel at the upper end of the block 2300 to the pixel downward adjacent to the lower end of the block 2300 serve as the reference pixels 2301. FIG. 23B illustrates reference pixels 2302 of a block 2300 having 8×8 pixels when Prediction mode 1 (intraDC) is employed. In this example, the pixels that are adjacent to the upper end of the block 2300 and are included in the range from the pixel leftward adjacent to the left end of the block 2300 to the right end of the block 2300, and the pixels that are leftward adjacent to the block 2300 and are included in the range from the upper end of the block 2300 to the lower end of the block 2300 serve as the reference pixels 2302.

In this embodiment, the use of the prediction modes in which horizontally-lined reference pixels are referred to is restricted. Hence, the use of Prediction modes 2 to 17 in which only vertically-lined reference pixels are referred to is always allowed, i.e., the use of Prediction modes 2 to 17 is not restricted. Accordingly, the restriction-target prediction mode determination unit 17 obtains, for each of Prediction modes 0, 1, and 18 to 34, the relationship between the position of the reference pixels and the prediction mode.

In Prediction mode 0, one of the reference pixels is the pixel that is adjacent to the upper end of the coding-target block and is rightward adjacent to the right end of the coding-target block. Accordingly, the use of Prediction mode 0 is not allowed for a prediction-mode-restriction-target TU, when reference to all the pixels on the right of the right end of the TU is prohibited. By contrast, in Prediction mode 1, no pixel on the right of the right end of the coding-target block is referred to. Accordingly, the use of Prediction mode 1 is allowed for a prediction-mode-restriction-target TU, even when reference to all the pixels on the right of the right end of the TU is prohibited.

In the following, reference pixels in Angle mode will be described. For the sake of simplicity, a case of not performing BI-filtering in the intra prediction coding mode in HEVC (when strongIntraSmoothingEnabledFlag=0) is used as an example. For example, in the intra prediction coding mode, for a coding-target block having 8×8 pixels, the 17 pixels that are adjacent to the upper end of the coding-target block and are consecutive in the horizontal direction and the 17 pixels that are adjacent to the left end of the coding-target block and are consecutive in the vertical direction are used as reference pixels, as illustrated in FIG. 5B. In the following, the reference pixels that are adjacent to the upper end of a prediction block and are consecutive in the horizontal direction will be denoted by ref[x] (x=0, 1, . . . , 2*TbS) in order starting from the left, where TbS denotes the size of the horizontal direction of the prediction block. In this example, ref[0] indicates the pixel that is upward adjacent to the pixel leftward adjacent to the upper left pixel of the prediction block.

In the intra prediction coding mode in HEVC, 3-TAP filtering is performed on a pixel adjacent to a pixel ref[x] before the generation of a prediction block, in the prediction modes corresponding to each prediction block size presented in the following table.

TABLE 1

Filtering-target prediction mode

| Block size | Prediction modes |
|---|---|
| 8 × 8 pixels | 18, 34 |
| 16 × 16 pixels | 18, 19, 20, 21, 22, 23, 24, 28, 29, 30, 31, 32, 33, 34 |

TABLE 1-continued

Filtering-target prediction mode

| Block size | Prediction modes |
|---|---|
| 32 × 32 pixels | 18, 19, 20, 21, 22, 23, 24, 25, 27, 28, 29, 30, 31, 32, 33, 34 |

By using the filtering, for a prediction-mode-restriction-target TU, when reference to all the pixels on the right of the right end of the TU is prohibited, the use of each prediction mode in which any of reference pixels on the right of the reference pixel ref[TbS] is referred to is prohibited among the prediction modes with filtering processing. By contrast, in each prediction mode without filtering processing, the use of each prediction mode in which any of reference pixels on the right of the reference pixel ref[TbS+1] is referred to is prohibited.

Table 2 is a reference table presenting the number x of the reference pixel ref[x] locating rightmost among the reference pixels to be referred to in generating a prediction block for each TU size in each prediction mode. The reference table is stored, for example, in a memory circuit (not illustrated) of the restriction-target prediction mode determination unit 17. Then, by referring to the reference table, the restriction-target prediction mode determination unit 17 identifies prediction modes the use of which is to be restricted for a prediction-mode-restriction-target TU.

TABLE 2

Reference table

| Prediction mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| TU 4 × 4 | 0 | 2 | 3 | 3 | 4 | 4 | 4 | 4 | 4 | 5 | 5 | 6 | 6 | 7 | 7 | 8 | 8 |
| TU 8 × 8 | 0 | 3 | 4 | 5 | 6 | 7 | 8 | 8 | 8 | 9 | 10 | 11 | 12 | 13 | 14 | 15 | 16 |
| TU 16 × 16 | 0 | 4 | 7 | 9 | 11 | 13 | 15 | 16 | 16 | 18 | 19 | 21 | 23 | 25 | 27 | 30 | 32 |
| TU 32 × 32 | 0 | 7 | 12 | 16 | 20 | 24 | 28 | 31 | 32 | 35 | 38 | 42 | 46 | 50 | 54 | 59 | 64 |

Specifically, the restriction-target prediction mode determination unit 17 identifies prediction modes the use of which is to be restricted for a prediction-mode-restriction-target TU, according to a corresponding one of the following conditions. In this example, the use of the same prediction modes is restricted for both luminance signals and color-difference signals. In addition, the horizontal and vertical sizes of a prediction block of a color-difference signal is half the horizontal and vertical sizes of the prediction block of the corresponding luminance signal, respectively. However, when the size of the prediction block of a luminance signal is 4×4 pixels, the size of the prediction block of the corresponding color-difference signal is also 4×4 pixels. In the following, description will be given by using, as a reference, the TU size of a luminance signal.

The restriction-target prediction mode determination unit 17 identifies, for a prediction-mode-restriction-target CTU having the index CTUHIDX={(r/CTUSIZE)−1}, the range of reference pixels that can be referred to by the prediction-mode-restriction-target TU, on the basis of the value (R"−P"), as described above. In addition, the restriction-target prediction mode determination unit 17 identifies, for a prediction-mode-restriction-target CTU having the index CTUHIDX=r/CTUSIZE, the range of reference pixels that can be referred to by the prediction-mode-restriction-target TU, on the basis of the value (R"−Q"). Then, the restriction-target-prediction-mode determination unit 17 identifies usable prediction modes according to a corresponding one of the following TU prediction-mode conditions.

(Condition 1) Case in which reference to all pixels on right of right end of prediction-mode-restriction-target TU is prohibited In this case, the restriction-target-prediction-mode determination unit 17 determines Prediction modes 1 to 26 as usable valid prediction modes while prohibiting the use of the other prediction modes.

(Condition 2) Case in which reference to 8 pixels from right end of prediction-mode-restriction-target TU is allowed and size of prediction-mode-restriction-target TU is 16×16 pixels (TUSIZE=16)

In this case, the restriction-target-prediction-mode determination unit 17 determines Prediction modes 0 to 30 as usable valid prediction modes while prohibiting the use of the other prediction modes.

(Condition 3) Case in which reference to 8 pixels from right end of prediction-mode-restriction-target TU is allowed and size of prediction-mode-restriction-target TU is 32×32 pixels (TUSIZE=32)

In this case, the restriction-target-prediction-mode determination unit 17 determines Prediction modes 0 to 28 as usable valid prediction modes while prohibiting the use of the other prediction modes.

(Condition 4) Case in which reference to 16 pixels from right end of prediction-mode-restriction-target TU is allowed and size of prediction-mode-restriction-target TU is 32×32 pixels In this case, the restriction-target-prediction-mode determination unit 17 determines Prediction modes 0 to 30 as usable valid prediction modes while prohibiting the use of the other prediction modes.

(Condition 5) Case in which reference to 24 pixels from right end of prediction-mode-restriction-target TU is allowed and size of prediction-mode-restriction-target TU is 32×32 pixels In this case, the restriction-target-prediction-mode determination unit 17 determines Prediction modes 0 to 32 as usable valid prediction modes while prohibiting the use of the other prediction modes.

The restriction-target prediction mode determination unit 17 generates a TU prediction-mode-restriction map for each TU size of the prediction-mode-restriction-target CTU by assigning, to each TU, a prediction-mode restriction flag indicating a corresponding TU prediction-mode condition.

Description will be given of a case in which the above conditions are applied to the TU prohibition maps in FIG. 13A to FIG. 13D generated by the restriction-target TU determination unit 13 and the TU prediction-mode-restriction maps in FIG. 21A to FIG. 21D, for the picture at time (t+6) illustrated in FIG. 10, for example.

First, the restriction-target prediction mode determination unit 17 determines each TU having the TU prohibition flag set at "1" in the TU prohibition map, i.e., each unusable TU, to be invalid in a corresponding TU prediction-mode-restriction map. Then, the restriction-target prediction mode determination unit 17 determines a corresponding condition from the above conditions, for each TU having the prediction-mode restriction flag set at "1" among the other TUs.

FIGS. 24A to 24D are TU prediction-mode-restriction maps presenting prediction modes the use of which is prohibited, for each TU in the CTU 1012 of the picture at time (t+6) illustrated in FIG. 10, respectively for TUs of 32×32 pixels, TUs of 16×16 pixels, TUs of 8×8 pixels, and TUs of 4×4 pixels in size. In this example, the refresh boundary r" is locating at the position of the eighth pixel counted from the right end of the CTU 1012. Each block 2401 represents a TU. In each TU, a corresponding one of the TU prediction-mode conditions is presented. In addition, "Nan" is presented in each invalid TU. Moreover, "0" is presented in each TU having no restrictions of the use of any prediction mode. For example, since TU prediction-mode condition 5 is applied to the TUs on the left among the TUs of 32×32 pixels, the restriction-target prediction mode determination unit 17 determines Prediction modes 0 to 32 as valid prediction modes while prohibiting the use of the other prediction modes, for those TUs. By contrast, since the TUs on the right among the TUs of 32×32 pixels are invalid, these TUs are not encoded in the intra prediction coding. Moreover, since TU prediction-mode condition 2 is applied to the second TUs counted from the right among the TUs of 16×16 pixels, the restriction-target prediction mode determination unit 17 determines Prediction modes 0 to 30 as valid prediction modes while prohibiting the use of the other prediction modes, for those TUs.

In a modified example, to simplify the process, the restriction-target prediction mode determination unit 17 may apply TU prediction-mode condition 1, which has the least number of valid prediction modes, to the prediction-mode-restriction-target TU when the TU has a size that is not invalid. In this case, for each of all the prediction-mode-restriction-target TU, the use of prediction modes in which any of the pixels locating closer to the refresh boundary than the prediction-mode-restriction-target TU is referred to, is prohibited.

Alternatively, the restriction-target prediction mode determination unit 17 may be configured not to restrict the use of any prediction mode for a prediction-mode-restriction-target TU for which reference to the upper right block in generating a prediction block is not allowed. For example, when the upper right block of the TU has not been encoded yet at the time of coding of the prediction-mode-restriction-target TU, the restriction-target prediction mode determination unit 17 may determine all the prediction modes as valid prediction modes for the prediction-mode-restriction-target TU.

Figure 25A:
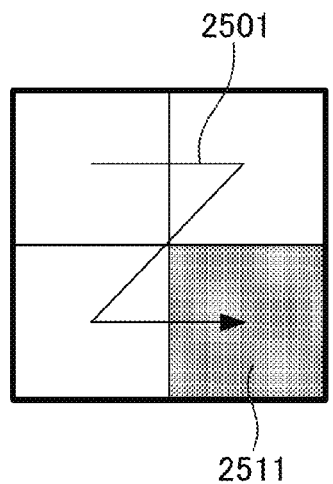
FIGS. 25A to 25C are diagrams illustrating the relationship between a TU that is not allowed to refer to an upper right block in generating a prediction block and a coding order, for TUs of 32×32 pixels, TUs of 16×16 pixels, and TUs of 8×8 pixels in size, respectively.
Figure 25B:
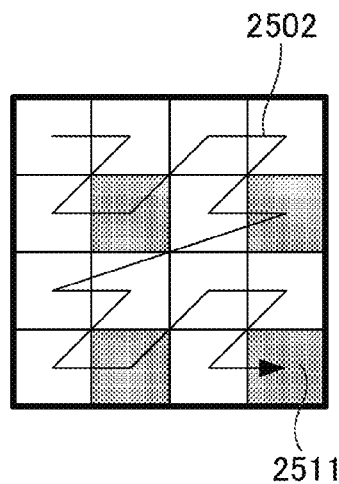
Figure 25C:
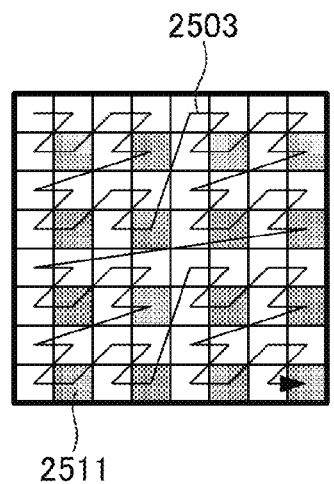

FIGS. 25A to 25C are diagrams illustrating the relationship between a TU for which reference to the upper right block in generating a prediction block is not allowed and a corresponding coding order, respectively for TUs of 32×32 pixels, TUs of 16×16 pixels, and TUs of 8×8 pixels in size. In FIGS. 25A to 25C, each block represents a TU. In addition, arrows 2501 to 2503 each indicates a corresponding coding order. Each TU 2511 with hatching is a TU for which reference to the upper right block is not allowed. Similarly, the restriction-target prediction mode determination unit 17 determines all the prediction modes as valid prediction modes, for each prediction-mode-restriction-target TU of 4×4 pixels for which reference to the upper right block in generating a prediction block is not allowed.

Figure 26:
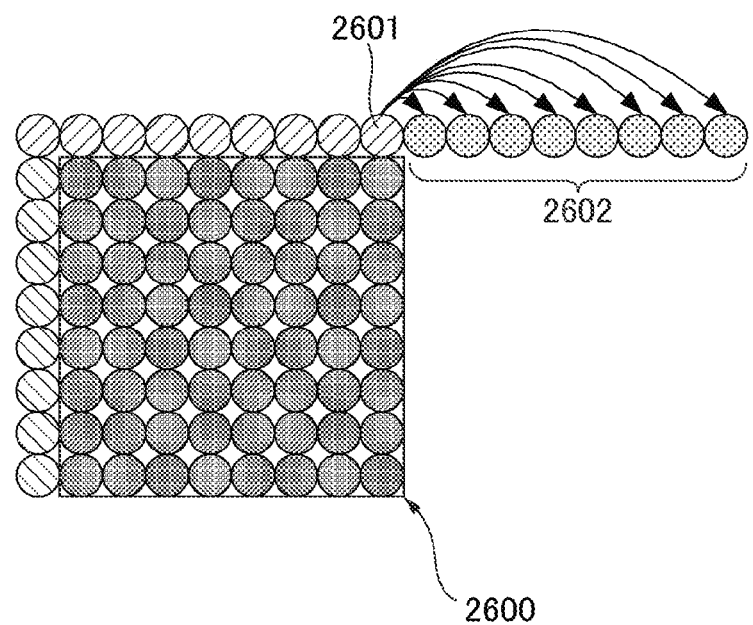
FIG. 26 is a diagram for illustrating a method of determining the value of each reference pixel for a TU that is not allowed to refer to an upper-right, encoded block.

As illustrated in FIG. 26, for a TU 2600 for which reference to the upper-right, encoded block is not allowed, the value of a pixel 2601 that is adjacent to the upper end of the TU 2600 and is locating at the right end of the TU 2600 is copied as the value of each reference pixel 2602 locating upper right of the TU 2600, as specified in HEVC. Hence, each TU for which reference to the upper-right, encoded block is not allowed does not refer to any unrefreshed region in generating a prediction mode. Alternatively, the coding-mode determination unit 18 may check whether or not to lift restrictions of the prediction modes as that described above, at the time of determining a combination of PUs and TUs to be used in coding.

As described above, references to neighboring reference pixels in generating a prediction block are restricted for each TU, while prediction modes corresponding to the restriction are restricted for each PU. In other words, usable prediction modes are restricted for each PU including a TU with reference restrictions. Moreover, the restrictions are also applied to each of all the TUs included in each PU with restrictions of usable prediction modes. In view of this, the restriction-target prediction mode determination unit 17 may create a prediction-mode condition map for each PU. In this case, the restriction-target prediction mode determination unit 17 extracts, as a representative value, the condition with the strongest restrictions (with the smallest numerical value that is not zero) from those applied to the TUs in each size included in a target PU, and uses the extracted condition as the prediction-mode condition to be used for the PU.

For example, for the CTU 1012 of the picture at time (t+6) illustrated in FIG. 10, the restriction-target prediction mode determination unit 17 refers to the TU prediction-mode condition maps illustrated in FIGS. 24A to 24D. Then, for a PU of 64×64 pixels (PUSIZE=64), since the smallest value among the TU prediction-mode conditions of the TUs in each size TUSIZE=32, 16, 8, 4 included in the PU is "1," the restriction-target prediction mode determination unit 17 applies TU prediction-mode condition 1 to the PU of 64×64 pixels.

For the PUs of 32×32 pixels, the restriction-target prediction mode determination unit 17 extracts, for each PU, the smallest value from among the TU prediction-mode conditions of the TUs having the size TUSIZE=32, 16, 8, 4 included in the PU. Then, the restriction-target prediction mode determination unit 17 applies TU prediction-mode condition 5 to each PU having the index PUIDX=0, 2, and applies TU prediction-mode condition 1 to each PU having the index PUIDX=1, 3. Similarly, the restriction-target prediction mode determination unit 17 determines a TU prediction-mode condition to be applied to each of the PUs of 16×16 pixels, 8×8 pixels, and 4×4 pixels.

FIGS. 27A to 27E are PU prediction-mode condition maps presenting PUs each having restrictions of the use of prediction modes, among the PUs in the CTU 1012 of the picture at time (t+6) illustrated in FIG. 10, respectively for a PU of 64×64 pixels, PUs of 32×32 pixels, PUs of 16×16 pixels, PUs of 8×8 pixels, and PUs of 4×4 pixels in size. In this example, the refresh boundary r" is locating at the position of the eighth pixel counted from the right end of the CTU 1012. Each block 2701 represents a PU. In each PU, a corresponding one of the above TU prediction-mode conditions is presented. In addition, "0" is presented in each PU having no restrictions of the use of any prediction mode.

The coding mode determination unit 18 obtains, for a coding-target CU, combinations of usable CU size, PU size, TU size, and prediction modes, on the basis of the restrictions of usable size for the CU, the restrictions of usable sizes for the TUs and PUs included in the CU, and the restrictions of usable prediction modes. Then, the coding mode determination unit 18 determines the combination having the smallest estimation value of the coding amount among those of the combinations, as the intra prediction coding mode to be used for the CU.

To determine TU and PU sizes, the coding mode determination unit 18 calculates coding cost, which is the estimation value of the coding amount, for each combination of the TU and PU sizes, and thereby selects the combination having the lowest coding cost. To calculate coding cost, the coding mode determination unit 18 calculates a prediction error, i.e., sum SAD of pixel-difference absolute values, according to the following equation.

$$SAD=\Sigma|OrgPixel-PredPixel|$$

where OrgPixel denotes the values of the pixels included in a target block, e.g., a target TU, of the coding-target picture, and PredPixel denotes the values of the pixels included in the prediction block corresponding to the target block and obtained as specified in HEVC.

Alternatively, the coding mode determination unit 18 may calculate sum SATD of absolute values of the respective pixels obtained by performing Hadamard transform on the difference image between the target block and the prediction block, instead of the sum SAD.

With reference to FIG. 28, a description will be given of a process for determining a prediction mode to be used for each TU included in each PU as well as TU and PU sizes, by assuming that restrictions of the use of prediction modes are applied to each PU.

In the intra prediction coding mode, the CU size CUSIZE and the PU size PUSIZE are equal when the size CUSIZE is any one of 64, 32, and 16. For example, when CUSIZE=32, PUSIZE=32; when CUSIZE=16, PUSIZE=16.

FIG. 28 illustrates an example of comparing the coding cost when PUSIZE=32 and the coding cost when PUSIZE=16, for the CTU 1012 of the picture at time (t+6) illustrated in FIG. 10. PU3203 represents a PU having the size PUSIZE=32 and the index PUIDX=3. In addition, each TU having a size n included in the PU PU3203 is denoted by PU3203(TUn). For example, a TU having the size TUSIZE=16 is denoted by PU3203(TU16). Further, a TU having a size n and the index TUIDX=m included in the PU PU3203 is denoted by PU3203(TUn-m). For example, a TU having the size TUSIZE=16 and the index TUIDX=2 is denoted by PU3203(TU16-2).

The coding mode determination unit 18 refers to a corresponding CU prohibition maps and a corresponding PU prohibition map, and, when each combination of CU and PU sizes is usable, calculates the coding cost for the combination of the CU and PU. In the following, description will be given by assuming that the combination of CUSIZE=32 and PUSIZE=32 and the combination of CUSIZE=16 and PUSIZE 16 are usable.

Figures 27A, 27B, 27C:
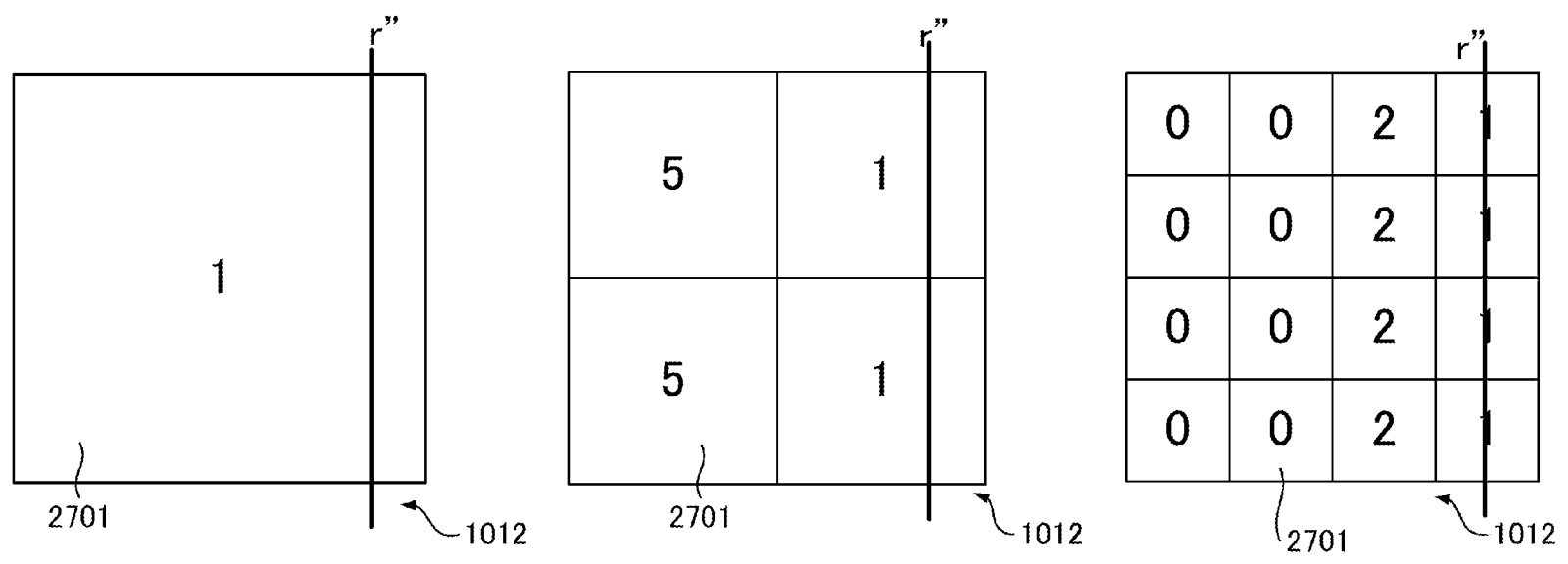

The coding mode determination unit 18 refers, for the PU PU3203, to the PU having the index PUIDX=3 in the PU prediction-mode condition map for the PUs each having the size PUSIZE=32 illustrated in FIG. 27B. For the PU PU3203, TU prediction-mode condition 1 is applied, and hence the use of Prediction modes 1 to 26 is allowed. The coding mode determination unit 18 calculates the coding cost for each of the sizes TUSIZE=32, 16, 8, 4 in each of usable Prediction modes 1 to 26.

When TUSIZE=32, the PU PU3203 only includes the TU PU3203(TU32-3). Accordingly, the coding mode determination unit 18 refers to the TU prohibition flag for the TU having the index TUIDX=3 in the TU prohibition map for TUSIZE=32 illustrated in FIG. 13A. Since the TU having the index TUIDX=3 includes the refresh boundary 1010, the TU prohibition flag is set at "1." This indicates that the use of the TU PU3203(TU32-3) is prohibited. Accordingly, the coding mode determination unit 18 sets the coding cost of the TU PU3203(TU32-3) at an invalid value (e.g., an extremely large value). Since each TU prohibition map is integrated with a corresponding TU prediction-mode condition map, the coding mode determination unit 18 may refer to the value of the prediction-mode restriction flag for the TU having the index TUIDX=3 in the TU prediction-mode condition map for TUSIZE=32. Then, by referring to the value of the prediction-mode restriction flag set at Nan, the coding mode determination unit 18 may determine that the use of the TU 3203(TU32-3) is prohibited.

Similarly, when TUSIZE=16, the PU PU3203 includes a TU PU3203(TU16-12), a TU PU3203(TU16-13), a TU PU3203(TU16-14), and a TU PU3203(TU16-15). Accordingly, the coding mode determination unit 18 refers to the TU prohibition flags for the respective TUs having the respective indices TUIDX=12 to 15 in the TU prohibition map for TUSIZE=16. When the use of any one or more of the TU PU3203(TU16-12), the TU PU3203(TU16-13), the TU PU3203(TU16-14), and the TU PU3203(TU16-15) are prohibited, the use of any TUs of this size is not allowed. In this example, the use of the TU PU3203(TU16-13) and the TU PU3203(TU16-15) is prohibited as illustrated in FIG. 13B. Hence, the coding mode determination unit 18 does not use any TU having the size TUSIZE=16. To enable this, the coding mode determination unit 18 sets the coding cost of each of the TU PU3203(TU16-12), the TU PU3203(TU16-13), the TU PU3203(TU16-14), and the TU PU3203 (TU16-15) at an invalid value (e.g., an extremely large value). In the same process, the coding mode determination unit 18 finds out that the use of all the TUs is allowed for the TUs each having the size TUSIZE=8, 4.

The coding mode determination unit 18 obtains the coding cost for each of the TUs having one of the usable sizes TUSIZE, by using each of the usable prediction modes. For convenience, the coding cost of a TU will be referred to as a TU cost below. When TUSIZE=8, TU prediction-mode condition 1 is applied. Accordingly, the coding mode determination unit 18 calculates the TU cost for each of the 16 TUs included in the PU PU3203 in each of Prediction modes 1 to 26. Then, the coding mode determination unit 18 calculates the total of the TU costs of the respective TUs in each of Prediction modes 1 to 26, as a mode cost CostPU3203(TU8)mode1, . . . , CostPU3203(TU8) Mode26=ΣSAD (Mode,TUIDX). The coding mode determination unit 18 sets the cost CostPU3203(TU8) of the PU PU3203 when TUSIZE=8, at the smallest value of the mode costs. In addition, the prediction mode ModePU3203(TU8) corresponding to the smallest mode-cost value in a memory circuit (not illustrated) of the coding mode determination unit 18.

Similarly, the coding mode determination unit 18 calculates the TU cost of each of the TUs having the size TUSIZE=4 in each prediction mode, and then calculates the total of the TU costs as a mode cost. Then, the coding mode determination unit 18 sets a cost CostPU3203(TU4) of the PU PU3203 when TUSIZE=4, at the smallest mode-cost value, and then stores the prediction mode ModePU3203 (TU4) corresponding to the smallest value in the memory circuit (not illustrated) of the coding mode determination unit 18.

The coding mode determination unit 18 compares the cost CostPU3203(TU8) of the PU PU3203 when TUSIZE=8 and the cost CostPU3203(TU4) of the PU PU3203 when TUSIZE=4, and determines the lower one of the compared costs as a coding cost CostPU3203 of the PU PU3203. Then, the coding mode determination unit 18 stores the size TUSIZE and the prediction mode ModePU3203 corresponding to the lower cost in the memory circuit (not illustrated) of the coding mode determination unit 18.

Next, description will be given of calculation of a coding cost for each PU having the size PUSIZE=16 obtained by dividing the PU PU3203 into four. The coding mode determination unit 18 calculates the coding cost of each of the four PUs included in the PU PU3203, by carrying out the same process as that for the calculation of the coding cost of the PU PU3203. According to the PU prediction-mode condition map for PUSIZE=16 illustrated in FIG. 27C, TU prediction-mode condition 2 is applied for a PU PU1612 (i.e., a PU with PUSIZE=16 and PUIDX=12) and a PU PU1614(i.e., a PU with PUSIZE 16 and PUIDX=14), and hence the use of Prediction modes 0 to 30 is allowed in this case. Meanwhile, TU prediction-mode condition 1 is applied for a PU PU1613 and a PU PU1615, and hence the use of Prediction modes 1 to 26 is allowed in this case. The coding mode determination unit 18 calculates the coding cost for each of the sizes TUSIZE=8, 4 in each of the corresponding usable prediction modes. Thereby, the coding cost CostPU1612 to CostPU1615, which are the smallest costs of the respective PUs 1612 to 1615, are calculated, and prediction modes ModePU1612 to ModePU1615 corresponding to the respective PUs 1612 to 1615 are obtained.

Lastly, the coding mode determination unit 18 compares the coding cost CostPU3203 of the PU having the size PUSIZE=32 and the total of the coding costs CostPU1612 to CostPU1615 of the respective PUs each having the size PUSIZE=16. Thereby, the coding mode determination unit 18 determines the combination of the size PUSIZE with the lower coding cost, and the size TUSIZE and the prediction modes corresponding to the size PUSIZE with the lower coding cost, as the intra prediction coding mode to be used for the PU PU3203.

For the calculation of the coding cost in the inter prediction coding mode, the coding mode determination unit 18 can use the process of the inter prediction coding mode specified in HEVC, for example. Then, the coding mode determination unit 18 calculates the coding cost in the intra prediction coding mode and the coding cost in the inter prediction coding mode for each CU size, by carrying out the same cost comparison process as the above for each CU size. Then, the coding mode determination unit 18 divides the coding-target block into CUs each having the size that enables the lowest coding cost, and uses the coding mode corresponding to the lowest coding cost.

Alternatively, the coding mode determination unit 18 may determine an intra prediction coding mode to be used for a target CU by obtaining the smallest coding-cost value while changing restrictions of the use of prediction modes for each TU with the fixed PU having the largest usable size, for example, instead of changing the PU.

Figure 29:
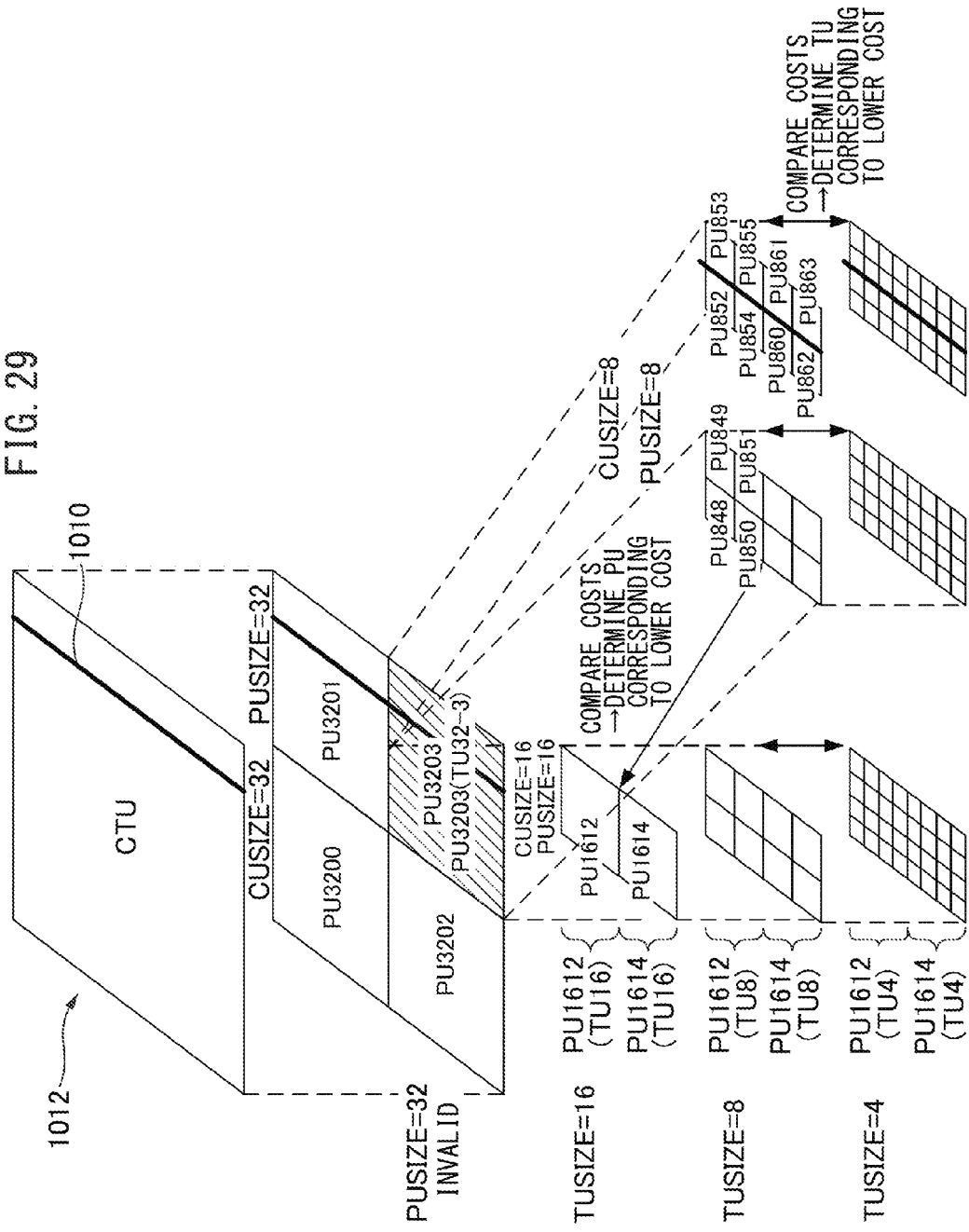
FIG. 29 is a diagram illustrating an example of comparison between the coding cost when PUSIZE=32 and the coding cost when PUSIZE=16, for the CTU on the left in the picture at time (t+6) illustrated in FIG. 10, according to a modified example.

A description will be given again of a process for determining a coding mode according to a modified example by taking, as an example, the CTU 1012 of the picture at time (t+6) illustrated in FIG. 10, by referring to FIG. 29. First, the coding mode determination unit 18 refers to the CU prohibition maps and the PU prohibition maps. For example, according to FIGS. 15A to 15E and FIGS. 18A to 18E, the use of PUs each having the size PUSIZE=64 or PUSIZE=32 is prohibited. Accordingly, the coding mode determination unit 18 does not calculate the coding cost of each PU having the size PUSIZE=64 or PUSIZE=32. Hence, the coding mode determination unit 18 calculates the coding cost of each PU having the size PUSIZE=16, 8, 4. Since the process for calculating a coding cost when PUSIZE=16, 8 is the same as that for calculating a coding cost when PUSIZE=4, description of calculation of a coding cost when PUSIZE=4, is omitted below.

When PUSIZE=16, the use of PUs each having the index of PUIDX=5, 7, 13, 15 is prohibited. Accordingly, the coding mode determination unit 18 calculates the coding cost of each of the other usable PUs. In this example, calculation of the coding cost of the PU PU1612 and the PU PU1614 will be described.

For the TU PU1612(TU16), the TU having the index TUIDX=12 in the TU prediction-mode condition map for TUSIZE=16 illustrated in FIG. 24B is referred to. Since TU prediction-mode condition 2 is applied for each TU PU1612 (TU16), the use of Prediction modes 1 to 30 is allowed. The coding mode determination unit 18 obtains the sum SAD in each of Prediction modes 1 to 30. Then, the coding mode determination unit 18 calculates, for Prediction modes 1 to 30, the totals of the sums SAD as mode costs CostPU1612 (TU16) Mode1 to CostPU1612(TU16) Mode30, which are the coding costs for the respective prediction modes. The coding mode determination unit 18 determines the smallest mode-cost value as the TU cost CostPU1612(TU16), and stores a prediction mode ModePU1612(TU16) corresponding to the smallest value in the memory circuit (not illustrated) of the coding mode determination unit 18.

When the restrictions of the use of prediction modes are the same for all the TUs included in the PU PU1612, the coding mode determination unit 18 calculates the coding cost of the TU PU1612(TU8). According to the TU prediction-mode condition map for the TUs of TUSIZE=8 illustrated in FIG. 24C, there is no restriction of the use of any prediction modes for any of all the TUs included in the PU PU1612. Accordingly, the coding mode determination unit 18 calculates the coding cost of the PU PU1612 in each of all the prediction modes, and then determines the smallest coding-cost value as a TU cost CostPU1612(TU8). Then, the coding mode determination unit 18 stores a prediction mode ModePU1612(TU8) corresponding to the smallest value in the memory circuit (not illustrated) of the coding mode determination unit 18.

Moreover, according to the TU prediction-mode condition map for the TUs of TUSIZE=4 illustrated in FIG. 24D, there is no restriction of the use of any prediction modes for any of all the TUs included in the PU 1612. Accordingly, the coding mode determination unit 18 calculates the coding cost of the PU 1612 in each of all the prediction modes, and then determines the smallest value as a TU cost CostPU1612 (TU4). Then, the coding mode determination unit 18 stores a prediction mode ModePU1612(TU4) corresponding to the smallest coding-cost value in the memory circuit (not illustrated) of the coding mode determination unit 18.

The coding mode determination unit 18 determines the smallest value among the TU costs CostPU1612(TU16), CostPU1612(TU8), and CostPU1612(TU4), as the PU cost CostPU1612, and stores the size TUSIZE and a prediction mode ModePU1612 corresponding to the smallest value in the memory circuit (not illustrated) of the coding mode determination unit 18.

In addition, the coding mode determination unit 18 calculates the TU cost of a PU PU848, a PU PU849, a PU PU850, and a PU PU851 obtained by dividing the PU 1612 into four, when TUSIZE=8 and TUSIZE=4. For example, according to the TU prediction-mode condition map for the TUs having the size TUSIZE=8 in FIG. 24C illustrated in FIG. 24C, there is no restriction of the use of any prediction modes for any of all the TUs of TUSIZE=8 included in the PU PU848. Accordingly, the coding mode determination unit 18 calculates the coding costs of the respective TUs of TUSIZE=8 included in the PU 848 in each of all the prediction modes, and then determines the smallest value as a TU cost CostPU848(TU8). Then, the coding mode determination unit 18 stores the smallest value and a prediction mode ModePU848(TU8) corresponding to the smallest value in the memory circuit (not illustrated) of the coding mode determination unit 18.

Similarly, the coding mode determination unit 18 calculates the coding cost of each of the TUs of TUSIZE=4 in each of all the prediction modes, and then determines the smallest value as a TU cost CostPU848(TU4). Then, the coding mode determination unit 18 stores the smallest value and a prediction mode ModePU848(TU4) corresponding to the smallest value in the memory circuit (not illustrated) of the coding mode determination unit 18.

The coding mode determination unit 18 determines the smallest value of the TU cost CostPU848(TU8) and the TU cost CostPU848(TU4) as a PU cost CostPU848, and then stores the size TUSIZE and a prediction mode ModePU848 corresponding to the smallest value in the memory circuit (not illustrated) of the coding mode determination unit 18. Similarly, the coding mode determination unit 18 obtains a PU cost as well as the size TUSIZE and the prediction mode corresponding to the PU cost, for each of the PU PU849, the PU PU850, and the PU PU851.

The coding mode determination unit 18 compares the PU coding cost CostPU1612 when PUSIZE=16 and the total of the PU coding costs CostPU848 to CostPU851 when PUSIZE=8. Then, the coding mode determination unit 18 determines the combination of the size PUSIZE enabling the lower coding cost, and the size TUSIZE and the prediction mode corresponding to the size PUSIZE, as the intra prediction coding mode to be used for the PU PU1612. The coding mode determination unit 18 obtains the combination of the size PUSIZE, the size TUSIZE, and the prediction mode enabling the lowest coding cost by carrying out the same process for the PU PU1614, and determines the combination as the intra prediction coding mode to be used for the PU PU1614.

Then, the coding mode determination unit 18 calculates the TU cost of each of a PU PU852, a PU PU853, a PU PU854, a PU PU855, a PU PU856, a PU PU857, a PU PU858, a PU PU859, a PU PU860, a PU PU861, a PU PU862, and a PU PU863 when TUSIZE=8 and TUSIZE=4. For example, as to a TU PU852(TU8–52), according to the TU prediction-mode condition map for the TUs having the size TUSIZE=8 in FIG. 24C, TU prediction-mode condition 2 is applied for the TUs of TUSIZE=8 included in the PU PU852. Accordingly, the coding mode determination unit 18 calculates the coding costs of the TUs of TUSIZE=8 included in the PU PU852 in each of all Prediction modes 1 to 26, and then determines the smallest coding-cost value as the TU cost of the TU PU852(TU8). The coding mode determination unit 18 carries out the same process for the TUs having the size TUSIZE=4, and calculates the TU cost of the TU PU852(TU4). The coding mode determination unit 18 obtains the size TUSIZE and the prediction mode corresponding to the smallest value of the TU cost of the TU PU852(TU8) and the TU cost of the TU PU852(TU4). Subsequently, the coding mode determination unit 18 obtains the combination of the size PUSIZE, the size TUSIZE, and the prediction mode enabling the lowest coding cost, by carrying out the same process as the above-described modified example, and then determines the combination as the intra prediction coding mode to be used for the PU 852. Similarly, the coding mode determination unit 18 obtains the combination of the size PUSIZE, the size TUSIZE, and the prediction mode enabling the lowest coding cost, for each of the PU PU853, the PU PU854, the PU PU855, the PU PU856, the PU PU857, the PU PU858, the PU PU859, the PU PU860, the PU PU861, the PU PU862, and the PU PU863, and then determines the combination as the intra prediction coding mode to be used for the corresponding PU.

For each CU, the prediction coding unit 19 generates a prediction block for each TU included in the CU in the coding mode determined by the coding mode determination unit 18, and generates coded data of the CU by quantizing the prediction error between the prediction block and the TU.

Specifically, the prediction coding unit 19 calculates a difference between the coding target TU and the prediction block. Then, the prediction coding unit 19 generates a prediction error signal on the basis of the difference value corresponding to each of the pixels of the TU obtained by the calculation of difference.

The prediction coding unit 19 performs orthogonal transform on the prediction error signals of the coding-target TU, and thereby obtains frequency signals indicating the horizontal frequency component and the vertical frequency component of each prediction error signal. For example, the prediction coding unit 19 performs, as orthogonal transform, discrete cosine transform (DCT) on the prediction error signal, and thereby obtains pairs of DCT coefficients for each TU, as a frequency signal.

Then, the prediction coding unit 19 calculates a quantized coefficient of the frequency signal by quantizing the frequency signal. The quantization is a process for expressing the signal values included in a certain interval with a signal value. The certain interval is referred to as a quantization level. For example, the prediction coding unit 19 quantizes the frequency signal by truncating a predetermined number of lower bits corresponding to a quantization level in the frequency signal. The quantization level is determined according to a quantization parameter. For example, the prediction coding unit 19 determines a quantization level to use, according to a function representing the value of the quantization level corresponding to the value of the quantization parameter. The function may be a preset monotone increasing function of the value of the quantization parameter.

Alternatively, a plurality of quantization matrices defining the quantization levels of the respective horizontal and vertical frequency components may be prepared in advance, and stored in a memory of the prediction coding unit 19. Then, the prediction coding unit 19 selects a particular quantization matrix from among the quantization matrices on the basis of the quantization parameter. By referring to the selected quantization matrix, the prediction coding unit 19 may determine the quantization level corresponding to the each frequency component of the frequency signal.

The prediction coding unit 19 can determine a quantization parameter according to any one of the various quantization parameter determining methods based on any video coding standards such as HEVC. The prediction coding unit 19 may use a method of calculating a quantization parameter in MPEG-2 standard Test Model 5, for example. As to the method of calculating a quantization parameter in MPEG-2 standard Test Model 5, refer to the following URL address, http://www.mpeg.org/MPEG/MSSG/tm5/Ch10/Ch10.html.

The prediction coding unit 19 can reduce the number of bits to be used for expressing each frequency component of the frequency signal by performing quantization processing, consequently reducing the information amount of the coding-target TU. The prediction coding unit 19 outputs the quantized coefficient as coded data, to the entropy coding unit 20.

In addition, the prediction coding unit 19 generates a reference picture for coding of blocks subsequent to the coding-target block, by using the quantized coefficient of the coding-target TU. To generate a reference picture, the prediction coding unit 19 inversely quantizes the quantized coefficient by multiplying the quantized coefficient by the predetermined number corresponding to the quantization level determined according to the quantization parameter. Through this inverse quantization, the frequency signal of the coding-target TU, e.g., the pair of DCT coefficients, is reconstructed. Thereafter, the prediction coding unit 19 performs inverse orthogonal transform on the frequency signal. For example, when the prediction coding unit 19 calculates the frequency signal by DCT, the prediction coding unit 19 performs inverse DCT on the reconstructed frequency signal. By performing inverse quantization processing and inverse orthogonal transform on the quantized signal, a prediction error signal having approximately the same level of information as that of the prediction error signal before coding is reproduced.

The prediction coding unit 19 adds, to the value of each pixel of the prediction block, a reproduced prediction error signal corresponding to the pixel. By performing these processes on each block, the prediction coding unit 19 generates reference blocks to be used in generating a prediction block for each PU to be encoded later. Every time generating a reference block, the prediction coding unit 19 stores the reference block in the memory of the prediction coding unit 19.

The memory of the prediction coding unit 19 temporarily stores the reference blocks generated sequentially. By combining the reference blocks corresponding to a picture in the coding order of the blocks, a reference picture to be referred to in coding of subsequent pictures is obtained. The memory of the prediction coding unit 19 stores a predetermined number of reference pictures that may be referred to by a coding-target picture, and discards reference pictures in chronological order when the number of reference pictures stored in the memory exceeds a certain number.

Moreover, the memory of the prediction coding unit 19 stores a motion vector of each of the reference blocks encoded in the inter prediction coding.

Further, to generate a prediction block for inter prediction coding, the prediction coding unit 19 obtains a motion vector by performing block matching between a coding-target PU and a reference picture and then determining a reference picture that is the best match with the coding-target PU and the corresponding position in the reference picture.

The prediction coding unit 19 generates a prediction block in accordance with the coding mode selected by the coding mode determination unit 18. When the coding-target PU is to be encoded in the inter prediction coding, the prediction coding unit 19 generates a prediction block by performing motion compensation on the reference picture on the basis of the motion vector.

When the coding-target PU is intra-prediction-encoded, the prediction coding unit 19 generates a prediction block on the basis of a block adjacent to the coding-target PU. In this case, the prediction coding unit 19 generates a prediction block according to the prediction mode determined by the coding mode determination unit 18 among the various prediction modes specified in the HEVC, and the corresponding sizes PUSIZE and TUSIZE, for example.

The entropy coding unit 20 outputs a bit stream obtained by entropy-encoding each quantized signal and the corresponding prediction error signal of the motion vector outputted from the prediction coding unit 19, and the like. Then, a control unit (not illustrated) combines bit streams outputted by the entropy coding unit 20, in a predetermined order, and then adds header information defined in a coding standard such as HEVC, and the like, consequently obtaining encoded video data.

Figure 30:
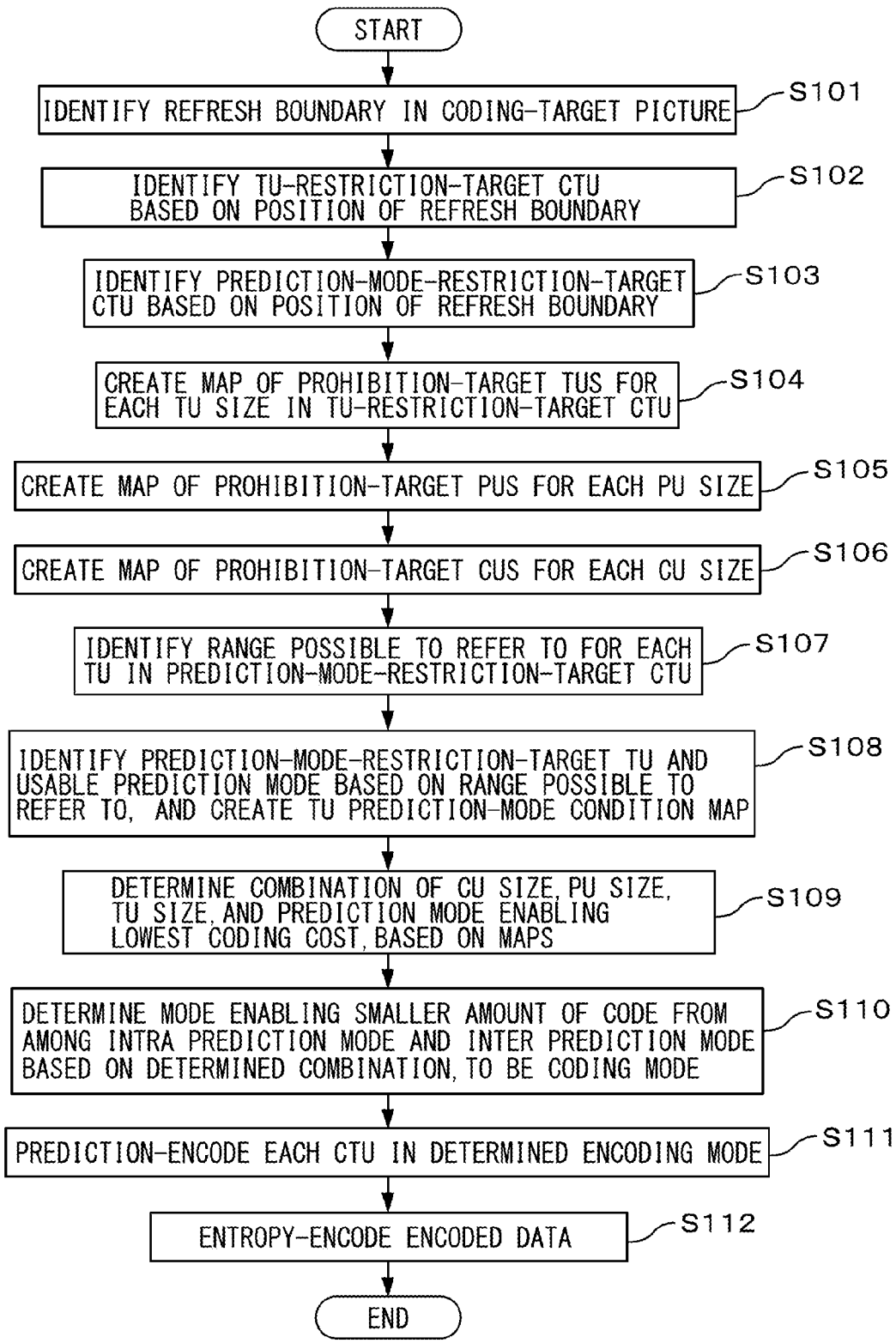
FIG. 30 is an operational flowchart illustrating a video encoding process.

FIG. 30 is an operational flowchart illustrating a video coding process by the video encoder 1. The video encoder 1 encodes each picture according to the operational flowchart below. The refresh cycle is set at the start of operation of the video encoder 1. The control unit (not illustrated) determines a refresh update size for each two consecutive pictures on the basis of the refresh cycle and the picture size.

The refresh boundary determination unit 10 determines the position of the refresh boundary in the coding-target picture on the basis of the refresh update size and the position of the refresh boundary in the immediately-preceding, encoded picture (Step S101). The TU-restriction-target CTU determination unit 12 identifies a TU-restriction-target CTU including a restriction-target TU, on the basis of the position of the refresh boundary in the coding-target picture (Step S102). Then, the prediction-mode-restriction-target CTU determination unit 16 identifies a prediction-mode-restriction-target CTU including a TU or a PU for which the use of one or more prediction modes is restricted, on the basis of the position of the refresh boundary in the coding-target picture (Step S103).

The restriction-target TU determination unit 13 determines each prohibition-target TU, for each of the plurality of possible sizes of the TUs, in the TU-restriction-target CTU, and creates a TU prohibition map (Step S104). Moreover, the restriction-target PU determination unit 14 determines each prohibition-target PU, for each of the plurality of possible sizes for the PUs, on the basis of the TU prohibition map and the relationship in size between TUs and PUs, and creates a PU prohibition map (Step S105). Further, the restriction-target CU determination unit 15 determines each prohibition-target CU, for each of the plurality of possible sizes for the CUs, on the basis of the TU prohibition map and the relationship in size between TUs and CUs, and creates a CU prohibition map (Step S106).

The restriction-target prediction mode determination unit 17 determines a reference-possible range for each TU in the coding-mode-restriction-target CTU, according to the distance from the TU to the refresh boundary or to the line dividing the CTU and the adjacent CTU including the refresh boundary (Step S107). On the basis of the reference-possible range, the restriction-target prediction mode determination unit 17 identifies usable prediction modes for each TU, and creates a TU prediction-mode condition map (Step S108).

The coding mode determination unit 18 identifies combinations of usable candidates for CU size, PU size, TU size, and prediction mode, for each CTU, on the basis of the TU prohibition maps, the PU prohibition maps, the CU prohibition maps, and the TU prediction-mode condition maps, and calculates the coding cost for each combination. Then, the coding mode determination unit 18 determines the combination of the CU, PU, and TU sizes, and the prediction mode that enable the lowest coding cost, as the intra prediction coding mode to be used for the CTU (Step S109). Moreover, the coding mode determination unit 18 compares the coding cost in the intra prediction coding mode and the coding cost in the inter prediction coding mode for each CU, and determines the coding mode corresponding to the lower one of the coding costs, as the coding mode to be used for the CU (Step S110).

The prediction coding unit 19 encodes each CTU in prediction coding and in accordance with the coding mode determined for each CU (Step S111). Then, the entropy coding unit 20 entropy-encodes the encoded data obtained through the prediction coding (Step S112). After the Step S112, the video encoder 1 terminates the video coding process.

As has been described above, the video encoder employs the intra-refresh scheme. The video encoder prohibits the use of any TU including the refresh boundary in the coding-target picture, and also prohibits the use of any prediction mode in which an unrefreshed region is to be referred to. Under these restrictions, the video encoder determines a combination of CU, PU, and TU sizes, and a prediction mode enabling the lowest coding cost, as the intra prediction coding mode to use. Hence, the video encoder can prevent propagation of information on the unrefreshed region to each block in a refreshed region to be intra-prediction-encoded.

Next, a video encoder according to the second embodiment will be described. In the video encoder according to the first embodiment, the restriction-target TU determination unit 13 is configured to operate so that the number of candidates for the TU size would be maintained as much as possible, and the restriction-target prediction mode determination unit 17 restricts prediction modes to use according to the TU size. By contrast, in the video encoder according to the second embodiment, a restriction-target TU determination unit 13 determines, for each of the plurality of possible sizes for TUs, each TU that may refer to an unrefreshed region in generating a coding block depending on prediction mode, as a prohibition-target TU. In this way, the video encoder according to the second embodiment simplifies conditions for restricting prediction modes used by the restriction-target prediction mode determination unit 17.

The video encoder according to the second embodiment is different from the video encoder according to the first embodiment in terms of the processes carried out by a TU-restriction-target CTU determination unit 12, the restriction-target TU determination unit 13, a prediction-mode-restriction-target CTU determination unit 16, and a restriction-target prediction mode determination unit 17. Hence, description will be given of the TU-restriction-target CTU determination unit 12, the restriction-target TU determination unit 13, the prediction-mode-restriction-target CTU determination unit 16, and the restriction-target prediction mode determination unit 17 below.

The TU-restriction-target CTU determination unit 12 does not set any TU-restriction-target CTU when the position of the refresh boundary is the same as the position of the CTU dividing line (e.g., for the picture at time (t+7) in FIG. 10). By contrast, when the position of the refresh boundary is different from the position of the CTU dividing line and a refreshed region larger than or equal to the largest value (32 pixels) of the candidates for the TU size exists in the CTU including the refresh boundary (e.g., for the pictures at time (t+3), time (t+4), time (t+5), and time (t+6) in FIG. 10), the TU-restriction-target CTU determination unit 12 determines the CTU including the refresh boundary as a TU-restriction-target CTU.

Moreover, when the position of the refresh boundary is different from the position of the CTU dividing line and no refreshed region larger than or equal to the largest value of the candidates for the TU size exists in the CTU including the refresh boundary (e.g., for the pictures at time t, time (t+1), and time (t+2) in FIG. 10), the TU-restriction-target CTU determination unit 12 determines the CTU including the refresh boundary and the CTU adjacent to the refreshed region of the CTU including the refresh boundary, as TU-restriction-target CTUs.

In other words, when R % CTUSIZE=0, the TU-restriction-target CTU determination unit 12 does not set any TU-restriction-target CTU. By contrast, when R % CTUSIZE≠0, the TU-restriction-target CTU determination unit 12 determines the CTU having the index CTUHIDX=r/CTUSIZE, as a TU-restriction-target CTU. In addition, the TU-restriction-target CTU determination unit 12 determines the CTU having the index CTUHIDX={(r/CTUSIZE)−1} when R−P<MAXTUSIZE where P=(R/CTUSIZE)*CTUSIZE, as a TU-restriction-target CTU. In this example, it is assumed that CTUHIDX≥0.

Figure 31:
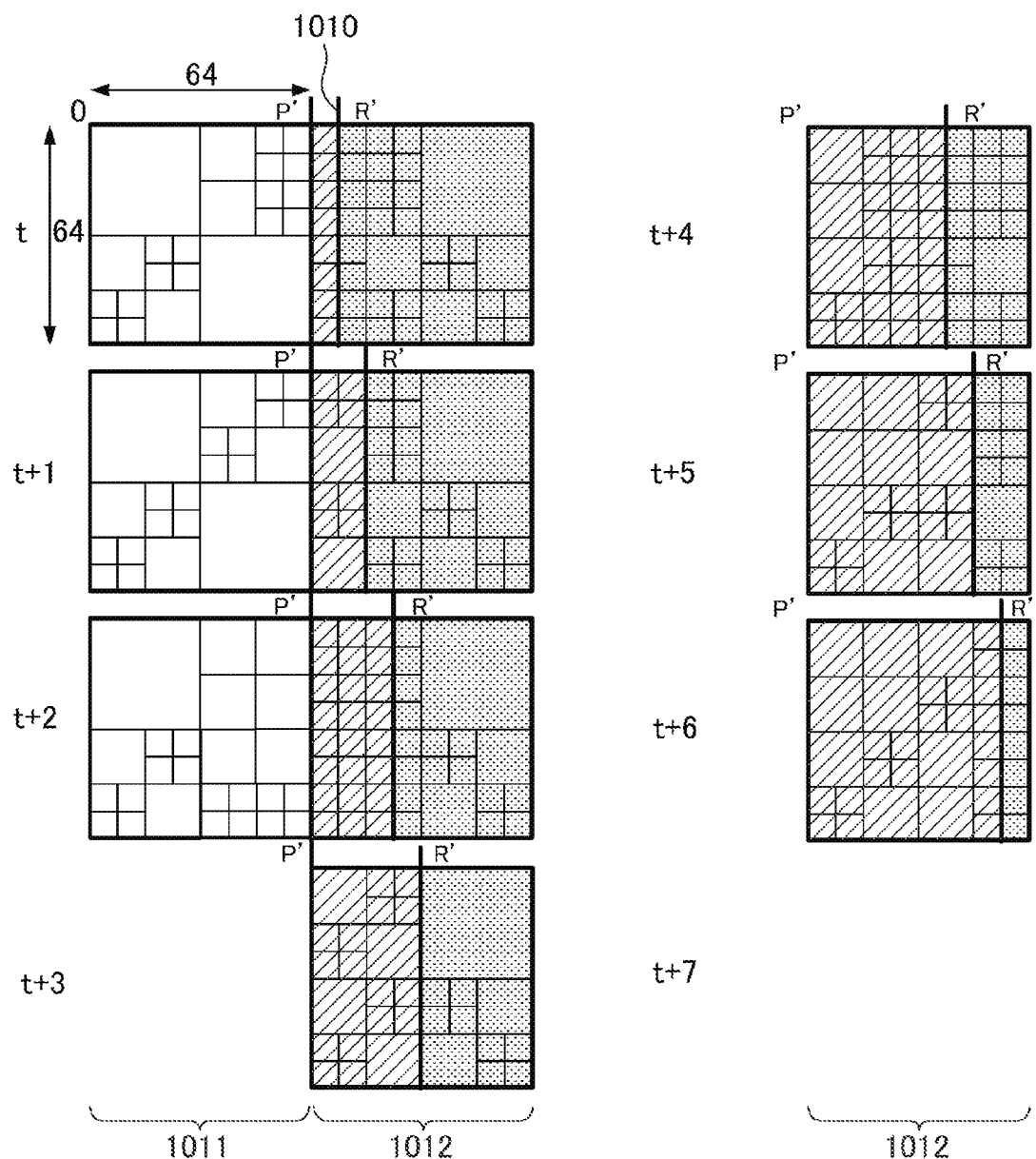
FIG. 31 is a drawing illustrating a TU-restriction-target CTU that is set according to the second embodiment, for the picture at each of time t to time (t+7) illustrated in FIG. 10.

FIG. 31 is a diagram illustrating TU-restriction-target CTUs that are set for the respective pictures at time t to time (t+7) in FIG. 10, according to the second embodiment. In each picture, the region on the right of the refresh boundary 1010 is an unrefreshed region, and the region on the left of the refresh boundary 1010 is a refreshed region. In the pictures from time t to time (t+2), the width of the left region adjacent to the CTU 1012 including the refresh boundary 1010 is smaller than 32 pixels corresponding to the largest value among the candidates for the TU size. Accordingly, the CTU 1012 and the CTU 1011 leftward adjacent to the CTU 1012 are determined as TU-restriction-target CTUs. By contrast, in the pictures at time (t+3) to time (t+6), the width of the left region adjacent to the CTU 1012 including the refresh boundary 1010 is larger than or equal to the largest value of the candidates for the TU size. Accordingly, only the CTU 1012 is determined as a TU-restriction-target CTU. For the picture at time (t+7), no TU-restriction-target CTU is set, since the position of the refresh boundary 1010 is the same as the position of the CTU dividing line on the right of the CTU 1012.

For the purpose of illustration below, the coordinate system having, as the origin, the left end of the TU-restriction-target CTU will be defined. Assume that the position of each pixel that is included in an unrefreshed region and is adjacent to the refresh boundary in this coordinate system is denoted by R'. Then, the position R' of the CTU having the index CTUHIDX={(r/CTUSIZE)−1} is represented as follows: R'={R−((R−1)/CTUSIZE)*CTUSIZE}. Meanwhile, the position R' of the CTU having the index CTUHIDX=(r/CTUSIZE) is represented as follows: R'=R−(R/CTUSIZE)*CTUSIZE. In addition, assume that the position of each pixel that is included in the refreshed region and is adjacent to the refresh boundary in this coordinate system is denoted by r'. Then, the position r' is represented as follows: r'=R'−1. A coordinate P' at the left end of the CTU including the refresh boundary in this coordinate system is calculated similarly. However, when the CTU has the index CTUHIDX=R/CTUSIZE, the position P'=0. When the coordinate of each pixel adjacent to the left end of the CTU including the refresh boundary is p=P−1, the coordinate of the pixel adjacent to the left end of the CTU including the refresh boundary is p'=P'−1 in the coordinate system having, as the origin, the left end of the prediction-mode-restriction-target CTU.

The restriction-target TU determination unit 13 checks, for each of the TUs of the plurality of sizes in the TU-restriction-target CTU adjacent to the refreshed region of the CTU including the refresh boundary, whether or not all the reference pixels are included in the refreshed region for each of all the prediction modes. Then, the restriction-target TU determination unit 13 determines each TU having at least one reference pixels in any of the prediction modes is included in the unrefreshed region, as a prohibition-target TU.

Moreover, the restriction-target TU determination unit 13 checks, for each of the TUs of the sizes included in the refreshed region other than the TUs adjacent to the refresh boundary in the TU-restriction-target CTU including the refresh boundary, whether or not all the reference pixels are included in the refreshed region in each of all the prediction modes. Then, the restriction-target TU determination unit 13 determines each TU having at least one of the reference pixels in at least one of the prediction modes included in the unrefreshed region, as a prohibition-target TU.

As described above, prohibition-target TUs can individually be set for the TU-restriction-target CTU adjacent to the TU-restriction-target CTU including the refresh boundary and the TU restriction-target CTU including the refresh boundary. Accordingly, prohibition-target TUs may be set only for the TU-restriction-target CTU adjacent to the TU-restriction-target CTU including the refresh boundary in the picture at each of time t, time (t+1), and time (t+2) illustrated in FIG. 10, for example. This allows the restriction-target TU determination unit 13 not to check, for the TU-restriction-target CTU including the refresh boundary, whether or not the distance from the end of the CTU to the refresh boundary is at least equal to the TU size. Since the restriction-target TU determination unit 13 only needs to set usable TU sizes for the TU-restriction-target CTU including the refresh boundary, at a value smaller than or equal to the largest TU size by which the refresh update size can be divided, the process for setting a prohibition-target TU for the TU-restriction target CTU including the refresh boundary can be simplified.

(1) Regarding TU-Restriction-Target CTU with CTUHIDX={(r/CTUSIZE)−1}

As illustrated in FIG. 6, the refresh boundary may be included in the range of reference pixels of a TU including the coordinate p' i.e., a TU adjacent to the CTU including the refresh boundary, depending on TU size. Since reference to the pixels locating between the TU and the refresh boundary is allowed, it is checked whether or not the TU including the coordinate p' is as a prohibition-target TU, on the basis of the value (R'−P') % TUSIZE. In other words, when R'−P'≥TUSIZE, reference to all the reference pixels is allowed for each TU having the size TUSIZE, and hence the TU is determined not to be a prohibition-target TU. By contrast, when R'−P'<TUSIZE, the restriction-target TU determination unit 13 determines each TU having the size TUSIZE as a restriction-target TU. Accordingly, when the position of the TU dividing line and the position of the refresh boundary are different in the CTU having the index CTUHIDX=(r/CTUSIZE) (i.e., when (R'−P') % TUSIZE!=0), the restriction-target TU determination unit 13 determines each TU having the index TUHIDX=p'/TUSIZE as a prohibition-target TU, where TUSIZE=32, 16, 8, 4. In other words, the restriction-target TU determination unit 13 allows the use of each TU having the TUSIZE smaller than or equal to the largest size TUSIZE by which the refresh update size S can be divided, among the TUs including the coordinate p'.

In terms of the processing order, the restriction-target TU determination unit 13 may check, for each of the four TUs of 16×16 pixels included in a TU of 32×32 pixels, whether or not the TU is a prohibition-target TU, and then check, for the next TU of 32×32 pixels, whether or not the TU is a prohibition-target TU, for example. Alternatively, the restriction-target TU determination unit 13 may check, for each of the four TUs of 32×32 pixels, whether or not the TU is a prohibition-target TU, and then check, for each of the 16 TUs of 16×16 pixels, whether or not the TU is a prohibition-target TU.

The restriction-target TU determination unit 13 sets, for each TU in each TU size, a TU prohibition flag indicating whether or not the TU is a prohibition-target TU, and thereby generates a TU prohibition map indicating usable TUs and prohibition-target TUs.

FIGS. 32A to 32D are TU prohibition maps for the TU-restriction-target CTU 1011, which is adjacent to the CTU including the refresh boundary, of the picture at time t illustrated in FIG. 10, respectively for TUs of 32×32 pixels, TUs of 16×16 pixels, TUs of 8×8 pixels, and TUs of 4×4 pixels in size. Each block 3201 represents a TU. In each TU, a TU prohibition flag indicating whether or not the TU is a prohibition-target TU is presented. When the value of the TU prohibition flag is "0", the TU is not a prohibition-target TU. By contrast, when the value of the TU prohibition flag is "1", the TU is a prohibition-target TU. At time t, the following is satisfied: R'−P'=8. Hence, as illustrated in FIGS. 32A to 32D, only the TUs each being larger than the refresh update size (8 pixels) are set as prohibition-target TUs.

According to a modified example, to make the process simpler, the restriction-target TU determination unit 13 may allow the use of each TU having the smallest usable size TUSIZE (i.e., determine not to be a prohibition-target TU). Alternatively, the restriction-target TU determination unit 13 may determine each TU having the size TUSIZE that is larger than the largest size CUSIZE by which the refresh update size S can be divided, i.e., the size TUSIZE that is larger than the smallest size CUSIZE when (R'−P') % CUSIZE=0, as a prohibition-target TU. In this case, the restriction-target TU determination unit 13 may allow the use of each TU having the size TUSIZE that is smaller than or equal to the smallest size CUSIZE.

Alternatively, the restriction-target TU determination unit 13 may check whether or not the condition that TUHIDX=P'% TUSIZE and R'−P'≥TUSIZE, i.e., the condition in which the use of each TU including the coordinate p' is allowed, is satisfied, in ascending order from the smallest size TUSIZE. The restriction-target TU determination unit 13 may terminate the process for determining a prohibition-target TU at the time when the largest size TUSIZE satisfying the condition is found, and then determine each TU that has the size TUSIZE larger than the largest usable size TUSIZE and includes the coordinate p', as a prohibition-target TU.

(2) TU-Restriction-Target CTU with CTUHIDX=r/CTUSIZE, i.e., TU-Restriction-Target CTU Including Refresh Boundary For the TU-restriction-target CTU including the refresh boundary, the restriction-target TU determination unit 13 determines each TU including the refresh boundary r' as a prohibition-target TU. For convenience, it is assumed that the coordinate of the left end of each TU including the refresh boundary is denoted by Q'{=(R'/TUSIZE)*TU- SIZE}, and the coordinate of each pixel adjacent to the left end of each TU including the refresh boundary is denoted by q'(=Q'−1).

As illustrated in FIG. 6, the refresh boundary may be included in the range of reference pixels of a TU including the coordinate q', depending on the TU size. Specifically, when R'−Q'≥TUSIZE, the refresh boundary is not included in the reference range for any TU having the size TUSIZE, and reference to all the reference pixels is allowed in any prediction mode. Hence, the restriction-target TU determination unit 13 allows the use of all the TUs having the size TUSIZE, and hence determines the TU not as a prohibition-target TU. By contrast, when (R'−Q')<TUSIZE, the restriction-target TU determination unit 13 determines each TU having the size TUSIZE as a prohibition-target TU. Accordingly, when the position of the TU dividing line and the position of the refresh boundary are different, the restriction-target TU determination unit 13 determines each TU having the index TUHIDX=q'/TUSIZE={(r'/TUSIZE)−1} as a restriction-target TU.

For example, the restriction-target TU determination unit 13 checks, for each TU of 32×32 pixels in the TU-restriction-target CTU, whether or not the refresh boundary r' is included in the TU. When the refresh boundary r' is included in the TU, the restriction-target TU determination unit 13 determines the TU of 32×32 pixels as a prohibition-target TU.

When the position of the TU dividing line and the position of the refresh boundary are different, i.e., when (R'−Q') %32!=0, the restriction-target TU determination unit 13 determines each TU of 32×32 pixels adjacent to the left of any TU of 32×32 pixels including the refresh boundary r' and included in the refreshed region, as a prohibition-target TU. Then, the restriction-target TU determination unit 13 checks, for each TU of 16×16 pixels in the TU of 32×32 pixels, whether or not the refresh boundary r' is included in the TU. When the refresh boundary r' is included in the TU of 16×16 pixels, the restriction-target TU determination unit 13 determines the TU of 16×16 pixels as a prohibition-target TU. When the position of the TU dividing line of the TU of 16×16 pixels and the position of the refresh boundary are different, i.e., when (R'−Q') %16!=0, the restriction-target TU determination unit 13 determines each TU of 16×16 pixels that is adjacent to any TU of 16×16 pixels including the refresh boundary r' and is included in the refreshed region, as a prohibition-target TU. Similarly, the restriction-target TU determination unit 13 checks, for each of the TUs of 8×8 pixels and 4×4 pixels, whether or not the TU is a prohibition-target TU. As to the TUs of 8×8 pixels and 4×4 pixels, the position of the TU dividing line and the position of the refresh boundary are always the same. In other words, the restriction-target TU determination unit 13 determines each TU having the index TUHIDX=r'/TUSIZE as a restriction-target TU where TUSIZE=32, 16, 8, 4. Moreover, when (R'−Q') % TUSIZE!=0, the restriction-target TU determination unit 13 determines each TU having the index TUHIDX=q'/TUSIZE as a prohibition-target TU.

In terms of the processing order, the restriction-target TU determination unit 13 may check, for a TU of 32×32 pixels, whether or not the TU is a prohibition-target TU, and then check, for each of the four TUs of 16×16 pixels included in the TU, whether or not the TU is a prohibition-target TU, for example. Then, the restriction-target TU determination unit 13 may check the same for the other TUs of 32×32 pixels. Alternatively, the restriction-target TU determination unit 13 may check, for each of the four TUs of 32×32 pixels, whether or not the TU is a prohibition-target TU, and then check, for each of the 16 TUs of 16×16 pixels, whether or not the TU is a prohibition-target TU.

FIGS. 33A to 33D are TU prohibition maps for the CTU 1012 of the picture at time (t+6) illustrated in FIG. 10, respectively for TUs of 32×32 pixels, TUs of 16×16 pixels, TUs of 8×8 pixels, and TUs of 4×4 pixels in size. In this example, the refresh boundary r' is locating at the position of the eighth pixel counted from the right end of the CTU 1012. Each block 3301 represents a TU. In each TU, a TU prohibition flag is presented. As illustrated in FIGS. 33A to 33D, the TUs including the refresh boundary r' and the TUs each being leftward adjacent to any of the TUs including the refresh boundary r' (i.e., the TUs leftward adjacent to the refreshed region of any of the TUs including the refresh boundary r') are determined as prohibition-target TUs, among the TUs each being larger in size than the refresh update size (8 pixels).

According to a modified example, to make the process simpler, the restriction-target TU determination unit 13 may allow only the use of each TU having the size TUSIZE that is the smallest usable size TUSIZE (i.e., determine each of such TUs not to be a prohibition-target TU). Alternatively, the restriction-target TU determination unit 13 may determine each TU having the size TUSIZE that is larger than the largest size CUSIZE by which the refresh update size S can be divided, i.e., the size TUSIZE that is larger than the smallest size CUSIZE when (R'−Q') % CUSIZE=0, as a prohibition-target TU. In this case, the restriction-target TU determination unit 13 may allow the use of each TU having the size TUSIZE that is smaller than or equal to the smallest size CUSIZE.

Alternatively, the restriction-target TU determination unit 13 may check whether or not the condition that TUHIDX=Q'% TUSIZE and R'−Q'≥TUSIZE, i.e., the condition in which the use of each TU including the coordinate q' is allowed, is satisfied, in ascending order from the smallest size TUSIZE. The restriction-target TU determination unit 13 may terminate the process for determining a prohibition-target TU at the time when the largest size TUSIZE satisfying the condition is found, and then determine each TU that has the size TUSIZE larger than the largest usable size TUSIZE and includes the coordinate q', as a prohibition-target TU.

The prediction-mode-restriction-target CTU determination unit 16 determines the CTU including the refresh boundary, i.e., the CTU having the index CTUHIDX=r"/CTUSIZE, as a prediction-mode-restriction-target CTU.

Figure 34:
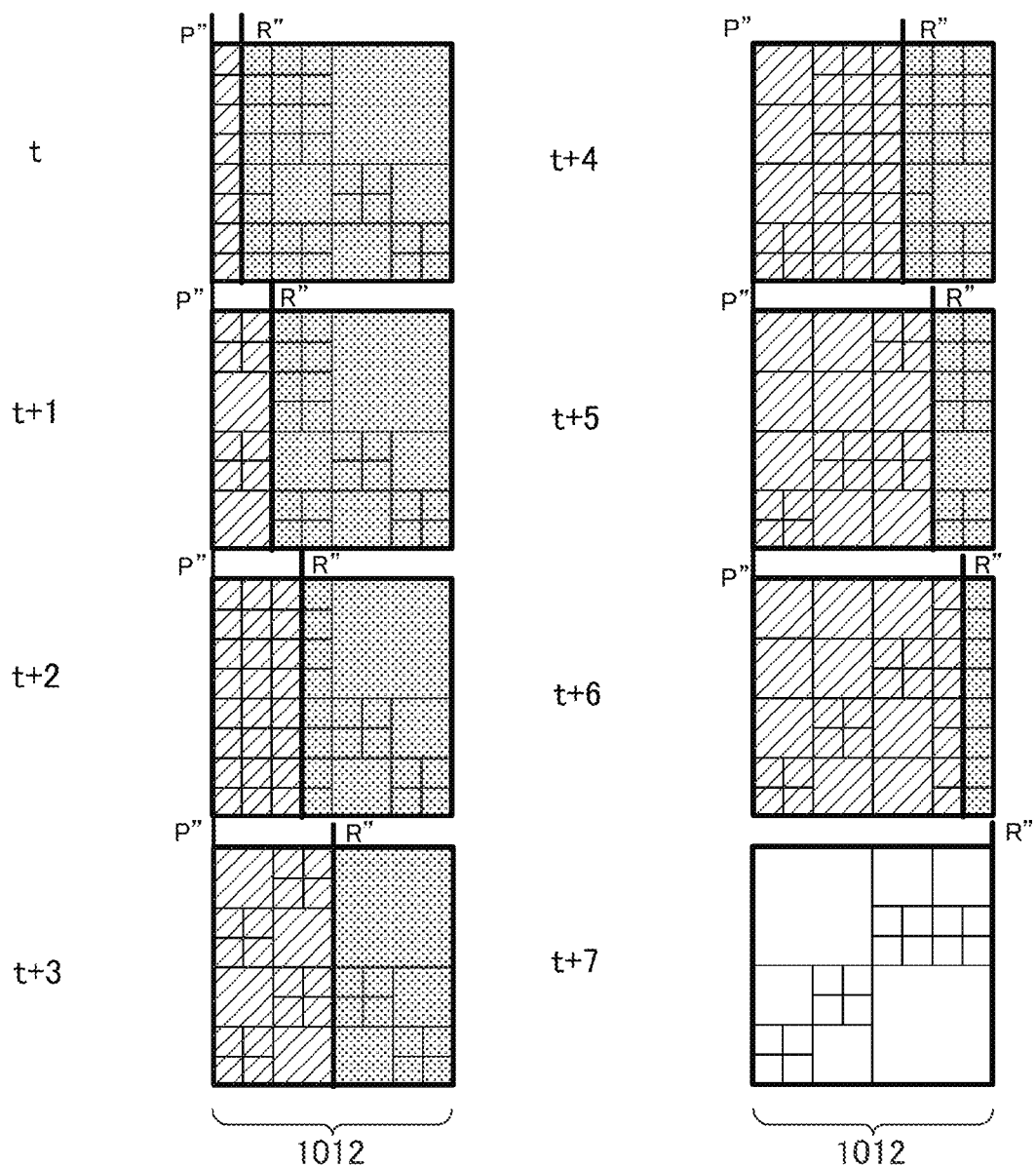
FIG. 34 is a diagram illustrating a prediction-mode-restriction-target CTU in the picture at each of time t to time (t+7) illustrated in FIG. 10, according to the second embodiment.

FIG. 34 is a diagram illustrating prediction-mode-restriction-target CTUs in the respective pictures at time t to time (t+7) illustrated in FIG. 10. At any of time t to time (t+7), the CTU 1012 having the index CTUHIDX=1 is determined as a prediction-mode-restriction-target CTU.

For the purpose of illustration below, the coordinate system having, as the origin, the left end of the prediction-mode-restriction-target CTU will be defined again. In this coordinate system, the position R" of each pixel included in the unrefreshed region and being adjacent to the refresh boundary is calculated as follows:

when CTUHIDX=R/CTUSIZE, R"=R−(R/CTUSIZE) *CTUSIZE.

In addition, the position r" of the pixel included in the refreshed region and being adjacent to the refresh boundary is (R"−1), in this coordinate system. The coordinate P" of the left end of the CTU including the refresh boundary in the coordinate system is calculated similarly. In the case of coordinate P", however, when CTUHIDX=R/CTUSIZE, P'''=0. Assume that the coordinate of each pixel that is adjacent to the left end of the CTU including the refresh boundary is p=P−1. In this case, the coordinate p" of each pixel that is adjacent to the left end of the CTU including the refresh boundary is (P'''−1) in the coordinate system having the left end of the prediction-mode-restriction-target CTU as the origin.

The restriction-target prediction mode determination unit 17 identifies usable prediction modes for each prediction-mode-restriction-target TU by carrying out a similar process to that in the first embodiment. However, the procedure for determining a prediction-mode-restriction-target TU is made simpler in the second embodiment.

The restriction-target prediction mode determination unit 17 determines each TU including the refresh boundary as a prediction-mode-restriction-target TU. Alternatively, when the position of the TU dividing line and the position of the refresh boundary are the same, the restriction-target prediction mode determination unit 17 determines each TU including the coordinate r" as a prediction-mode-restriction-target TU.

Specifically, the restriction-target prediction mode determination unit 17 checks, for each of the TUs of 32×32 pixels in the prediction-mode-restriction-target CTU, whether or not the refresh boundary r" is included in the TU. When the refresh boundary r" is included in the TU, the restriction-target prediction mode determination unit 17 determines the TU of 32×32 pixels as a prediction-mode-restriction-target TU. Then, the restriction-target prediction mode determination unit 17 checks, for each of the TUs of 16×16 pixels in the TU of 32×32 pixels, whether or not the refresh boundary r" is included in the TU of 16×16 pixels. When the refresh boundary r" is included in the TU of 16×16 pixels, the restriction-target prediction mode determination unit 17 determines the TU of 16×16 pixels as a prediction-mode-restriction-target TU. Similarly, the restriction-target prediction mode determination unit 17 checks, for each of the TUs of 8×8 pixels and 4×4 pixels, whether or not the TU is a prediction-mode-restriction-target TU. As to the TUs of 8×8 pixels and 4×4 pixels, the position of the TU dividing line and the position of the refresh boundary are always the same. In other words, the restriction-target prediction mode determination unit 17 determines each TU having the index TUHIDX=r"/TUSIZE as a prediction-mode-restriction-target TU where TUSIZE=32, 16, 8, 4.

In terms of the processing order, the restriction-target prediction mode determination unit 17 may check, for a TU of 32×32 pixels, whether or not the TU is a prediction-mode-restriction-target TU, and then check, for each of the four TUs of 16×16 pixels included in the TU, whether or not the TU is a prediction-mode-restriction-target TU, for example. Then, the restriction-target prediction mode determination unit 17 may check the same for the other TUs of 32×32 pixels. Alternatively, the restriction-target prediction mode determination unit 17 may check, for each of the four TUs of 32×32 pixels, whether or not the TU is a prediction-mode-restriction-target TU, and then check, for each of the 16 TUs of 16×16 pixels, whether or not the TU is a prediction-mode-restriction-target TU.

FIGS. 35A to 35D are TU prediction-mode-restriction maps set according to the second embodiment for the CTU 1012 of the picture at time (t+6) illustrated in FIG. 10, respectively for TUs of 32×32 pixels, TUs of 16×16 pixels, TUs of 8×8 pixels, and TUs of 4×4 pixels in size. In this example, the refresh boundary r' is locating at the position of the eighth pixel counted from the right end of the CTU 1012. Each block 3501 represents a TU. In each TU, a TU prediction-mode-restriction flag is presented. As illustrated in FIGS. 35A to 35D, the TUs including the refresh boundary r" are determined as prediction-mode-restriction-target TUs, among the TUs each having a size larger than the refresh update size (8 pixels). By contrast, the TUs having the refresh boundary r" locating on the right end thereof are determined as prediction-mode-restriction-target TUs, among the TUs each having a size smaller than or equal to the refresh update size.

The restriction-target prediction mode determination unit 17 determines a TU prediction-mode condition to be used for each TU, by referring to the TU prohibition maps and the TU prediction-mode-restriction maps. For example, the restriction-target prediction mode determination unit 17 sets each TU having a TU prohibition flag set at "1" in the corresponding TU prohibition map, i.e., each unusable TU, to be invalid in a corresponding TU prediction-mode-restriction map. For each TU having a prediction-mode restriction flag set at "1" among the other TUs, the restriction-target prediction mode determination unit 17 determines a corresponding condition from among the above-described TU prediction-mode conditions.

FIGS. 36A to 36D are TU prediction-mode-restriction maps for the CTU 1012 of the picture at time (t+6) illustrated in FIG. 10, respectively for TUs of 32×32 pixels, TUs of 16×16 pixels, TUs of 8×8 pixels, and TUs of 4×4 pixels in size. In this example, the refresh boundary r" is locating at the position of the eighth pixel counted from the right end of the CTU 1012. Each block 3601 represents a TU. In each TU, a flag indicating whether or not a corresponding one of the above-described TU prediction-mode conditions is to be used. When the flag is set at "1" for a TU, a corresponding one of the above-described TU prediction-mode conditions is applied for the TU. Alternatively, to make the process simpler, TU prediction-mode condition 1 including only prediction modes in which no pixels locating on the other side of the refresh boundary from the right end of the TU is referred to, may be used for each TU having the flag set at "1". By contrast, the flag is set at "0" for each TU with no restrictions of the use of any prediction modes. In addition, "Nan" is presented for each invalid TU.

Figure 37:
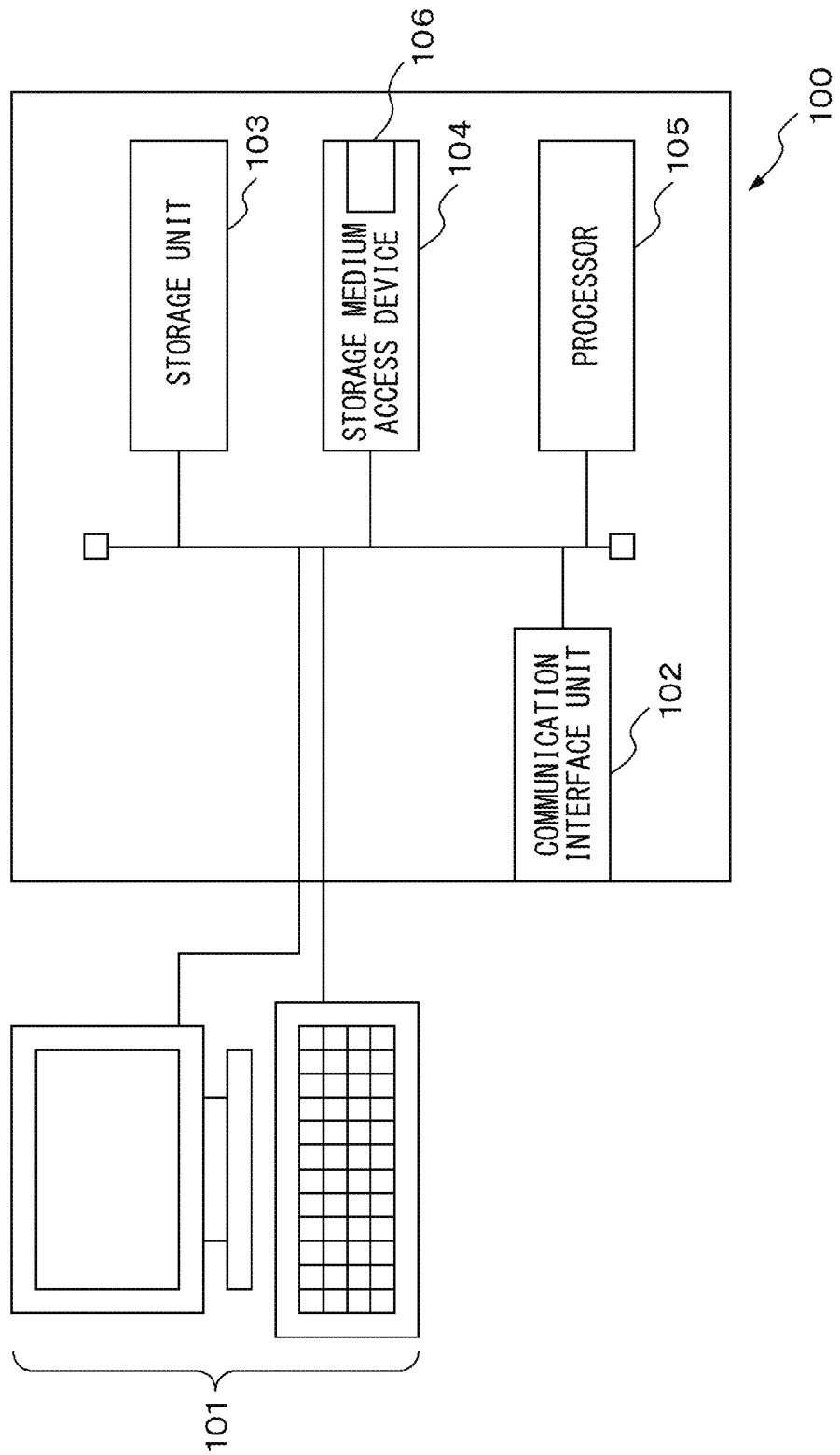
FIG. 37 is a diagram illustrating in simplified form the configuration of a computer that operates as a video encoder when a computer program for implementing the functions of units of the video encoder according to any one of the embodiments and the modified examples thereof operates.

FIG. 37 is a diagram illustrating the configuration of a computer that operates as a video encoder when a computer program for implementing the functions of the units in the video encoder according to any one of the embodiments and the modified examples thereof operates.

A computer 100 includes a user interface unit 101, a communication interface unit 102, a storage unit 103, a storage medium access device 104, and a processor 105. The processor 105 is connected to the user interface unit 101, the communication interface unit 102, the storage unit 103, and the storage medium access device 104, via a bus, for example.

The user interface unit 101 includes input devices such as a keyboard and a mouse, and a display device such as a liquid crystal display, for example. Alternatively, the user interface unit 101 may include a device in which an input device and a display device are integrated, such as a touch panel display. The user interface unit 101 outputs, to the processor 105, an operation signal for selecting video data to be encoded or encoded video data to be decoded, in response to a user operation, for example. The user interface unit 101 may also display the decoded video data received from the processor 105.

The communication interface unit 102 may include a communication interface for connecting the computer 100 to a device for generating video data, such as a video camera, and a control circuit therefor. The communication interface may be a universal serial bus (USB), for example.

Moreover, the communication interface unit 102 may include a communication interface for connecting the computer 100 to a communication network conforming to a communication standard such as Ethernet (registered trademark), and a control circuit therefor.

In this case, the communication interface unit 102 acquires video data to be encoded from other equipment connected to the communication network, and then passes the video data to the processor 105. The communication interface unit 102 may output the encoded video data received from the processor 105, to other equipment via the communication network.

The storage unit 103 includes a read/write semiconductor memory and a read-only semiconductor memory, for example. The storage unit 103 stores a computer program to be executed on the processor 105 to carry out the video encoding process, and data generated during and as a result of the process.

The storage medium access device 104 is a device for accessing a storage medium 106 such as a magnetic disc, a semiconductor memory card, or an optical storage medium, for example. The storage medium accessing device 104 reads out a computer program for the video encoding process, the computer program being stored in the storage medium 106 and executed on the processor 105, and then passes the program to the processor 105.

The processor 105 generates encoded video data by executing the computer program for the video encoding process according to any one of the above-described embodiments and modified examples. Then, the processor 105 stores the encoded video data thus generated, in the storage unit 103, or outputs the encoded video data to other equipment via the communication interface unit 102.

The computer program capable of implementing the functions of the units in the video encoder 1 may be provided in the form recorded on a medium readable by the computer. However, note that such a recording medium does not include any carrier.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A video encoder that encodes a coding-target picture included in a video in an intra-refresh scheme in which a slice is cyclically shifted across a picture included in the video in a certain refresh cycle and each pixel in the slice is encoded with reference to the slice or a refreshed region through which the slice has traversed, the video encoder comprising:
    a processor configured to: when a coding-target block included in the refreshed region in the coding-target picture is encoded in accordance with an intra-prediction coding mode in which a prediction block for the coding-target block is generated by using information on an encoded region in the coding-target picture and an error signal between the coding-target block and the prediction block is encoded, for each of a plurality of possible sizes of a first sub-block in the coding-target block, the first sub-block being a unit for generating the prediction block, among a plurality of prediction modes with different reference ranges of encoded pixels to be referred to in generating the prediction block for the first sub-block, determine a prediction mode with the reference range not overlapping an unrefreshed region, which corresponds to a region through which the slice has not traversed, as a valid prediction mode;
    calculate, for each combination of a size of the first sub-block, a size of a second sub-block which includes the first sub-block and serves as a unit for application of the prediction mode, and the valid prediction mode, an estimation value of an amount of code when a third sub-block which includes the first sub-block and the second sub-block and serves as a unit for application of an intra prediction coding mode, is intra-prediction-encoded;
    determine the combination of the size of the first sub-block, the size of the second sub-block, and the valid prediction mode with a smallest one of the estimation values, as an intra prediction mode;
    generate coded data by encoding the third sub-block in accordance with the intra prediction mode; and
    entropy-encode the coded data.

2. The video encoder according to claim 1, wherein determination of the prediction mode with the reference range not overlapping the unrefreshed region as the valid prediction mode includes:
    identifying, from among the first sub-blocks, a first sub-block with at least part of the reference range overlapping the unrefreshed region in any of the plurality of prediction modes, as a restriction-target first sub-block, and,
    when a pixel included in the reference range of the restriction-target first sub-block in the plurality of prediction modes is not encoded, determining each of all the plurality of prediction modes as the valid prediction mode.

3. The video encoder according to claim 1, wherein determination of the prediction mode with the reference range not overlapping the unrefreshed region as the valid prediction mode includes:
    identifying, from among the first sub-blocks, a first sub-block with at least part of the reference range overlapping the unrefreshed region in any of the plurality of prediction modes, as a restriction-target first sub-block, and
    determining a prediction mode with the reference range not including any pixel locating closer to the unrefreshed region than an unrefreshed-region-side end of the restriction-target first sub-block, among the plurality of prediction modes, as the valid prediction mode for the restriction-target first sub-block.

4. The video encoder according to claim 1, wherein determination of the prediction mode with the reference range not overlapping the unrefreshed region as the valid prediction mode includes determining each valid prediction mode for the first sub-block with the smallest number of valid prediction modes, among the first sub-blocks included in the second sub-block, as the valid prediction mode for each first sub-blocks included in the second sub-block.

5. The video encoder according to claim 1, wherein the processor is further configured to identify the first sub-block including a refresh boundary between the refreshed region and the unrefreshed region, as a restriction-target sub-block, for each of a plurality of possible sizes of the first sub-block, and calculation of the estimation value includes excluding the size of the first sub-block corresponding to the restriction-target sub-block, from the combinations for calculating the estimation value.

6. The video encoder according to claim 1, wherein the processor is further configured to set the size of the second sub-block at largest one of the sizes of the first sub-block not including a refresh boundary between the refreshed region and the unrefreshed region.

7. The video encoder according to claim 1, wherein, when a refresh boundary between the refreshed region and the unrefreshed region is included in the coding-target block, and width from a refreshed-region-side end of the coding-target block to the refresh boundary is smaller than a largest value of the plurality of possible sizes of the first sub-block, determination of the prediction mode with the reference range not overlapping the unrefreshed region as the valid prediction mode includes checking whether or not at least part of the reference region in each of the plurality of prediction modes overlap the unrefreshed region, for the first sub-block locating in the refreshed region in the coding-target block or within a region specified by the largest value of the plurality of possible sizes of the first sub-block from the refresh boundary in a second coding-target block adjacent to the coding-target block on refreshed region side.

8. The video encoder according to claim 7, wherein calculation of the estimation value includes excluding the first sub-block with at least part of the reference range overlapping the unrefreshed region in any of the plurality of prediction modes, from the combinations for calculating the estimation value of the amount of code, among the first sub-blocks included in the second coding-target block.

9. The video encoder according to claim 7, wherein calculation of the estimation value includes excluding the first sub-block that is adjacent to the coding-target block and has a size other than smallest one of the plurality of possible sizes of the first sub-block in the second coding-target block, from the combinations for calculating the estimation value of the amount of code.

10. A video encoding method for encoding a coding-target picture included in a video in an intra-refresh scheme in which a slice is cyclically shifted across a picture included in the video in a certain refresh cycle and each pixel in the slice is encoded with reference to the slice or a refreshed region through which the slice has traversed, the video encoding method comprising:

determining, when a coding-target block included in the refreshed region in the coding-target picture is encoded in accordance with an intra-prediction coding mode in which a prediction block for the coding-target block is generated by using information on an encoded region in the coding-target picture and an error signal between the coding-target block and the prediction block is encoded, for each of a plurality of possible sizes of a first sub-block in the coding-target block, the first sub-block being a unit for generating the prediction block, among a plurality of prediction modes with different reference ranges of encoded pixels to be referred to in generating the prediction block for the first sub-block, a prediction mode with the reference range not overlapping an unrefreshed region, which corresponds to a region through which the slice has not traversed, as a valid prediction mode;

calculating, for each combination of a size of the first sub-block, a size of a second sub-block which includes the first sub-block and serves as a unit for application of the prediction mode, and the valid prediction mode, an estimation value of an amount of code when a third block which includes the first sub-block and a second sub-block and serves as a unit for application of an intra prediction coding mode, is intra-prediction-encoded;

determining the combination of the size of the first sub-block, the size of the second sub-block, and the valid prediction mode with the smallest estimation value, as an intra prediction mode;

generating coded data by encoding the third sub-block in accordance with the intra prediction mode; and entropy-coding the coded data.

11. The video encoding method according to claim 10, wherein the determining the prediction mode with the reference range not overlapping the unrefreshed region as the valid prediction mode identifies, from among the first sub-blocks, a first sub-block with at least part of the reference range overlapping the unrefreshed region in any of the plurality of prediction modes, as a restriction-target first sub-block, and, when a pixel included in the reference range of the restriction-target first sub-block in the plurality of prediction modes is not encoded, determines each of all the plurality of prediction modes as the valid prediction mode.

12. The video encoding method according to claim 10, wherein the determining the prediction mode with the reference range not overlapping the unrefreshed region as the valid prediction mode identifies, from among the first sub-blocks, a first sub-block with at least part of the reference range overlapping the unrefreshed region in any of the plurality of prediction modes, as a restriction-target first sub-block, and determines a prediction mode with the reference range not including any pixel locating closer to the unrefreshed region than an unrefreshed-region-side end of the restriction-target first sub-block, among the plurality of prediction modes, as the valid prediction mode for the restriction-target first sub-block.

13. The video encoding method according to claim 10, wherein the determining the prediction mode with the reference range not overlapping the unrefreshed region as the valid prediction mode determines each valid prediction mode for the first sub-block with the smallest number of valid prediction modes, among the first sub-blocks included in the second sub-block, as the valid prediction mode for each first sub-blocks included in the second sub-block.

14. The video encoding method according to claim 10, further comprising:

identifying the first sub-block including a refresh boundary between the refreshed region and the unrefreshed region, as a restriction-target sub-block, for each of a plurality of possible sizes of the first sub-block, and wherein the calculating the estimation value excludes the size of the first sub-block corresponding to the restriction-target sub-block, from the combinations for calculating the estimation value.

15. The video encoding method according to claim 10, further comprising:

setting the size of the second sub-block at largest one of the sizes of the first sub-block not including a refresh boundary between the refreshed region and the unrefreshed region.

16. The video encoding method according to claim 10, wherein, when a refresh boundary between the refreshed region and the unrefreshed region is included in the coding-target block, and width from a refreshed-region-side end of the coding-target block to the refresh boundary is smaller than a largest value of the plurality of possible sizes of the first sub-block, the determining the prediction mode with the reference range not overlapping the unrefreshed region as the valid prediction mode checks whether or not at least part of the reference region in each of the plurality of prediction modes overlap the unrefreshed region, for the first sub-block locating in the refreshed region in the coding-target block or within a region specified by the largest value of the plurality of possible sizes of the first sub-block from the refresh boundary in a second coding-target block adjacent to the coding-target block on refreshed region side.

17. The video encoding method according to claim 16, wherein the calculating the estimation value excludes the first sub-block with at least part of the reference range overlapping the unrefreshed region in any of the plurality of prediction modes, from the combinations for calculating the estimation value of the amount of code, among the first sub-blocks included in the second coding-target block.

18. The video encoding method according to claim 16, wherein the calculating the estimation value excludes the first sub-block that is adjacent to the coding-target block and has a size other than smallest one of the plurality of possible sizes of the first sub-block in the second coding-target block, from the combinations for calculating the estimation value of the amount of code.

19. A non-transitory computer-readable recording medium having recorded thereon a video encoding computer program that causes a computer to execute encoding a coding-target picture included in a video in an intra-refresh scheme in which a slice is cyclically shifted across a picture included in the video in a certain refresh cycle and each pixel in the slice is encoded with reference to the slice or a refreshed region through which the slice has traversed, the computer program to execute a process comprising:

determining, when a coding-target block included in the refreshed region in the coding-target picture is encoded in accordance with an intra-prediction coding mode in which a prediction block for the coding-target block is generated by using information on an encoded region in the coding-target picture and an error signal between the coding-target block and the prediction block is encoded, for each of a plurality of possible sizes of a first sub-block in the coding-target block, the first sub-block being a unit for generating the prediction block, among a plurality of prediction modes with different reference ranges of encoded pixels to be referred to in generating the prediction block for the first sub-block, a prediction mode with the reference range not overlapping an unrefreshed region, which corresponds to a region through which the slice has not traversed, as a valid prediction mode;

calculating, for each combination of a size of the first sub-block, a size of a second sub-block which includes the first sub-block and serves as a unit for application of the prediction mode, and the valid prediction mode, an estimation value of an amount of code when a third block which includes the first sub-block and a second sub-block and serves as a unit for application of an intra prediction coding mode, is intra-prediction-encoded;

determining the combination of the size of the first sub-block, the size of the second sub-block, and the valid prediction mode with the smallest estimation value, as an intra prediction mode;

generating coded data by encoding the third sub-block in accordance with the intra prediction mode; and entropy-coding the coded data.

20. The video encoder according to claim 1, wherein the processor is further configured to determine, for each of the plurality of prediction modes, whether or not the reference range of the prediction mode overlaps the unrefreshed region.

* * * * *